US012444093B2

(12) United States Patent
Ohkawa et al.

(10) Patent No.: US 12,444,093 B2
(45) Date of Patent: Oct. 14, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Masato Ohkawa, Toyama (JP); Noritaka Iguchi, Osaka (JP); Toshiyasu Sugio, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 467 days.

(21) Appl. No.: 18/096,637

(22) Filed: Jan. 13, 2023

(65) Prior Publication Data

US 2023/0154056 A1 May 18, 2023

Related U.S. Application Data

(63) Continuation of application No. PCT/JP2021/027117, filed on Jul. 20, 2021.

(60) Provisional application No. 63/055,042, filed on Jul. 22, 2020.

(51) Int. Cl.
G06T 9/40 (2006.01)
H04N 19/96 (2014.01)

(52) U.S. Cl.
CPC ............... *G06T 9/40* (2013.01); *H04N 19/96* (2014.11)

(58) Field of Classification Search
None
See application file for complete search history.

(56) References Cited

U.S. PATENT DOCUMENTS

| 12,108,085 B2 * | 10/2024 | Iguchi | H04N 19/172 |
| 2014/0375638 A1 | 12/2014 | Tomaru et al. | |
| 2020/0252659 A1 * | 8/2020 | Lasang | H04N 19/46 |
| 2023/0419554 A1 * | 12/2023 | Chen | G06T 9/001 |

FOREIGN PATENT DOCUMENTS

| WO | 2014/020663 | 2/2014 |
| WO | 2019/082837 | 5/2019 |

OTHER PUBLICATIONS

International Search Report issued Sep. 28, 2021 in International (PCT) Application No. PCT/JP2021/027117.

* cited by examiner

*Primary Examiner* — Dov Popovici

(57) ABSTRACT

A three-dimensional data encoding method includes: encoding geometry information of a plurality of three-dimensional points represented by a tree structure; and generating a bitstream including the geometry information encoded and division number information indicating a total number of divisions of each of a plurality of nodes included in the tree structure. The division number information includes common division number information collectively indicating the total number of divisions of two or more nodes among the plurality of nodes.

12 Claims, 65 Drawing Sheets

| | GEOMETRY INFORMATION | ATTRIBUTE INFORMATION |
|---|---|---|
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

FIG. 27

```
EXAMPLES OF SEMANTICS OF pcc_nal_unit_type
(1) if pcc_codec_type == Codec 1
     0:Codec1 Goemetry
     1:Codec1 AttributeX
     2:Codec1 AttributeY
     3:Codec1 Geom. PS
     4:Codec1 AttrX. PS
     5:Codec1 AttrX. PS
     6:Codec1 Geometry Sequence PS
     7:Codec1 AttributeX Sequence PS
     8:Codec1 AttributeY Sequence PS
     9:Codec1 AU Header
    10:Codec1 GOF Header
  11 ~:Codec1 reserved for future use (2) if pcc_codec_type == Codec 2
     0:Codec2 DataA
     1:Codec2 MetaDataA
     2:Codec2 MetaDataB
   3 ~:Codec2 reserved for future use
``` tree_coded_axis_flag[depth][0]=1
tree_coded_axis_flag[depth][1]=1
tree_coded_axis_flag[depth][2]=1 tree_coded_axis_flag[depth][0]=1
tree_coded_axis_flag[depth][1]=1
tree_coded_axis_flag[depth][2]=0 tree_coded_axis_flag[depth][0]=1
tree_coded_axis_flag[depth][1]=0
tree_coded_axis_flag[depth][2]=1 tree_coded_axis_flag[depth][0]=0
tree_coded_axis_flag[depth][1]=1
tree_coded_axis_flag[depth][2]=1 tree_coded_axis_flag[depth][0]=1
tree_coded_axis_flag[depth][1]=0
tree_coded_axis_flag[depth][2]=0 tree_coded_axis_flag[depth][0]=0
tree_coded_axis_flag[depth][1]=1
tree_coded_axis_flag[depth][2]=0 tree_coded_axis_flag[depth][0]=0
tree_coded_axis_flag[depth][1]=0
tree_coded_axis_flag[depth][2]=1

FIG.44

```
pc_header() {
...
tree_coded_axis_list_present_flag
tree_depth_minus1
...
if (tree_coded_axis_list_present_flag) {
 depth=0
 do {
  for(k=0;k<3;k++) {
   tree_coded_axis_flag[depth][k]
  }
  depth++
 }
 while(depth<=tree_depth_minus1 &&
       (tree_coded_axis_flag[depth-1][0] |
        tree_coded_axis_flag[depth-1][1] |
        tree_coded_axis_flag[depth-1][2]))
}
...
}
```

FIG. 45
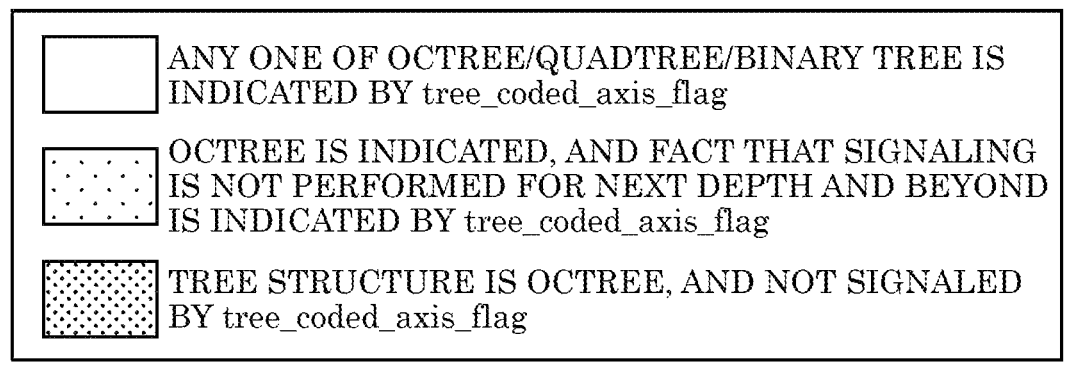
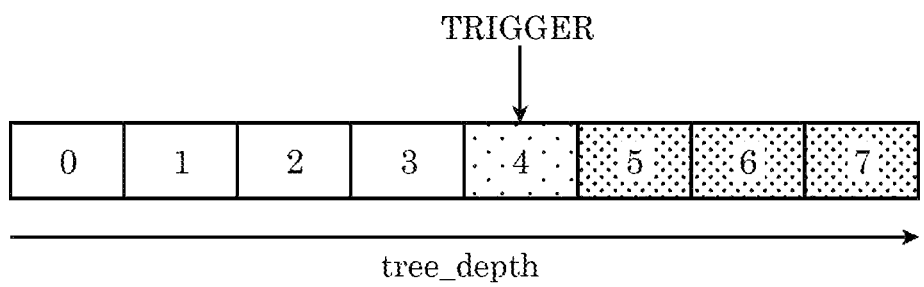

FIG. 46

```
pc_header() {
...
tree_coded_axis_list_present_flag
tree_depth_minus1
multi_tree_depth_minus1
...
if (tree_coded_axis_list_present_flag) {
  for(depth=0; depth<=multi_tree_depth_minus1;depth ++){
    for(k=0;k<3;k++) {
      tree_coded_axis_flag[depth][k]
    }
  }
}
...
}
```

FIG. 49

```
pc_header() {
 tree_coded_axis_list_present_flag
 tree_depth_minus1
 num_end_flag
 if (tree_coded_axis_list_present_flag) {
  depth=0
  do {
   for(k=0;k<3;k++) {
      tree_coded_axis_flag[depth][k]
   }
    depth++
  }
  while(depth<=tree_depth_minus1 &&
        (tree_coded_axis_flag[depth-1][0] |
         tree_coded_axis_flag[depth-1][1] |
         tree_coded_axis_flag[depth-1][2]))
   for(depth=0; depth<= num_end_flag_minus1;depth ++){
      for(k=0;k<3;k++)  tree_coded_axis_flag[depth][k];
   }
 }
}
```

FIG. 50
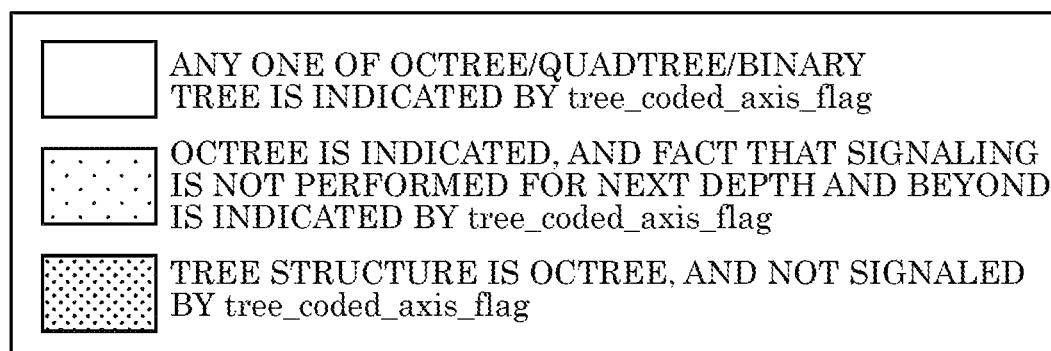
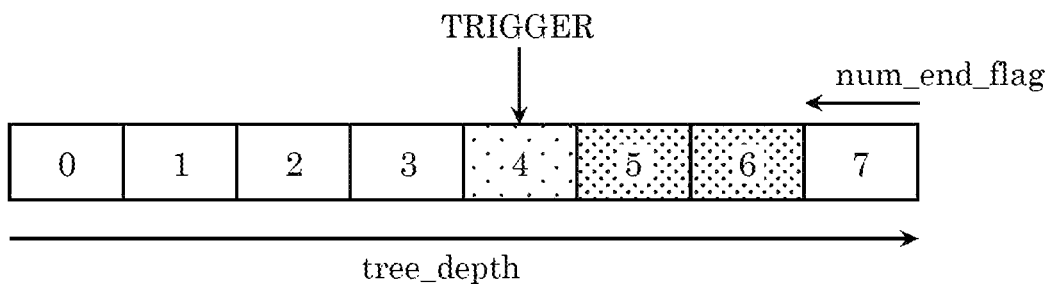

FIG. 51

```
pc_header() {
...
tree_coded_axis_list_present_flag
tree_depth_minus1
multi_tree_depth_minus1
num_end_flag
if (tree_coded_axis_list_present_flag) {
  for(depth=0; depth<=multi_tree_depth_minus1;depth ++){
    for(k=0;k<3;k++) {
       tree_coded_axis_flag[depth][k]
    }
  }
 for(depth=0; depth<= num_end_flag_minus1;depth ++){
    for(k=0;k<3;k++) tree_coded_axis_flag[depth][k];
 }
 }
}
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2021/027117 filed on Jul. 20, 2021, claiming the benefit of priority of U.S. Provisional Patent Application No. 63/055,042 filed on Jul. 22, 2020, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (see, for example, Patent Literature (PTL) 1 (International Publication WO 2014/020663)).

SUMMARY

There is a demand for reducing the data amount of a bitstream including encoded three-dimensional data.

The present disclosure provides a three-dimensional data encoding method, a three-dimensional data decoding method, a three-dimensional data encoding device, or a three-dimensional decoding device capable of reducing the data amount.

A three-dimensional data encoding method according to an aspect of the present disclosure includes: encoding geometry information of a plurality of three-dimensional points represented by a tree structure; and generating a bitstream including the geometry information encoded and division number information indicating a total number of divisions of each of a plurality of nodes included in the tree structure, wherein the division number information includes common division number information collectively indicating the total number of divisions of two or more nodes among the plurality of nodes.

A three-dimensional data decoding method according to an aspect of the present disclosure includes: obtaining a bitstream including encoded geometry information and division number information, the encoded geometry information being geometry information of a plurality of three-dimensional points represented by a tree structure, the division number information indicating a total number of divisions of each of a plurality of nodes included in the tree structure; and decoding the encoded geometry information based on the division number information, wherein the division number information includes common division number information collectively indicating the total number of divisions of two or more nodes among the plurality of nodes.

The present disclosure can provide a three-dimensional data encoding method, a three-dimensional data decoding method, a three-dimensional data encoding device, or a three-dimensional decoding device capable of reducing the data amount.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 27 is a diagram illustrating a semantics example of pcc_nal_unit_type according to Embodiment 2;

FIG. 44 is a diagram illustrating a first example of the syntax of header information according to Embodiment 3;

FIG. 45 is a diagram for describing a first example of the relationship between the depth and the number of divisions in a tree structure according to Embodiment 3;

FIG. 46 is a diagram illustrating a second example of the syntax of header information according to Embodiment 3;

FIG. 49 is a diagram illustrating a third example of the syntax of header information according to Embodiment 3;

FIG. 50 is a diagram for describing a third example of the relationship between the depth and the number of divisions in a tree structure according to Embodiment 3;

FIG. 51 is a diagram illustrating a fourth example of the syntax of header information according to Embodiment 3;

DETAILED DESCRIPTION OF THE EMBODIMENTS

Figure 1:
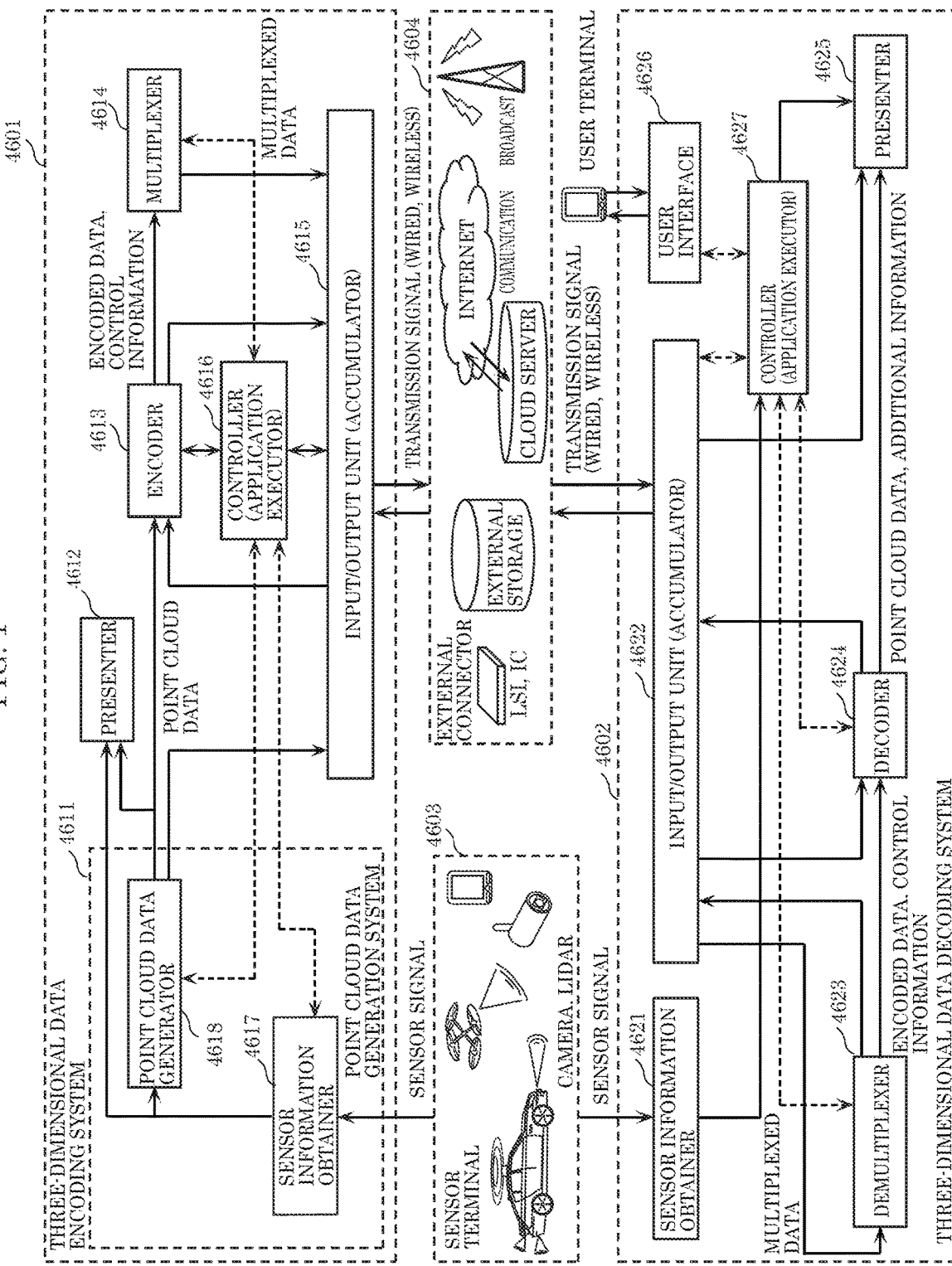
FIG. 1 is a diagram illustrating a configuration of a three-dimensional data encoding and decoding system according to Embodiment 1.

A three-dimensional data encoding method according to an aspect of the present disclosure includes: encoding geometry information of a plurality of three-dimensional points represented by a tree structure; and generating a bitstream including the geometry information encoded and division number information indicating a total number of divisions of each of a plurality of nodes included in the tree structure. The division number information includes common division number information collectively indicating the total number of divisions of two or more nodes among the plurality of nodes.

Accordingly, for nodes in which the number of divisions is the same, information indicating the number of divisions is collected as common information. Therefore, the data amount included in the bitstream can be reduced.

Furthermore, for example, among the plurality of nodes, nodes located at a same depth in the tree structure are divided into a same number of divisions. The division number information indicates the total number of divisions of nodes for each of depths in the tree structure, and the common division number information collectively indicates the total number of divisions of nodes for two or more of the depths.

Accordingly, for nodes in which the number of divisions is the same, information indicating the number of divisions is collected as common information for a plurality of depths. Therefore, the data amount included in the bitstream can be reduced.

Furthermore, for example, the common division number information includes trigger information indicating that nodes have a same number of divisions from a predetermined depth and beyond in the tree structure.

Accordingly, nodes that have the same number of divisions can be easily indicated by means of trigger information.

Furthermore, for example, the common division number information further includes end depth information indicating an end depth up to which the number of divisions of nodes from the predetermined depth is the same.

Accordingly, for example, when the numbers of divisions of nodes are viewed in order from the shallowest depth, if the number of divisions of nodes is successively the same from an intermediate depth, the number of divisions of the nodes can be easily indicated.

Furthermore, for example, the plurality of nodes each correspond to at least part of a space in a three-axis orthogonal coordinate system. The division number information includes flag information indicating, for each of depths in the tree structure, whether to divide the space in each of three axial directions of the three-axis orthogonal coordinate system. The trigger information is the flag information indicating not to divide the space in each of the three axial directions.

Accordingly, trigger information can be easily indicated using the flag information.

Furthermore, a three-dimensional data decoding method according to an aspect of the present disclosure includes: obtaining a bitstream including encoded geometry information and division number information, the encoded geometry information being geometry information of a plurality of three-dimensional points represented by a tree structure, the division number information indicating a total number of divisions of each of a plurality of nodes included in the tree structure; and decoding the encoded geometry information based on the division number information. The division number information includes common division number information collectively indicating the total number of divisions of two or more nodes among the plurality of nodes.

Accordingly, for nodes in which the number of divisions is the same, information indicating the number of divisions is collected as common information. Therefore, the data amount included in the bitstream can be reduced.

Furthermore, for example, among the plurality of nodes, nodes located at a same depth in the tree structure are divided into a same number of divisions. The division number information indicates the total number of divisions of nodes for each of depths in the tree structure, and the common division number information collectively indicates the total number of divisions of nodes for two or more of the depths.

Accordingly, for nodes in which the number of divisions is the same, information indicating the number of divisions is collected as common information for a plurality of depths. Therefore, the data amount included in the bitstream can be reduced.

Furthermore, for example, the common division number information includes trigger information indicating that nodes have a same number of divisions from a predetermined depth and beyond in the tree structure.

Accordingly, the number of divisions of nodes can be easily determined by means of trigger information.

Furthermore, for example, the common division number information further includes end depth information indicating an end depth up to which the number of divisions of nodes from the predetermined depth is the same.

Accordingly, for example, when the numbers of divisions of nodes are viewed in order from the shallowest depth, if the number of divisions of nodes is successively the same from an intermediate depth, the number of divisions of the nodes can be easily determined.

Furthermore, for example, the plurality of nodes each correspond to at least part of a space in a three-axis orthogonal coordinate system. The division number information includes flag information indicating, for each of depths in the tree structure, whether to divide the space in each of three axial directions of the three-axis orthogonal coordinate system. The trigger information is the flag information indicating not to divide the space in each of the three axial directions.

Accordingly, the number of division of nodes can be appropriately determined even with trigger information that is simply indicated using flag information.

Furthermore, a three-dimensional data encoding device according to an aspect of the present disclosure includes: a processor; and memory. Using the memory, the processor: encodes geometry information of a plurality of three-dimensional points represented by a tree structure; and generates a bitstream including the geometry information encoded and division number information indicating a total number of divisions of each of a plurality of nodes included in the tree structure. The division number information includes common division number information collectively indicating the total number of divisions of two or more nodes among the plurality of nodes.

Accordingly, for nodes in which the number of divisions is the same, information indicating the number of divisions is collected as common information. Therefore, the data amount included in the bitstream can be reduced.

A three-dimensional data decoding device according to an aspect of the present disclosure includes: a processor; and memory. Using the memory, the processor: obtains a bitstream including encoded geometry information and division number information, the encoded geometry information being geometry information of a plurality of three-dimensional points represented by a tree structure, the division number information indicating a total number of divisions of each of a plurality of nodes included in the tree structure; and decodes the encoded geometry information based on the division number information. The division number information includes common division number information collectively indicating the total number of divisions of two or more nodes among the plurality of nodes.

Accordingly, for nodes in which the number of divisions is the same, information indicating the number of divisions is collected as common information. Therefore, the data amount included in the bitstream can be reduced.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims that indicate the broadest concepts will be described as optional constituent elements.

Embodiment 1

When using encoded data of a point cloud in a device or for a service in practice, required information for the application is desirably transmitted and received in order to reduce the network bandwidth. However, conventional encoding structures for three-dimensional data have no such a function, and there is &so no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

A configuration of a three-dimensional data (point cloud data) encoding and decoding system according to this embodiment will be first described, FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614, Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627. Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LiDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include aft temperature, aft pressure, air humidity, or magnetism, for example.

External connector 4604 is implemented by an integrated circuit (LSI or IC), an external accumulator, communication with a cloud server via the Internet, or broadcasting, for example.

Figures 2, 3:
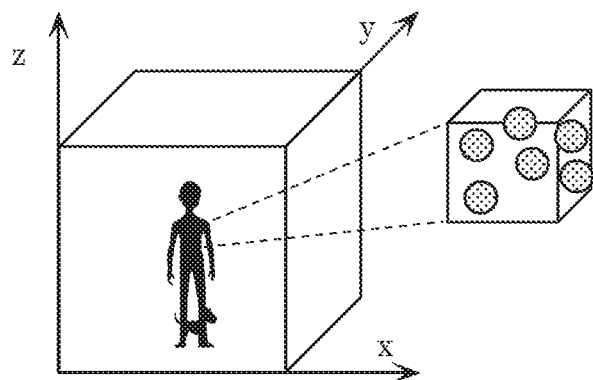
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One item of attribute information (in other words, a piece of attribute information or an attribute information item) may be associated with one item of geometry information (in other words, a piece of geometry information or a geometry information item), or attribute information on a plurality of different types of attributes may be associated with one item of geometry information. Alternatively, items of attribute information on the same type of attribute may be associated with one item of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
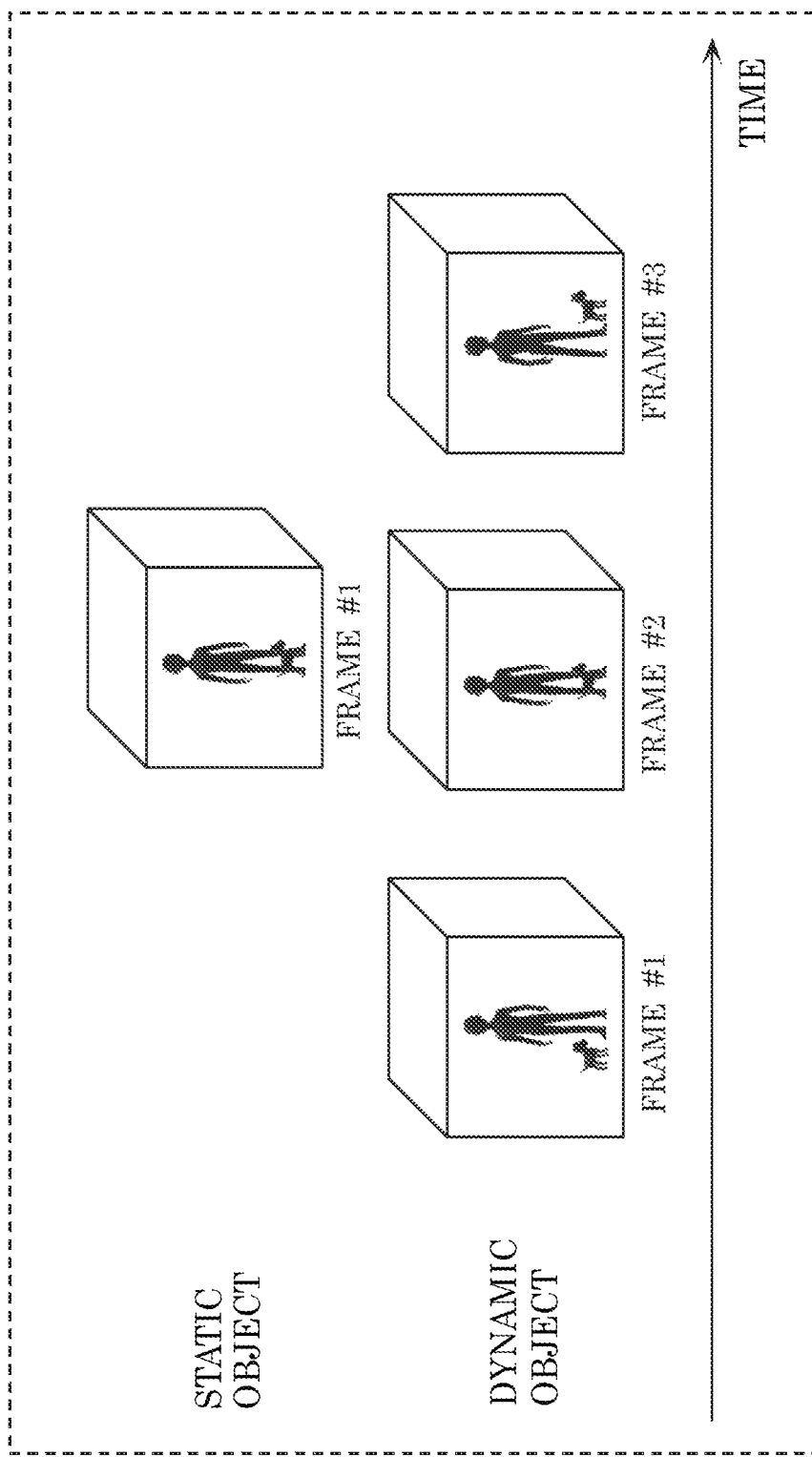
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LiDAR or a range finder, a stereo camera, or a combination of a plurality of monocular cameras, Point cloud data generator 4618 generates point cloud data based on the sensor information obtained by sensor information obtainer 4617, Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

Figure 5:
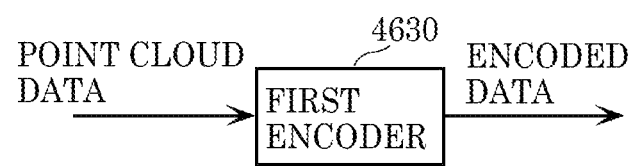
FIG. 5 is a diagram illustrating a structure of a first encoder according to Embodiment 1.
Figure 6:
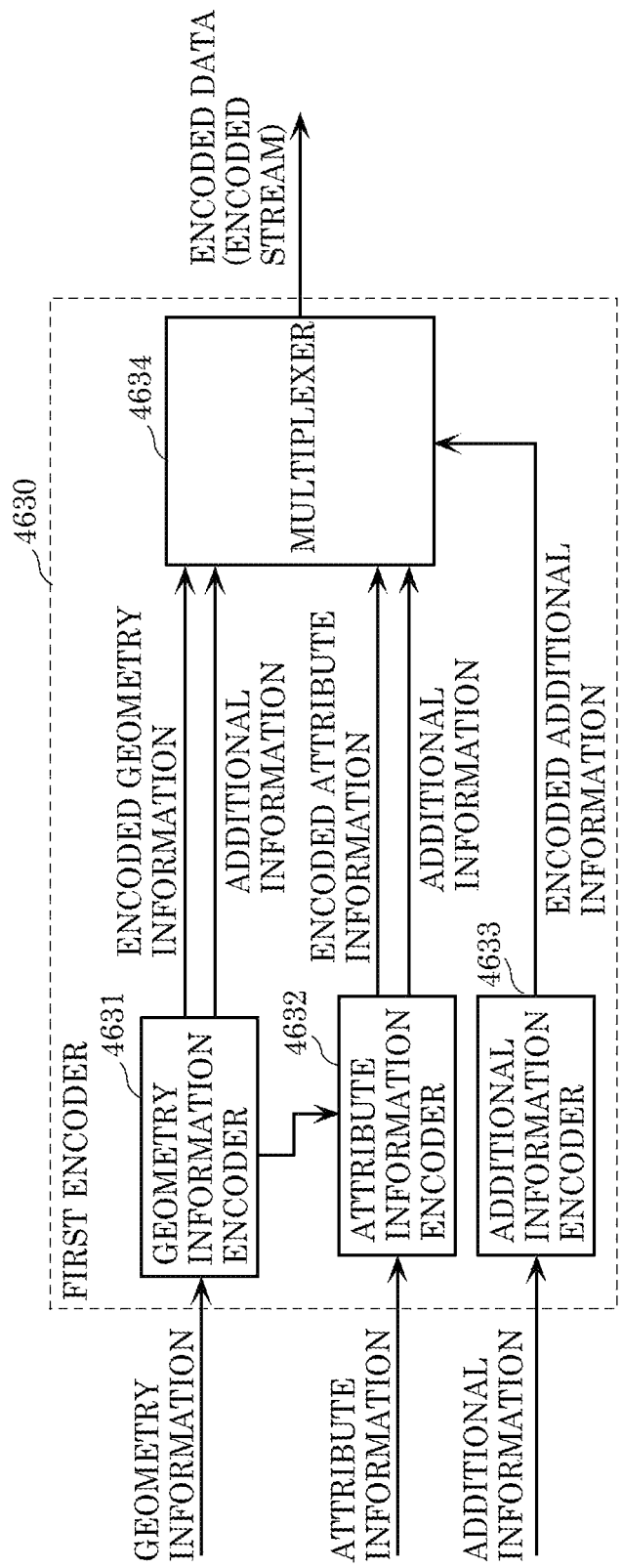
FIG. 6 is a block diagram illustrating the first encoder according to Embodiment 1.

As a broadcasting scheme, DVB-T2, DVB-S2, DVB-C2, ATSC3.0, or ISDB-S3 is used, for example, FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space (target space) is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (in other words, a current node or a target node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
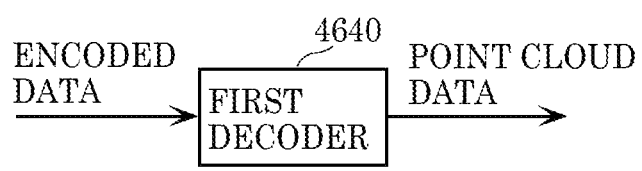
FIG. 7 is a diagram illustrating a structure of a first decoder according to Embodiment 1.
Figure 8:
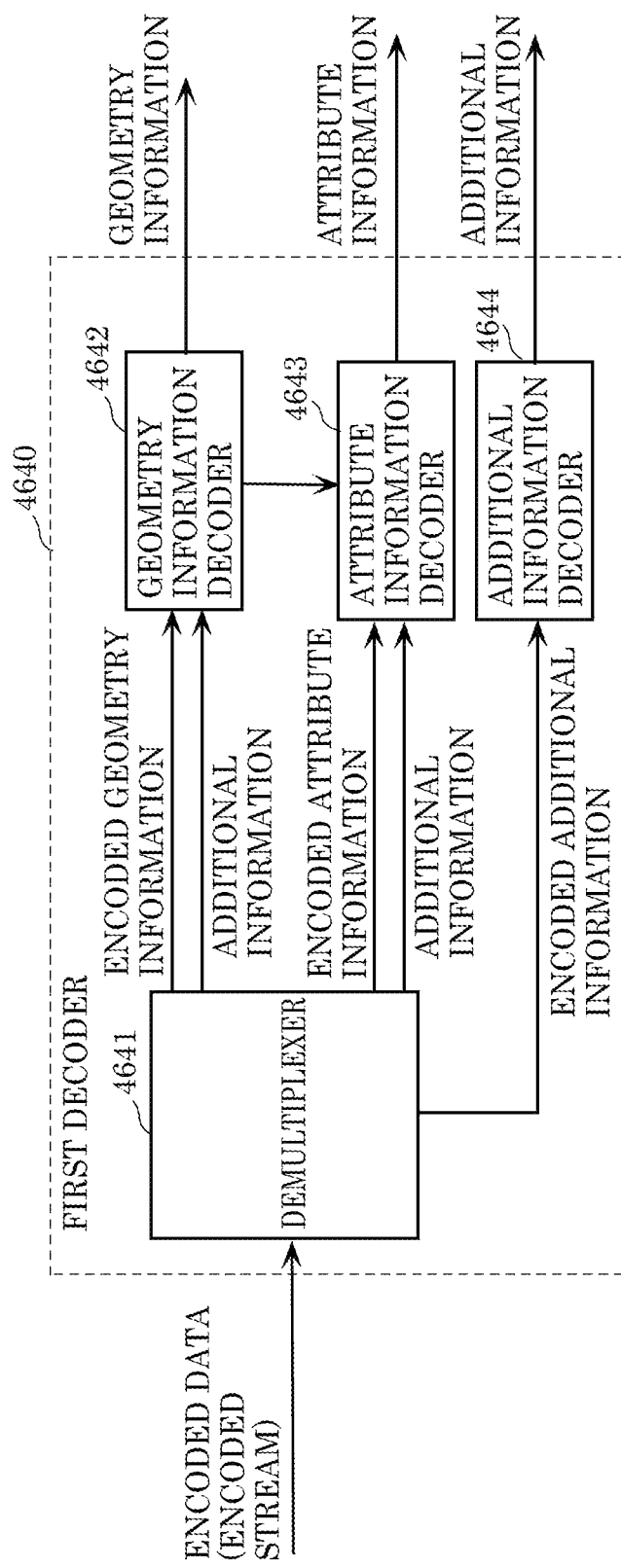
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method, First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information, First decoder 4640 uses additional information required for the decoding process for the geometry information and the attribute information in the decoding, and outputs additional information required for an application to the outside.

Figure 9:
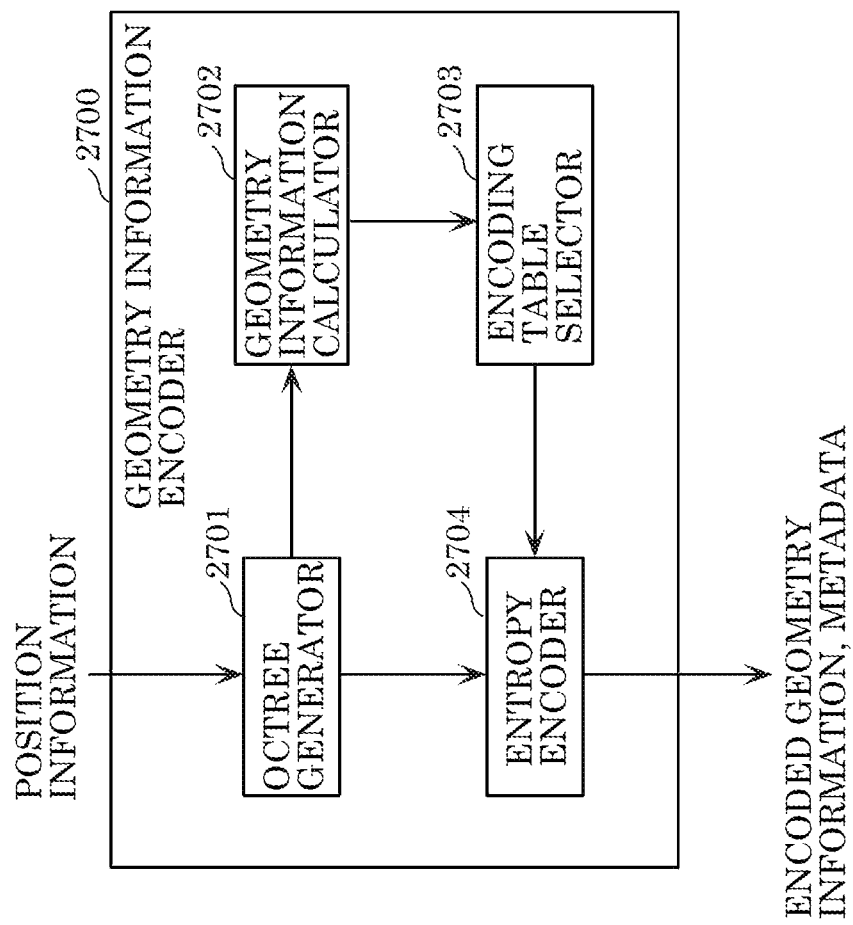
FIG. 9 is a block diagram of a three-dimensional data encoding device according to Embodiment 1.

Next, an example configuration of a geometry information encoder will be described. FIG. 9 is a block diagram of geometry information encoder 2700 according to this embodiment. Geometry information encoder 2700 includes octree generator 2701, geometry information calculator 2702, encoding table selector 2703, and entropy encoder 2704.

Octree generator 2701 generates an octree, for example, from input position information, and generates an occupancy code of each node of the octree. Geometry information calculator 2702 obtains information that indicates whether a neighboring node of a current node (target node) is an occupied node or not. For example, geometry information calculator 2702 calculates occupancy information on a neighboring node from an occupancy code of a parent node to which a current node belongs (information that indicates whether a neighboring node is an occupied node or not). Geometry information calculator 2702 may save an encoded node in a list and search the list for a neighboring node. Note that geometry information calculator 2702 may change neighboring nodes in accordance with the position of the current node in the parent node.

Encoding table selector 2703 selects an encoding table used for entropy encoding of the current node based on the occupancy information on the neighboring node calculated by geometry information calculator 2702. For example, encoding table selector 2703 may generate a bit sequence based on the occupancy information on the neighboring node and select an encoding table of an index number generated from the bit sequence.

Entropy encoder 2704 generates encoded geometry information and metadata by entropy-encoding the occupancy code of the current node using the encoding table of the selected index number. Entropy encoder may add, to the encoded geometry information, information that indicates the selected encoding table.

Figure 10:
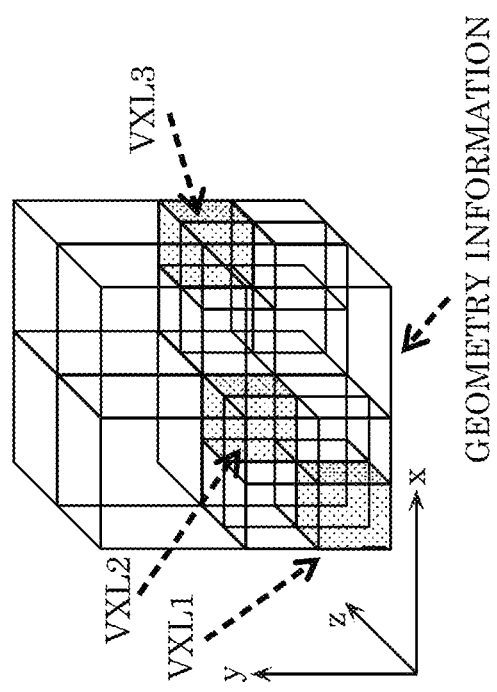
FIG. 10 is a diagram showing an example of geometry information according to Embodiment 1.
Figure 11:
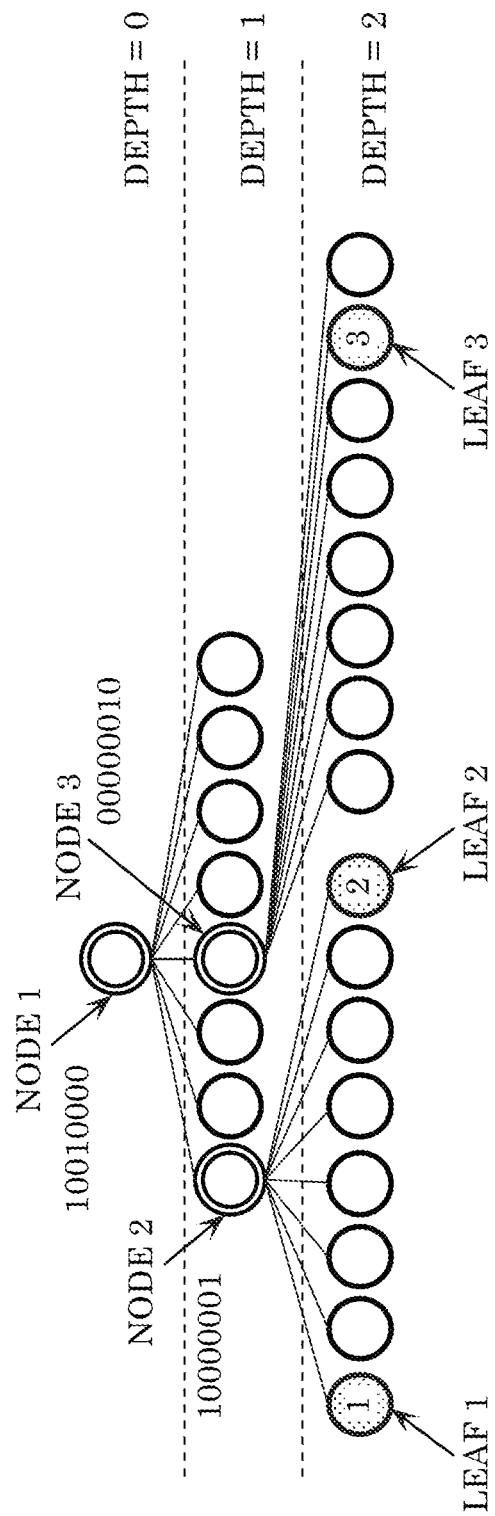
FIG. 11 is a diagram showing an example of an octree representation of geometry information according to Embodiment 1.

In the following, an octree representation and a scan order for geometry information will be described. Geometry information (geometry data) is transformed into an octree structure (octree transform) and then encoded. The octree structure includes nodes and leaves. Each node has eight nodes or leaves, and each leaf has voxel (VXL) information. FIG. 10 is a diagram showing an example structure of geometry information including a plurality of voxels. FIG. 11 is a diagram showing an example in which the geometry information shown in FIG. 10 is transformed into an octree structure. Here, of leaves shown in FIG. 11, leaves 1, 2, and 3 represent voxels VXL1, VXL2, and VXL3 shown in FIG. 10, respectively, and each represent VXL containing a point cloud (referred to as a valid VXL, hereinafter).

Specifically, node 1 corresponds to the entire space comprising the geometry information in FIG. 10, The entire space corresponding to node 1 is divided into eight nodes, and among the eight nodes, a node containing valid VXL is further divided into eight nodes or leaves. This process is repeated for every layer of the tree structure. Here, each node corresponds to a subspace, and has information (occupancy code) that indicates where the next node or leaf is located after division as node information. A block in the bottom layer is designated as a leaf and retains the number of the points contained in the leaf as leaf information.

Figure 12:
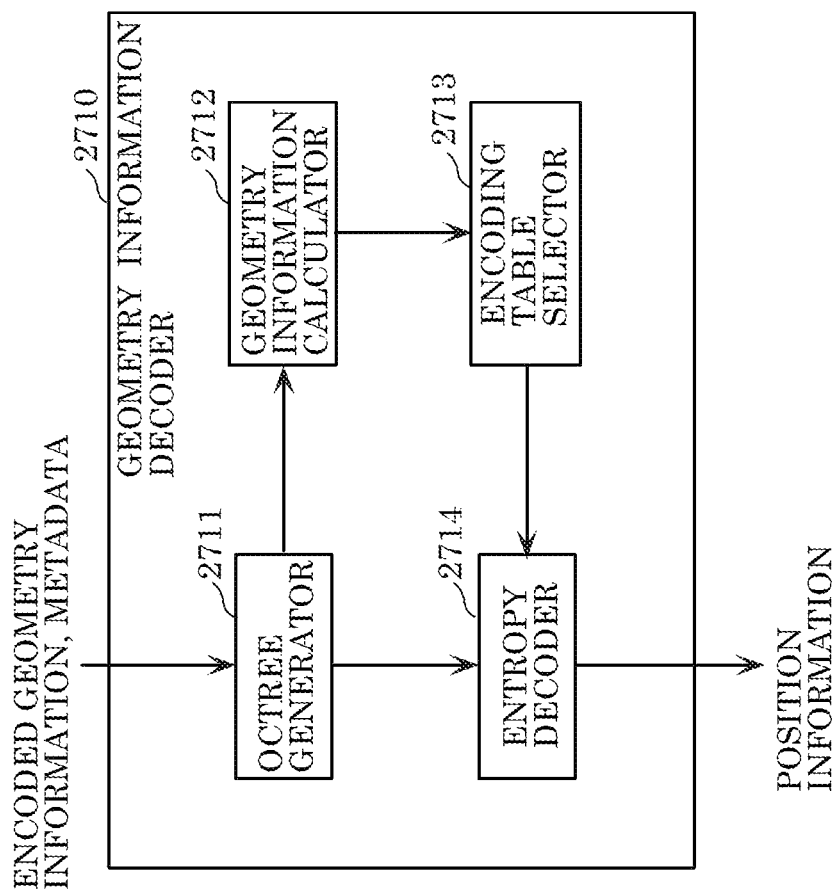
FIG. 12 is a block diagram of a three-dimensional data decoding device according to Embodiment 1.

Next, an example configuration of a geometry information decoder will be described. FIG. 12 is a block diagram of geometry information decoder 2710 according to this embodiment. Geometry information decoder 2710 includes octree generator 2711, geometry information calculator 2712, encoding table selector 2713, and entropy decoder 2714.

Octree generator 2711 generates an octree of a space (node) based on header information, metadata or the like of a bitstream. For example, octree generator 2711 generates an octree by generating a large space (root node) based on the sizes of a space in an x-axis direction, a y-axis direction, and a z-axis direction added to the header information and dividing the space into two parts in the x-axis direction, the y-axis direction, and the z-axis direction to generate eight small spaces A (nodes A0 to A7). Nodes A0 to A7 are sequentially designated as a current node.

Geometry information calculator 2712 obtains occupancy information that indicates whether a neighboring node of a current node is an occupied node or not. For example, geometry information calculator 2712 calculates occupancy information on a neighboring node from an occupancy code of a parent node to which a current node belongs. Geometry information calculator 2712 may save a decoded node in a list and search the list for a neighboring node. Note that geometry information calculator 2712 may change neighboring nodes in accordance with the position of the current node in the parent node.

Encoding table selector 2713 selects an encoding table (decoding table) used for entropy decoding of the current node based on the occupancy information on the neighboring node calculated by geometry information calculator 2712. For example, encoding table selector 2713 may generate a bit sequence based on the occupancy information on the neighboring node and select an encoding table of an index number generated from the bit sequence.

Entropy decoder 2714 generates position information by entropy-decoding the occupancy code of the current node using the selected encoding table, Note that entropy decoder 2714 may obtain information on the selected encoding table by decoding the bitstream, and entropy-decode the occupancy code of the current node using the encoding table indicated by the information.

Figure 13:
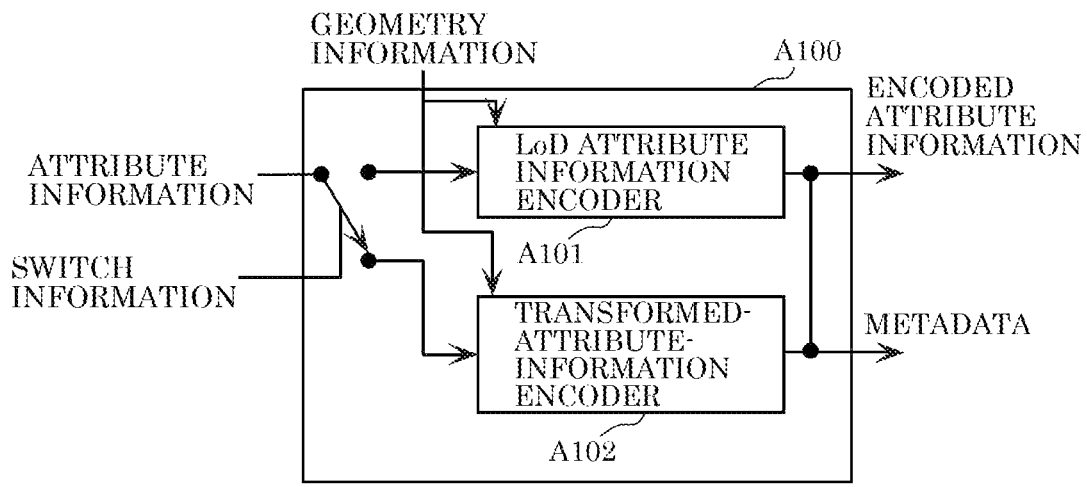
FIG. 13 is a block diagram of an attribute information encoder according to Embodiment 1.

In the following, configurations of an attribute information encoder and an attribute information decoder will be described. FIG. 13 is a block diagram showing an example configuration of attribute information encoder A100. The attribute information encoder may include a plurality of encoders that perform different encoding methods. For example, the attribute information encoder may selectively use any of the two methods described below in accordance with the use case.

Attribute information encoder A100 includes LoD attribute information encoder A101 and transformed-attribute-information encoder A102. LoD attribute information encoder A101 classifies three-dimensional points into a plurality of layers based on geometry information on the three-dimensional points, predicts attribute information on three-dimensional points belonging to each layer, and encodes a prediction residual therefor. Here, each layer into which a three-dimensional point is classified is referred to as a level of detail (LoD).

Transformed-attribute-information encoder A102 encodes attribute information using region adaptive hierarchical transform (RAHT), Specifically, transformed-attribute-information encoder A102 generates a high frequency component and a low frequency component for each layer by applying RAHT or Haar transform to each item of attribute information based on the geometry information on three-dimensional points, and encodes the values by quantization, entropy encoding or the like.

Figure 14:
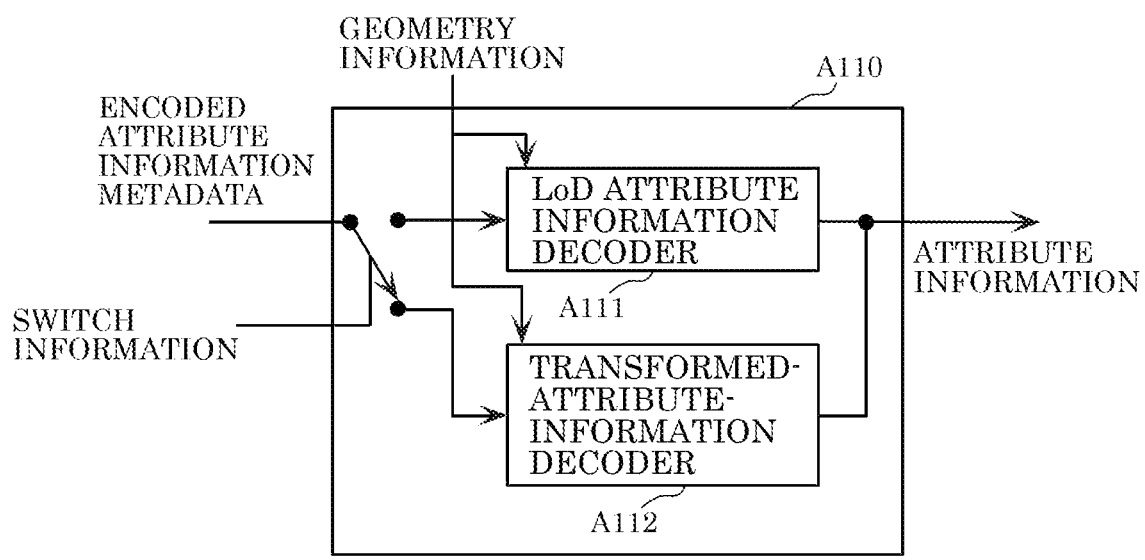
FIG. 14 is a block diagram of an attribute information decoder according to Embodiment 1.

FIG. 14 is a block diagram showing an example configuration of attribute information decoder A110, The attribute information decoder may include a plurality of decoders that perform different decoding methods. For example, the attribute information decoder may selectively use any of the two methods described below for decoding based on the information included in the header or metadata.

Attribute information decoder A110 includes LoD attribute information decoder A111 and transformed-attribute-information decoder A112. LoD attribute information decoder A111 classifies three-dimensional points into a plurality of layers based on the geometry information on the three-dimensional points, predicts attribute information on three-dimensional points belonging to each layer, and decodes attribute values thereof.

Transformed-attribute-information decoder A112 decodes attribute information using region adaptive hierarchical transform (RAHT). Specifically, transformed-attribute-information decoder A112 decodes each attribute value by applying inverse RAHT or inverse Haar transform to the high frequency component and the low frequency component of the attribute value based on the geometry information on the three-dimensional point.

Figure 15:
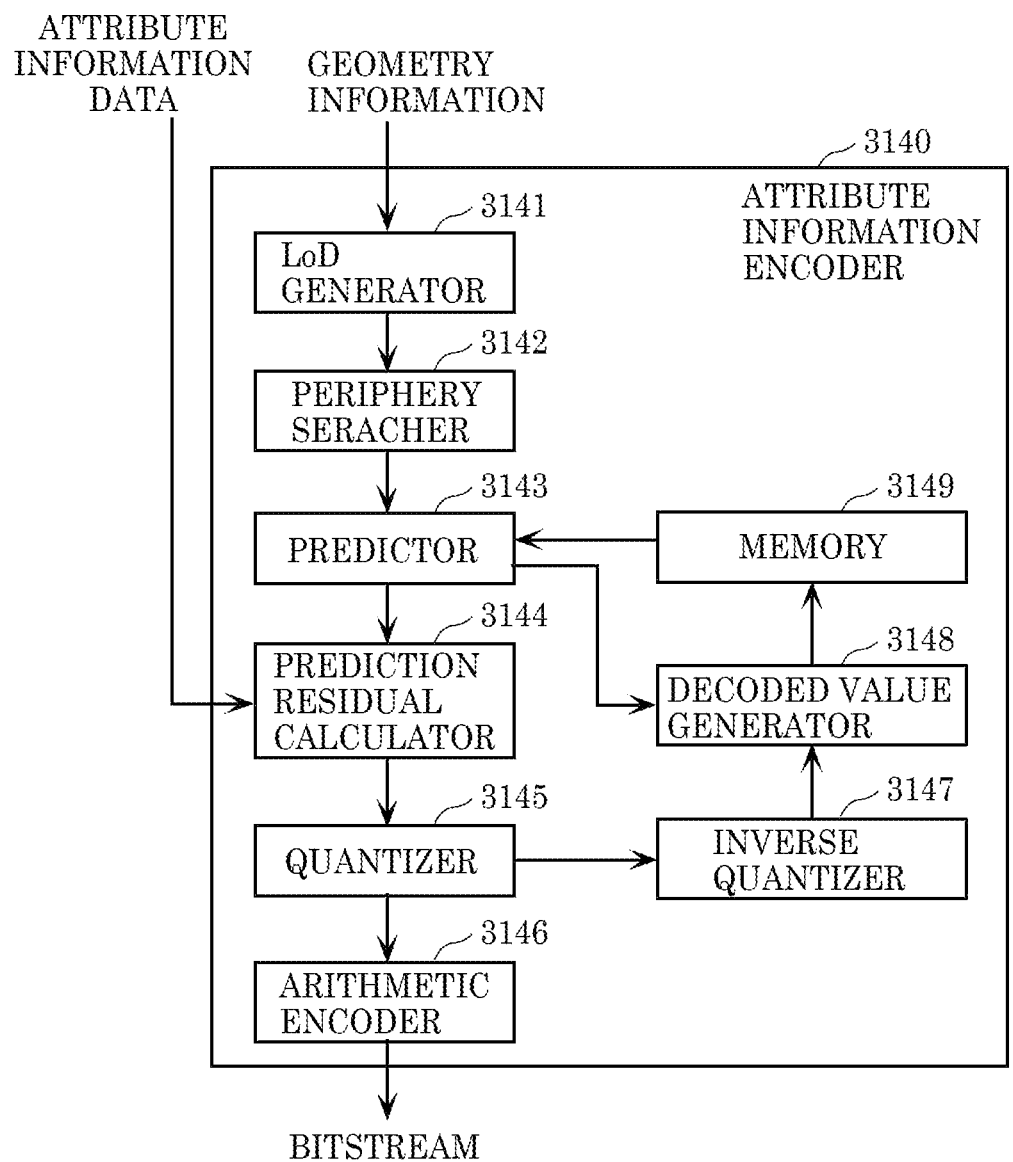
FIG. 15 is a block diagram showing a configuration of the attribute information encoder according to the variation of Embodiment 1.

FIG. 15 is a block diagram showing a configuration of attribute information encoder 3140 that is an example of LoD attribute information encoder A101.

Attribute information encoder 3140 includes LoD generator 3141, periphery searcher 3142, predictor 3143, prediction residual calculator 3144, quantizer 3145, arithmetic encoder 3146, inverse quantizer 3147, decoded value generator 3148, and memory 3149.

LoD generator 3141 generates an LoD using geometry information on a three-dimensional point.

Periphery searcher 3142 searches for a neighboring three-dimensional point neighboring each three-dimensional point using a result of LoD generation by LoD generator 3141 and distance information indicating distances between three-dimensional points.

Predictor 3143 generates a predicted value of an item of attribute information on a current (target) three-dimensional point to be encoded.

Prediction residual calculator 3144 calculates (generates) a prediction residual of the predicted value of the item of the attribute information generated by predictor 3143.

Quantizer 3145 quantizes the prediction residual of the item of attribute information calculated by prediction residual calculator 3144.

Arithmetic encoder 3146 arithmetically encodes the prediction residual quantized by quantizer 3145. Arithmetic encoder 3146 outputs a bitstream including the arithmetically encoded prediction residual to the three-dimensional data decoding device, for example.

The prediction residual may be binarized by quantizer 3145 before being arithmetically encoded by arithmetic encoder 3146.

Arithmetic encoder 3146 may initialize the encoding table used for the arithmetic encoding before performing the arithmetic encoding. Arithmetic encoder 3146 may initialize the encoding table used for the arithmetic encoding for each layer, Arithmetic encoder 3146 may output a bitstream including information that indicates the position of the layer at which the encoding table is initialized.

Inverse quantizer 3147 inverse-quantizes the prediction residual quantized by quantizer 3145.

Decoded value generator 3148 generates a decoded value by adding the predicted value of the item of attribute information generated by predictor 3143 and the prediction residual inverse-quantized by inverse quantizer 3147 together.

Memory 3149 is a memory that stores a decoded value of an item of attribute information on each three-dimensional point decoded by decoded value generator 3148. For example, when generating a predicted value of a three-dimensional point yet to be encoded, predictor 3143 may generate the predicted value using a decoded value of an item of attribute information on each three-dimensional point stored in memory 3149.

Figure 16:
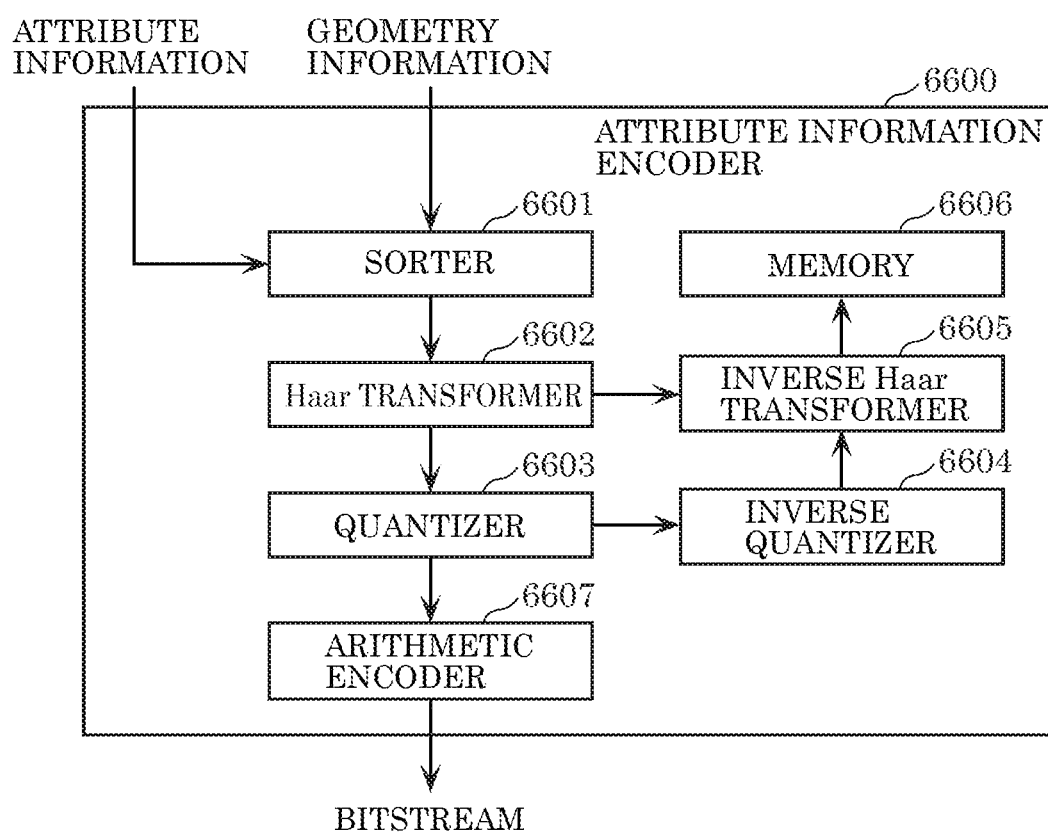
FIG. 16 is a block diagram of the attribute information encoder according to Embodiment 1.

FIG. 16 is a block diagram of attribute information encoder 6600 that is an example of transformation attribute information encoder A102. Attribute information encoder 6600 includes sorter 6601, Haar transformer 6602, quantizer 6603, inverse quantizer 6604, inverse Haar transformer 6605, memory 6606, and arithmetic encoder 6607.

Sorter 6601 generates the Morton codes by using the geometry information of three-dimensional points, and sorts the plurality of three-dimensional points in the order of the Morton codes. Haar transformer 6602 generates the coding coefficient by applying the Haar transform to the attribute information. Quantizer 6603 quantizes the coding coefficient of the attribute information.

Inverse quantizer 6604 inverse quantizes the coding coefficient after the quantization. Inverse Haar transformer 6605 applies the inverse Haar transform to the coding coefficient. Memory 6606 stores the values of items of attribute information of a plurality of decoded three-dimensional points. For example, the attribute information of the decoded three-dimensional points stored in memory 6606 may be utilized for prediction and the like of an unencoded three-dimensional point.

Arithmetic encoder 6607 calculates ZeroCnt from the coding coefficient after the quantization, and arithmetically encodes ZeroCnt. Additionally, arithmetic encoder 6607 arithmetically encodes the non-zero coding coefficient after the quantization. Arithmetic encoder 6607 may binarize the coding coefficient before the arithmetic encoding. In addition, arithmetic encoder 6607 may generate and encode various kinds of header information.

Figure 17:
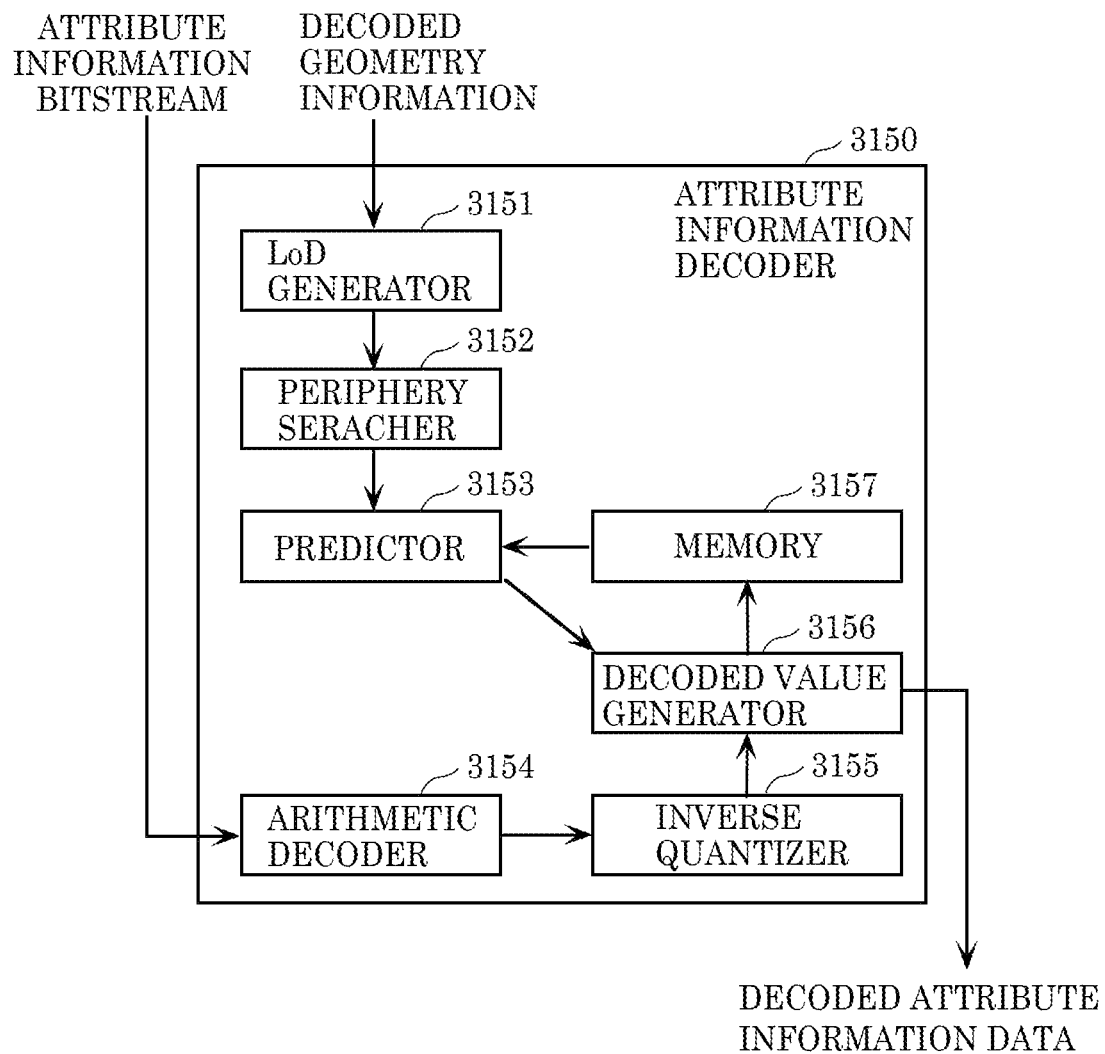
FIG. 17 is a block diagram showing a configuration of the attribute information decoder according to the variation of Embodiment 1.

FIG. 17 is a block diagram showing a configuration of attribute information decoder 3150 that is an example of LoD attribute information decoder A111.

Attribute information decoder 3150 includes LoD generator 3151, periphery searcher 3152, predictor 3153, arithmetic decoder 3154, inverse quantizer 3155, decoded value generator 3156, and memory 3157.

LoD generator 3151 generates an LoD using geometry information on a three-dimensional point decoded by the geometry information decoder (not shown in FIG. 17).

Periphery searcher 3152 searches for a neighboring three-dimensional point neighboring each three-dimensional point using a result of LoD generation by LoD generator 3151 and distance information indicating distances between three-dimensional points.

Predictor 3153 generates a predicted value of attribute information item on a current three-dimensional point to be decoded.

Arithmetic decoder 3154 arithmetically decodes the prediction residual in the bitstream obtained from attribute information encoder 3140 shown in FIG. 15. Note that arithmetic decoder 3154 may initialize the decoding table used for the arithmetic decoding. Arithmetic decoder 3154 initializes the decoding table used for the arithmetic decoding for the layer for which the encoding process has been performed by arithmetic encoder 3146 shown in FIG. 15. Arithmetic decoder 3154 may initialize the decoding table used for the arithmetic decoding for each layer. Arithmetic decoder 3154 may initialize the decoding table based on the information included in the bitstream that indicates the position of the layer for which the encoding table has been initialized.

Inverse quantizer 3155 inverse-quantizes the prediction residual arithmetically decoded by arithmetic decoder 3154.

Decoded value generator 3156 generates a decoded value by adding the predicted value generated by predictor 3153 and the prediction residual inverse-quantized by inverse quantizer 3155 together. Decoded value generator 3156 outputs the decoded attribute information data to another device.

Memory 3157 is a memory that stores a decoded value of an item of attribute information on each three-dimensional point decoded by decoded value generator 3156. For example, when generating a predicted value of a three-dimensional point yet to be decoded, predictor 3153 generates the predicted value using a decoded value of an item of attribute information on each three-dimensional point stored in memory 3157.

Figure 18:
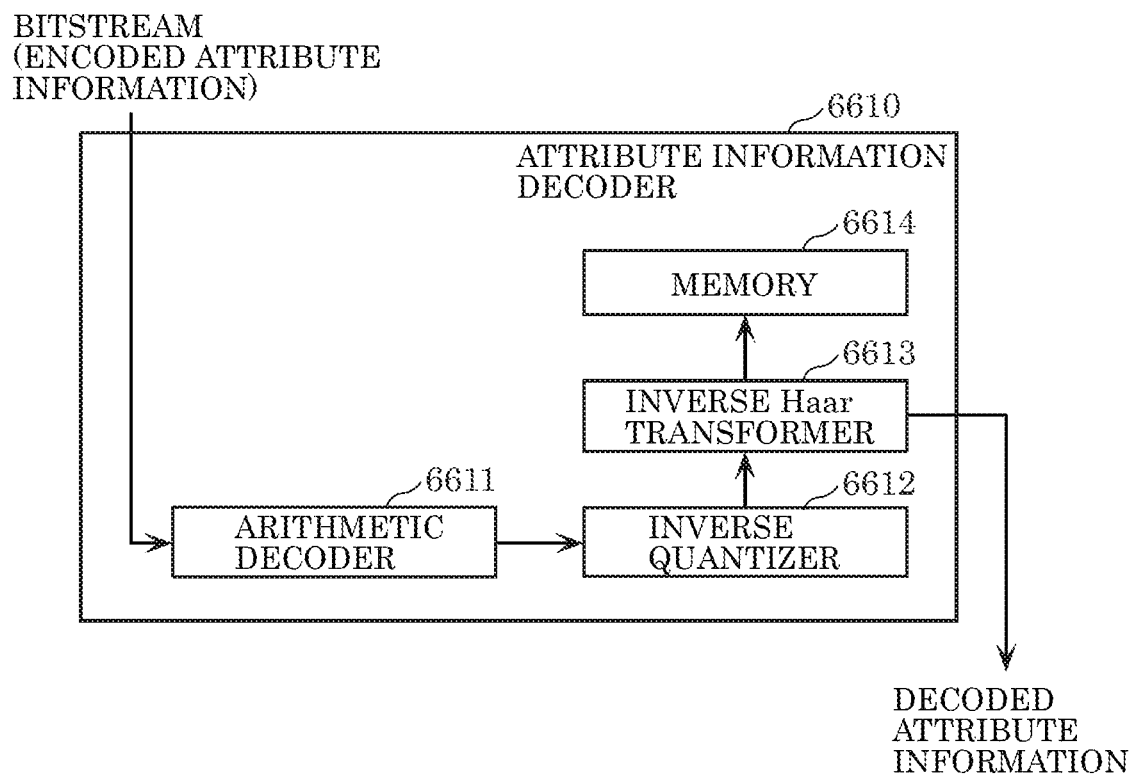
FIG. 18 is a block diagram of the attribute information decoder according to Embodiment 1.

FIG. 18 is a block diagram of attribute information decoder 6610 that is an example of transformation attribute information decoder A112. Attribute information decoder 6610 includes arithmetic decoder 6611, inverse quantizer 6612, inverse Haar transformer 6613, and memory 6614.

Arithmetic decoder 6611 arithmetically decodes ZeroCnt and the coding coefficient included in a bitstream. Note that arithmetic decoder 6611 may decode various kinds of header information.

Inverse quantizer 6612 inverse quantizes the arithmetically decoded coding coefficient. Inverse Haar transformer 6613 applies the inverse Haar transform to the coding coefficient after the inverse quantization. Memory 6614 stores the values of items of attribute information of a plurality of decoded three-dimensional points. For example, the attribute information of the decoded three-dimensional points stored in memory 6614 may be utilized for prediction of an undecoded three-dimensional point.

Figure 19:
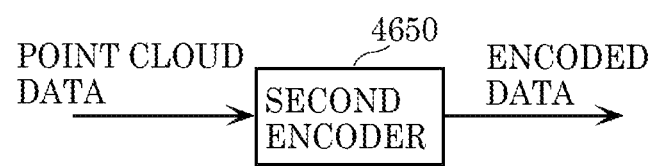
FIG. 19 is a diagram illustrating a structure of a second encoder according to Embodiment 1.
Figure 20:
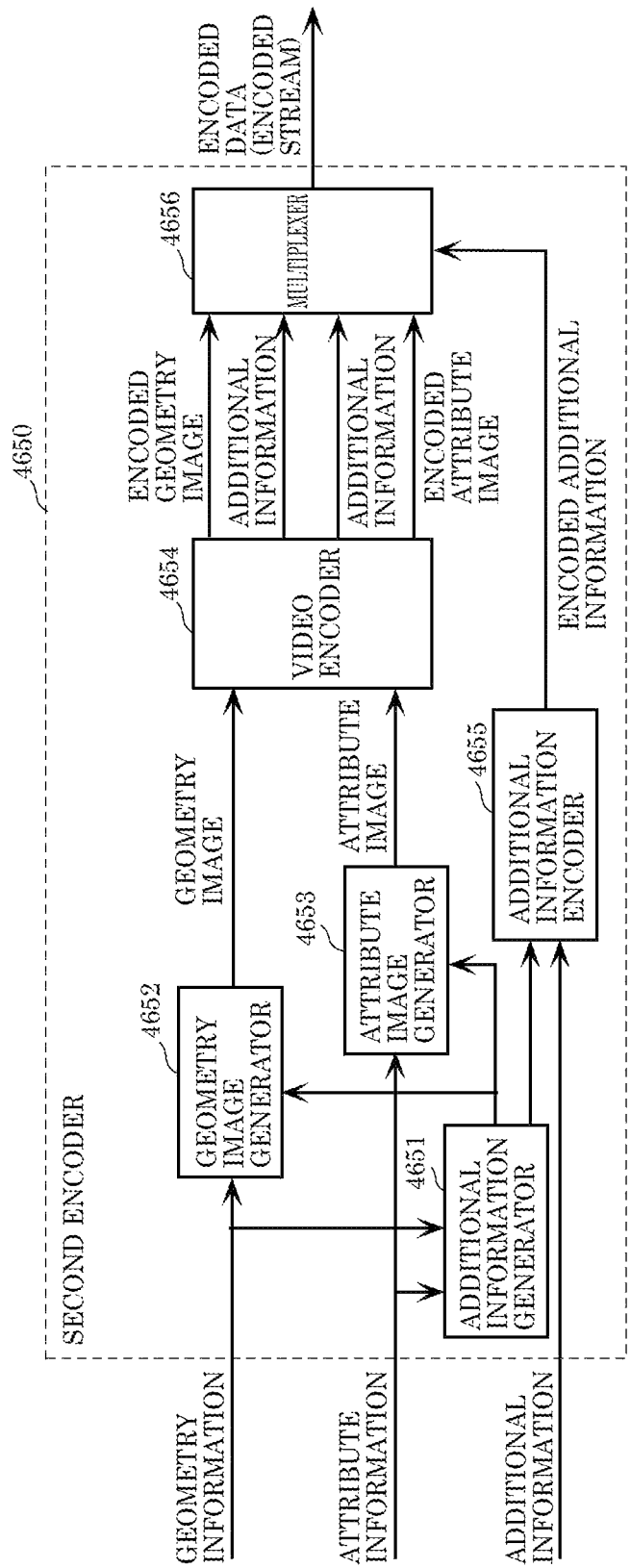
FIG. 20 is a block diagram illustrating the second encoder according to Embodiment 1.

Next, second encoder 4650, which is an example of encoder 4613 that performs encoding in the second encoding method, will be described. FIG. 19 is a diagram showing a configuration of second encoder 4650. FIG. 20 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 21:
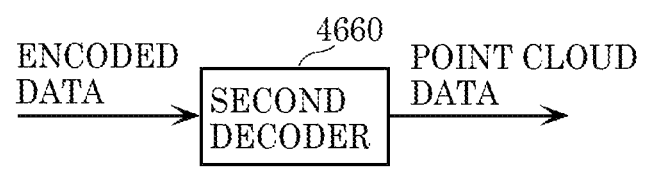
FIG. 21 is a diagram illustrating a structure of a second decoder according to Embodiment 1.
Figure 22:
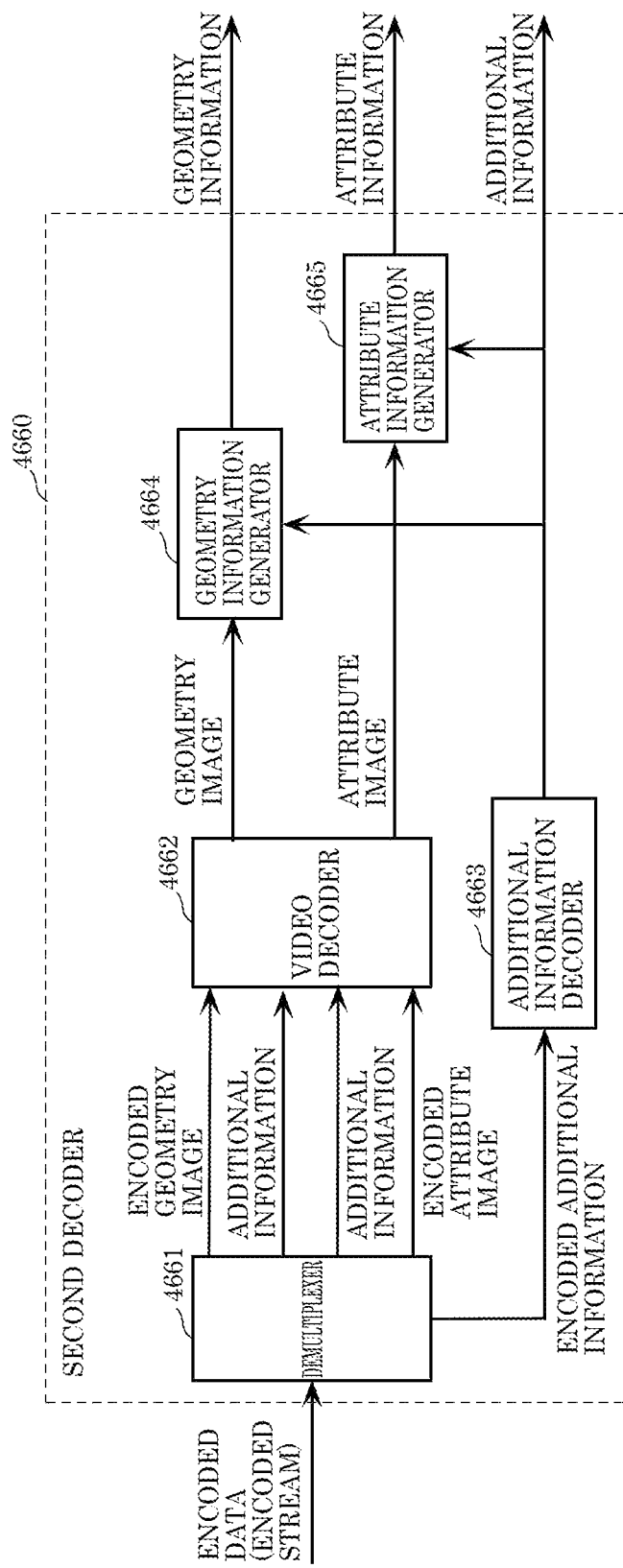
FIG. 22 is a block diagram illustrating the second decoder according to Embodiment 1.

Next, second decoder 4660, which is an example of decoder 4624 that performs decoding in the second encoding method, will be described. FIG. 21 is a diagram showing a configuration of second decoder 4660. FIG. 22 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 23:
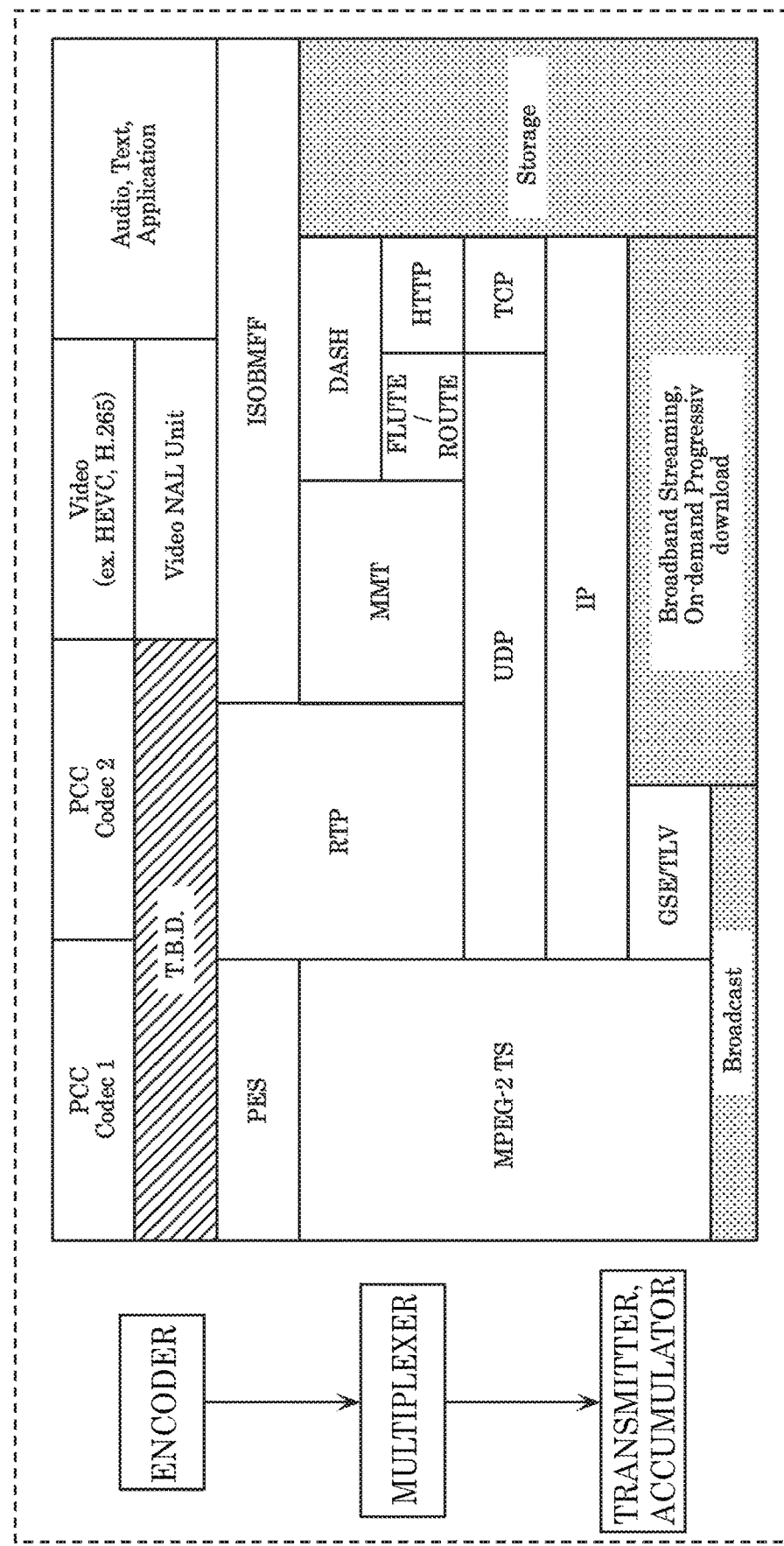
FIG. 23 is a diagram illustrating a protocol stack related to PCC encoded data according to Embodiment 1.

In the following, a problem with the PCC encoding scheme will be described. FIG. 23 is a diagram showing a protocol stack relating to PCC-encoded data. FIG. 23 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Coded1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

Embodiment 2

In this embodiment, types of the encoded data (geometry information (geometry), attribute information (attribute), and addition& information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 24:
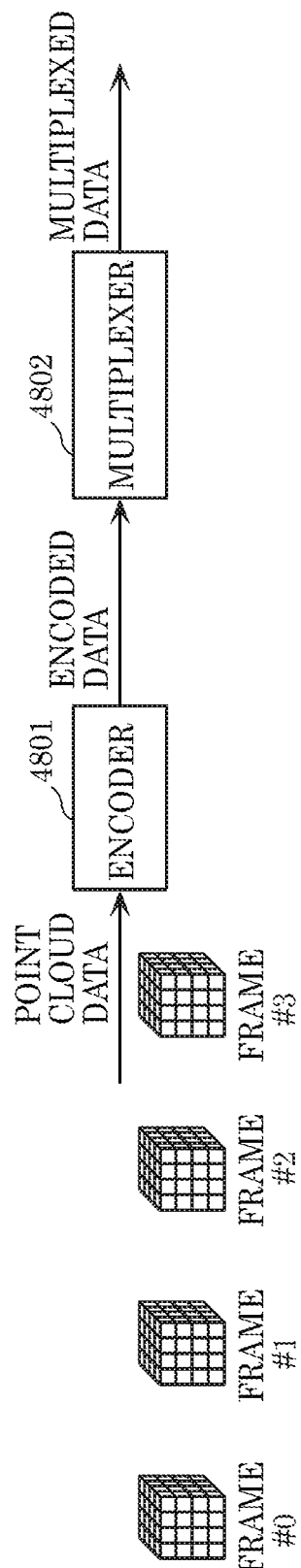
FIG. 24 is a diagram illustrating structures of an encoder and a multiplexer according to Embodiment 2.

FIG. 24 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 25:
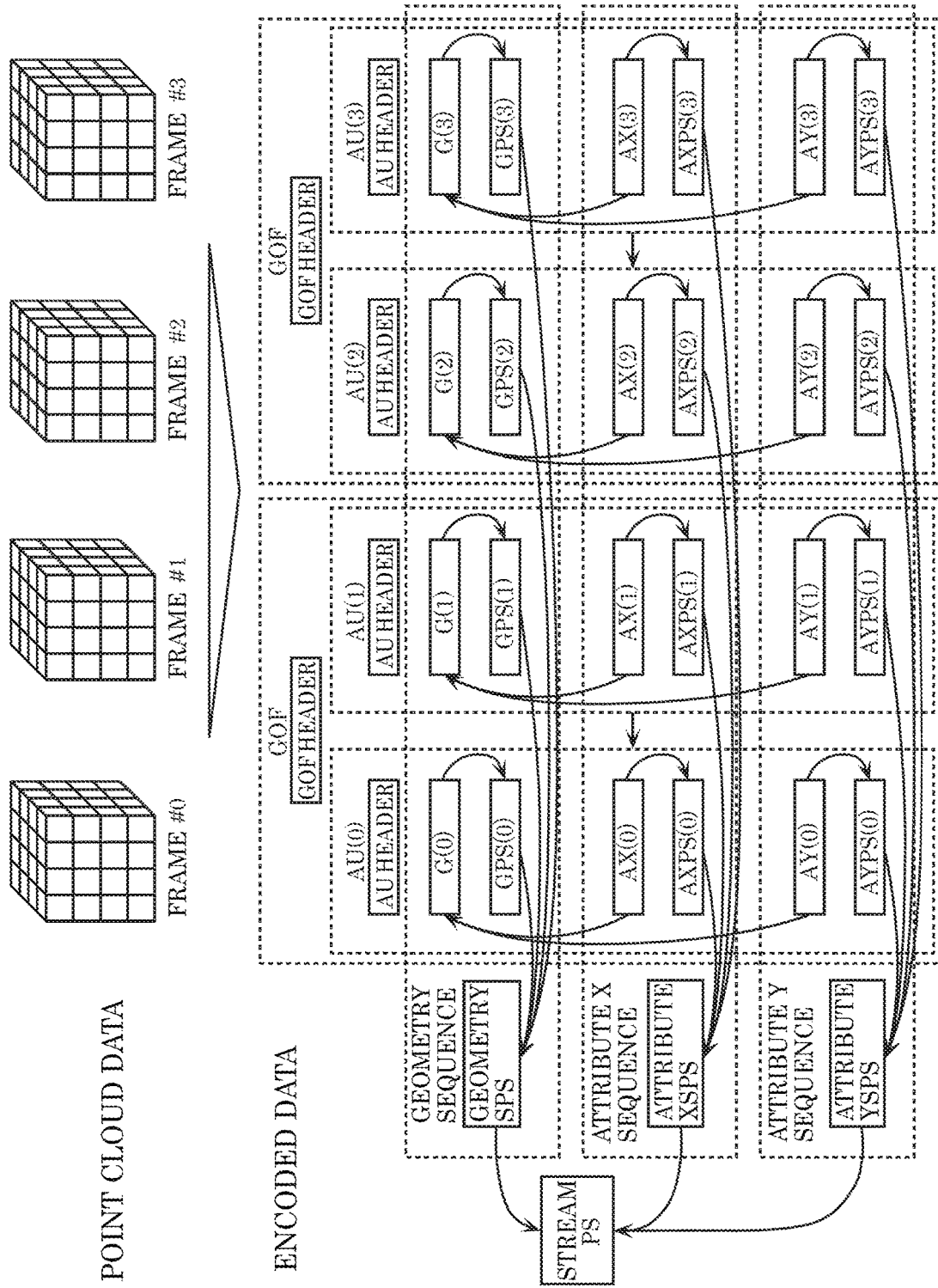
FIG. 25 is a diagram illustrating a structure example of encoded data according to Embodiment 2.

FIG. 25 is a diagram showing a configuration example of the encoded data generated by encoder 4801, Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described, Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described, Encoder 4801 encodes attribute information of each frame to generate encoded attribute data (compressed attribute data) for each frame. The encoded attribute data is denoted by A(i). FIG. 25 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i), The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 25 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 25 shows an example in which there is one type of geometry information, and there are two types of attribute information, the present disclosure is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 26:
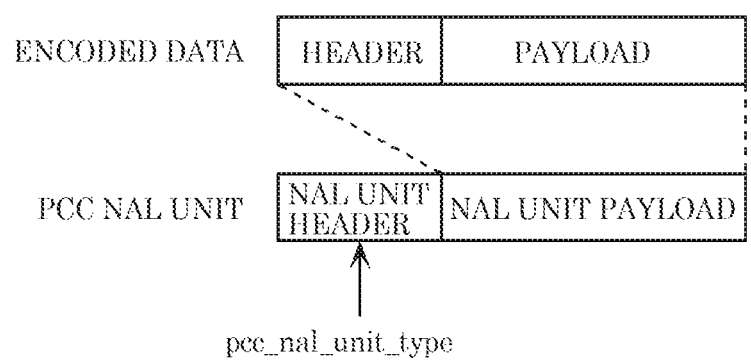
FIG. 26 is a diagram illustrating a structure example of encoded data and a NAL unit according to Embodiment 2.

For example, a data format is defined for each type of encoded data, FIG. 26 is a diagram showing an example of encoded data and a NAL unit.

For example, as shown in FIG. 26, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 27 is a diagram showing a semantics example of pcc_nal_unit_type.

As shown in FIG. 27, when pcc_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX, S), attribute YPS (AttrY. PS), geometry SPS (Geometry Sequence PS), attribute X SPS (AttributeX Sequence PS), attribute V SPS (AttributeY Sequence PS), AU header (AU Header), and GOF header (GOF Header) in codec 1. Values of 11 and greater are reserved in codec 1.

When pcc_codec_type is codec 2 (Codec2: second encoding method), values of 0 to 2 of pcc_nal_unit_type are assigned to data A (DataA), metadata A (MetaDataA), and metadata B (MetaDataB) in the coder. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 28:
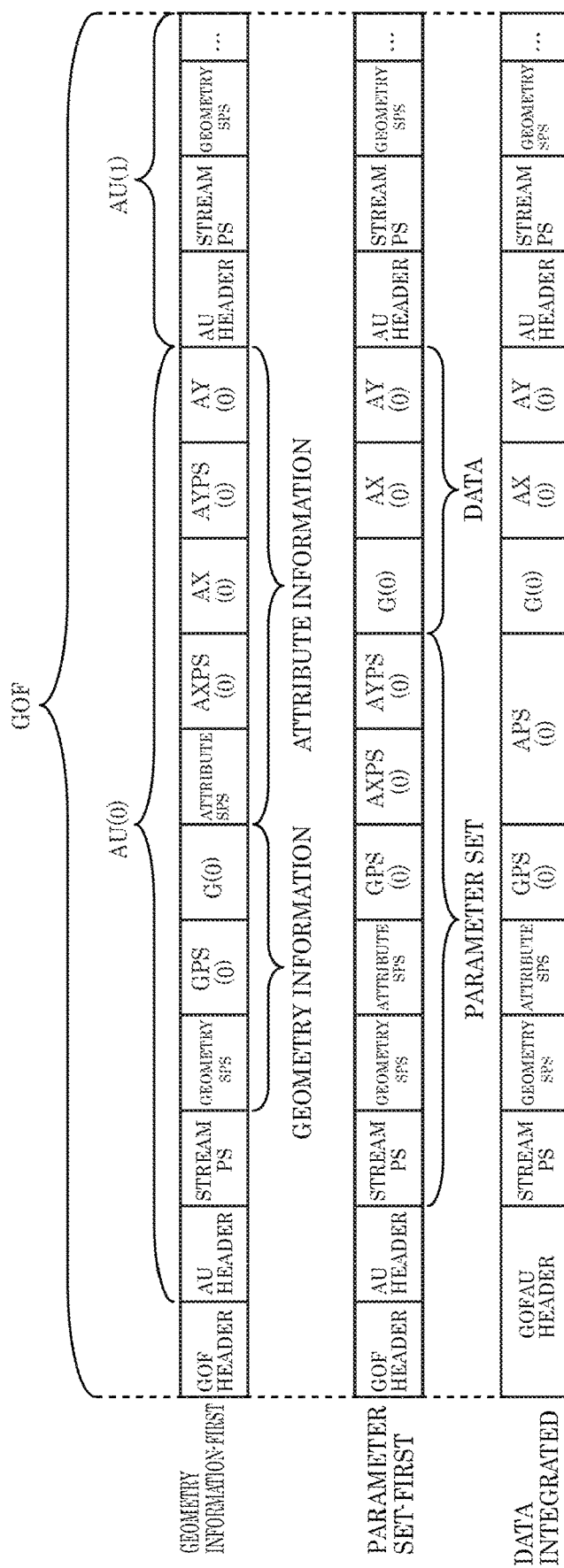
FIG. 28 is a diagram illustrating an example of a transmitting order of NAL units according to Embodiment 2.

FIG. 28 is a diagram showing examples of the order of transmission of NAL units. FIG. 28 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 28 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 28, the GOF header and the AU header may be integrated, or AXPS and AYPS may be integrated. In such a case, an identifier that indicates data having a plurality of functions is defined in pcc_nal_unit_type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or toes and transmit each of the divided slices or toes as divided data. The divided data includes information for identifying the divided data, and a parameter used for decoding of the divided data is included in the parameter set. In this case, an identifier that indicates that the data is data relating to a the or slice or data storing a parameter is defined in pcc_nal_unit_type.

Embodiment 3

Figure 29:
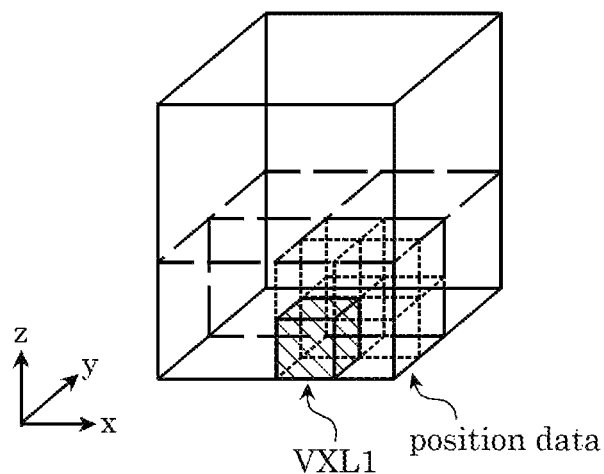
FIG. 29 is a diagram illustrating an example of position data according to Embodiment 3.
Figure 30:
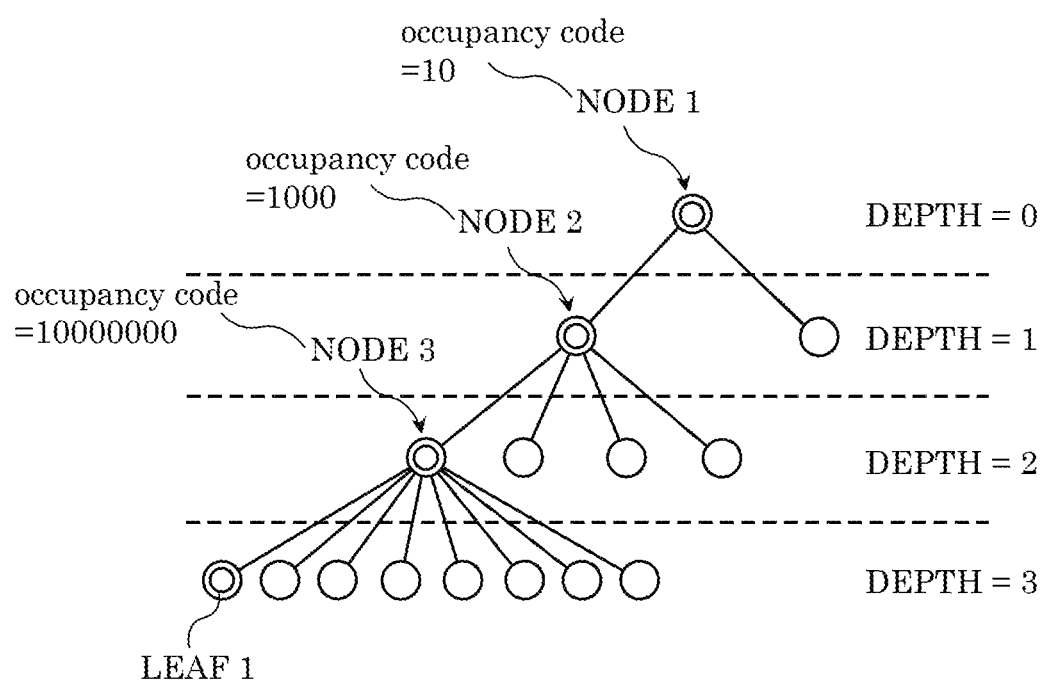
FIG. 30 is a diagram illustrating an example of a tree structure according to Embodiment 3.

A tree structure formed by combining an octree (octree structure), a quadtree (quadtree structure), and a binary tree (binary tree structure) will now be described. Specifically, hereunder an example is described in which the three-dimensional data encoding device and the three-dimensional data decoding device performing encoding and decoding, respectively, by combining tree structures having a plurality of dimensions (number of divisions), such as a quadtree or a binary tree in addition to an octree, FIG. 29 is a diagram illustrating an example of position data according to the present embodiment. FIG. 30 is a diagram illustrating an example of a tree structure according to the present embodiment.

Position data is transformed into a tree structure that is an octree, a quadtree, or a binary tree, and then encoded. Each tree structure includes nodes and leaves (leaf node). Each node has eight, four, or two blocks (nodes or leaves). That is, each node is divided (partitioned) into eight, four, or two nodes. Each leaf has voxel (VXL) information. For example, the position data illustrated in FIG. 29 is transformed into a tree structure illustrated in FIG. 30.

Here, of the leaves shown in FIG. 30, leaf 1 represents VXL1 shown in FIG. 29 (the hatched region in FIG. 29), and represents VXL containing a three-dimensional point cloud (referred to as a valid VXL, hereinafter). Specifically, node 1 corresponds to the entire space comprising the position data in FIG. 29.

The entire space corresponding to node 1 is divided into two nodes. In this case, the occupancy code of node 1 is represented by two bits such as "10", for example. Further, the space corresponding to node 2 is divided into four nodes. In this case, the occupancy code of node 1 is represented by four bits such as "1000", for example. Further, the space corresponding to node 3 is divided into eight nodes. In this case, the occupancy code of node 1 is represented by eight bits such as "10000000", for example.

In this way, a process in which a node containing valid VXL (VXL containing three-dimensional points) is divided into eight, four, or two nodes or leaves is repeated for every layer (depth) of the tree structure.

Here, each node corresponds to a subspace, and has an occupancy code that is information that indicates where the next node or leaf is located after division as node information. A block in the bottom layer is designated as a leaf, and has the number of the points contained in the leaf as leaf information.

By representing a tree structure which combines tree structures of a plurality of dimensions using three-dimensional data (more specifically, position data), the three-dimensional data encoding device, for example, can replace an 8-bit occupancy code that is division information of an octree (more specifically, information of a node in a case where the number of divisions of that node is an octree) with a 4-bit occupancy code that shows division information of a quadtree or a 2-bit occupancy code that shows division information of a binary tree. Therefore, it is possible to reduce the number of coding bits, and the coding rate is improved.

Next, examples of tree structures represented by an octree, a quadtree, or a binary tree are described.

FIG. 31 to FIG. 37 are each a diagram illustrating the relationship between the number of divisions of a tree structure and tree_axis_flag according to the present embodiment.

In order to indicate whether each node is divided into an octree, a quadtree, or a binary tree, respectively, and the direction in which the space is divided, the three-dimensional data encoding device shows a flag (tree_coded_axis_flag) indicating which division method (tree structure) was used for each layer (depth) of the node. Specifically, the three-dimensional data encoding device generates tree_coded_axis_flag that indicates, for each depth of the nodes, (i) whether each node was divided into eight nodes, four nodes, or two nodes, and (ii) how the node was divided for each division, more specifically, how the space corresponding to the node was divided.

For example, when it is defined that tree_coded_axis_flag [depth][A]=B, "depth" indicates the depth of the node that is the object of the flag. For example, depth=0 indicates that the depth of the node that is the object of the flag is 0. Further, A indicates the direction in which the space corresponding to the node is divided. For example, A=0 indicates that the direction in which the space is divided is the direction orthogonal to the x-axis. For example, A=1 indicates that the direction in which the space is divided is the direction orthogonal to the y-axis. For example, A=2 indicates that the direction in which the space is divided is the direction orthogonal to the z-axis. Further, B indicates whether or not the space is divided. For example, B=0 indicates that the space is not divided. Further, for example, B=1 indicates that the space is divided. For example, tree_coded_axis_flag[0][0]=0 indicates that the space corresponding to the node having a depth of 0 is not divided in the direction orthogonal to the x-axis.

The three-dimensional data encoding device represents the presence or absence of a three-dimensional point in the node (that is, the space corresponding to the node) by, for example, a combination of tree_coded_axis_flag and the occupancy code corresponding to the division method (tree structure).

The three-dimensional data encoding device, for example, transmits tree_coded_axis_flag to the three-dimensional data decoding device. The three-dimensional data encoding device, for example, generates a bitstream including tree_coded_axis_flag, and transmits the generated bitstream to the three-dimensional data decoding device.

Accordingly, it is possible for the three-dimensional data encoding device to flexibly determine the division method. For example, even if the three-dimensional data encoding device arbitrarily decided the tree structure, by notifying tree_coded_axis_flag to the three-dimensional data decoding device, it is possible for the three-dimensional data decoding device to determine the number of divisions in the tree structure that the three-dimensional data encoding device used to represent the position data, and the number of bits in the occupancy code.

Figure 31:
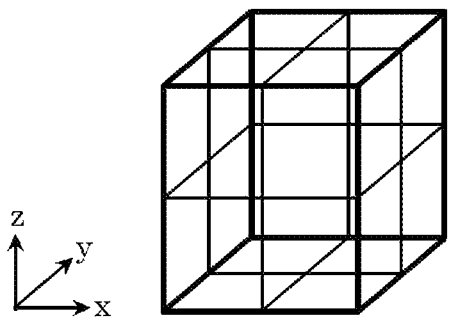
FIG. 31 is a diagram illustrating the relationship between the number of divisions of a tree structure and tree_axis_flag according to Embodiment 3.

As shown in FIG. 31, for example, in the case of dividing a node into eight nodes, that is, dividing the space into eight parts, the three-dimensional data encoding device generates tree_coded_axis_flag[depth][0]=1, tree_coded_axis_flag[depth][1]=1, and tree_coded_axis_flag[depth][2]=1.

Note that, as described above, the three-dimensional data encoding device may transform position data into not only an octree as illustrated in FIG. 31, but also into a quadtree or a binary tree, that is, may represent the position data as a quadtree or a binary tree.

Figure 32:
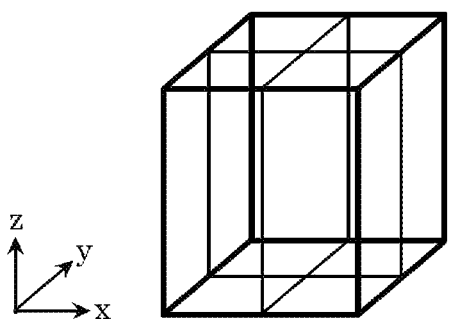
FIG. 32 is a diagram illustrating the relationship between the number of divisions of a tree structure and tree_axis_flag according to Embodiment 3.
Figure 33:
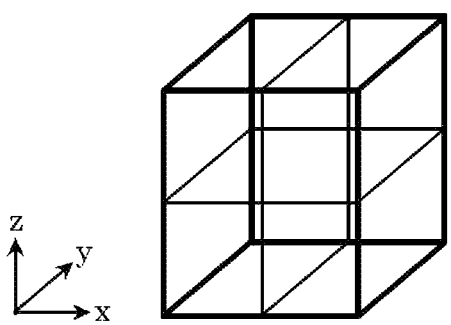
FIG. 33 is a diagram illustrating the relationship between the number of divisions of a tree structure and tree_axis_flag according to Embodiment 3.
Figure 34:
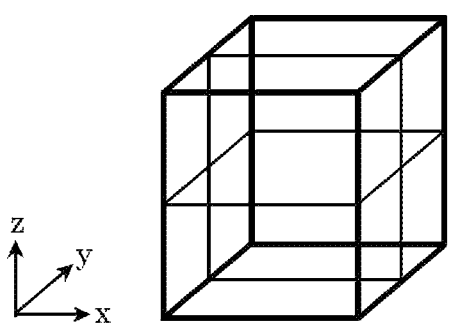
FIG. 34 is a diagram illustrating the relationship between the number of divisions of a tree structure and tree_axis_flag according to Embodiment 3.

In the case of a quadtree, for example, three patterns exist, namely, a pattern in which the space is divided with respect to the x-axis and the y-axis as shown in FIG. 32, a pattern in which the space is divided with respect to the x-axis and the z-axis as shown in FIG. 33, and a pattern in which the space is divided with respect to the y-axis and the z-axis as shown in FIG. 34.

For example, in a case of dividing a node into four nodes by dividing the space in a direction orthogonal to the x-axis and a direction orthogonal to the y-axis as shown in FIG. 32, the three-dimensional data encoding device generates tree_coded_axis_flag[depth][0]=1, tree_coded_axis_flag[depth][1]=1, and tree_coded_axis_flag[depth][2]=0.

Further, for example, in a case of dividing a node into four nodes by dividing the space in a direction orthogonal to the x-axis and a direction orthogonal to the z-axis as shown in FIG. 33, the three-dimensional data encoding device generates tree_coded_axis_flag[depth][0]=1, tree_coded_axis_flag[depth][1]=0, and tree_coded_axis_flag[depth][2]=1.

Further, for example, in a case of dividing a node into four nodes by dividing the space in a direction orthogonal to the y-axis and a direction orthogonal to the z-axis as shown in FIG. 34, the three-dimensional data encoding device generates tree_coded_axis_flag[depth][0]=0, tree_coded_axis_flag[depth][1]=1, and tree_coded_axis_flag[depth][2]=1.

Figure 35:
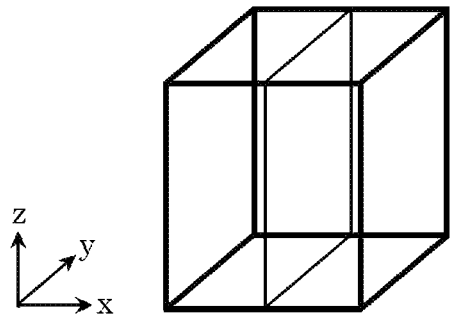
FIG. 35 is a diagram illustrating the relationship between the number of divisions of a tree structure and tree_axis_flag according to Embodiment 3.
Figure 36:
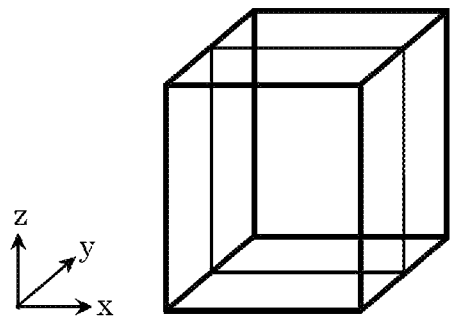
FIG. 36 is a diagram illustrating the relationship between the number of divisions of a tree structure and tree_axis_flag according to Embodiment 3.
Figure 37:
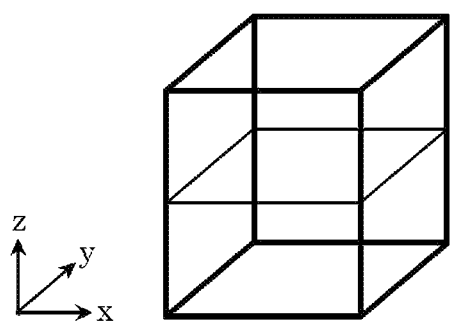
FIG. 37 is a diagram illustrating the relationship between the number of divisions of a tree structure and tree_axis_flag according to Embodiment 3.

In the case of a binary tree, for example, three patterns exist, namely, a pattern in which the space is divided with respect to the x-axis as shown in FIG. 35, a pattern in which the space is divided with respect to the y-axis as shown in FIG. 36, and a pattern in which the space is divided with respect to the z-axis as shown in FIG. 37.

For example, in a case of dividing a node into two nodes by dividing the space in a direction orthogonal to the x-axis as shown in FIG. 35, the three-dimensional data encoding device generates tree_coded_axis_flag[depth][0]=1, tree_coded_axis_flag[depth][1]=0, and tree_coded_axis_flag[depth][2]=0.

Further, for example, in a case of dividing a node into two nodes by dividing the space in a direction orthogonal to the y-axis as shown in FIG. 36, the three-dimensional data encoding device generates tree_coded_axis_flag[depth][0]=0, tree_coded_axis_flag[depth][1]=1, and tree_coded_axis_flag[depth][2]=0.

Further, for example, in a case of dividing a node into two nodes by dividing the space in a direction orthogonal to the z-axis as shown in FIG. 37, the three-dimensional data encoding device generates tree_coded_axis_flag[depth][0]=0, tree_coded_axis_flag[depth][1]=0, and tree_coded_axis_flag[depth][2]=1.

Note that the initial structure (root node) of a voxel (VXL) may be not only a cube that has the same size in each of the x-axis, y-axis, and z-axis directions, but may also be a rectangular parallelepiped structure whose sizes in the x-axis, y-axis, and z-axis directions are different to each other.

Further, the three-dimensional data encoding device may encode according to a predetermined division rule. Similarly, the three-dimensional data decoding device may decode according to a predetermined division rule.

Accordingly, since the three-dimensional data decoding device can decode appropriately according to a predetermined division rule even if the three-dimensional data encoding device does not transmit tree_coded_axis_flag to the three-dimensional data decoding device, it is possible to reduce the number of bits (for example, the number of bits in a bitstream including tree_coded_axis_flag).

Next, configuration examples of the three-dimensional data decoding device and the three-dimensional data decoding device will be described.

Figure 38:
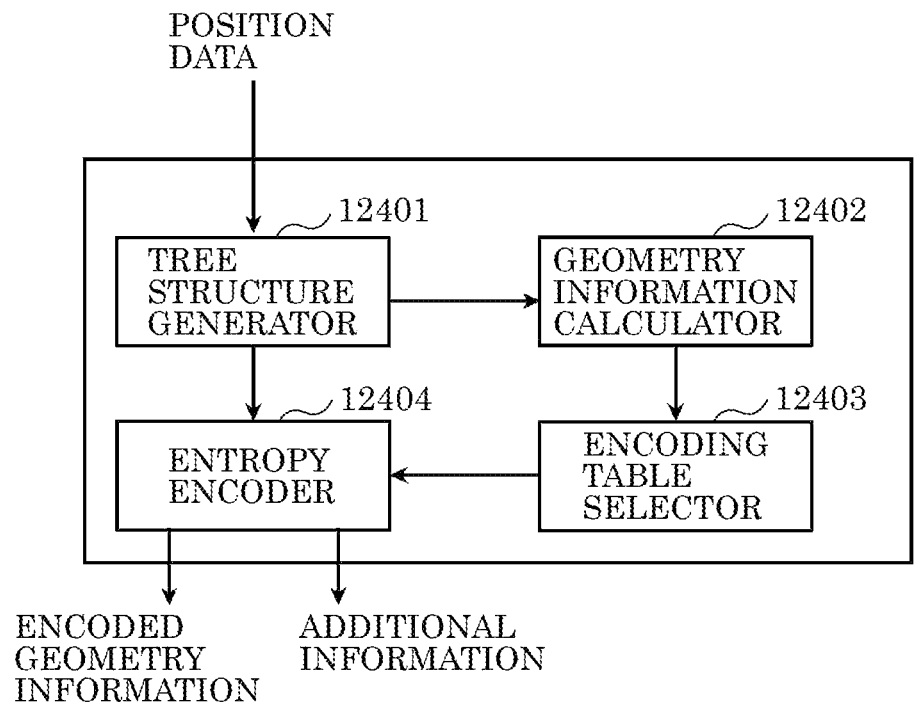
FIG. 38 is a block diagram of a three-dimensional data encoding device according to Embodiment 3.

FIG. 38 is a block diagram of the three-dimensional data encoding device according to the present embodiment. Specifically, FIG. 38 is a block diagram illustrating the configuration of a geometry information encoder that encodes geometry information (position information), which the three-dimensional data encoding device according to the present embodiment includes.

The three-dimensional data encoding device uses a predetermined method to determine a tree structure to be used to divide a three-dimensional point cloud. For example, the three-dimensional data encoding device determines the tree structure based on the shape and uneven distribution of points of the three-dimensional point cloud. The geometry information encoder included in the three-dimensional data encoding device includes tree structure generator 12401, geometry information calculator 12402, encoding table selector 12403, and entropy encoder 12404.

Tree structure generator 12401 generates a binary tree, a quadtree, or an octree, or a tree structure that combines these tree structures, from input position data, and generates an occupancy code of each node of the generated tree structure. Further, tree structure generator 12401, for example, generates tree_coded_axis_flag.

Geometry information calculator 12402 obtains information that indicates whether a neighboring node of a node to be encoded (current node) is an occupied node or not. For example, geometry information calculator 12402 obtains occupancy information on a neighboring node (information that indicates whether a neighboring node is an occupied node or not) from an occupancy code of a parent node to which the current node belongs.

Note that, geometry information calculator 12402 may save an encoded node in a list and search the list for a neighboring node. Further, geometry information calculator 12402 may change neighboring nodes in accordance with the position of the current node in the parent node.

Encoding table selector 12403 selects a coding table used for entropy encoding of the current node based on the occupancy information on the neighboring node calculated by geometry information calculator 12402, For example, encoding table selector 12403 generates a bit sequence based on the occupancy information on the neighboring node, and selects a coding table of an index number generated from the bit sequence.

Entropy encoder 12404 generates encoded geometry information and metadata by entropy-encoding the occupancy code of the current node using the coding table of the selected index number. Entropy encoder 12404 may add, to the encoded geometry information, information that indicates the selected coding table.

Figure 39:
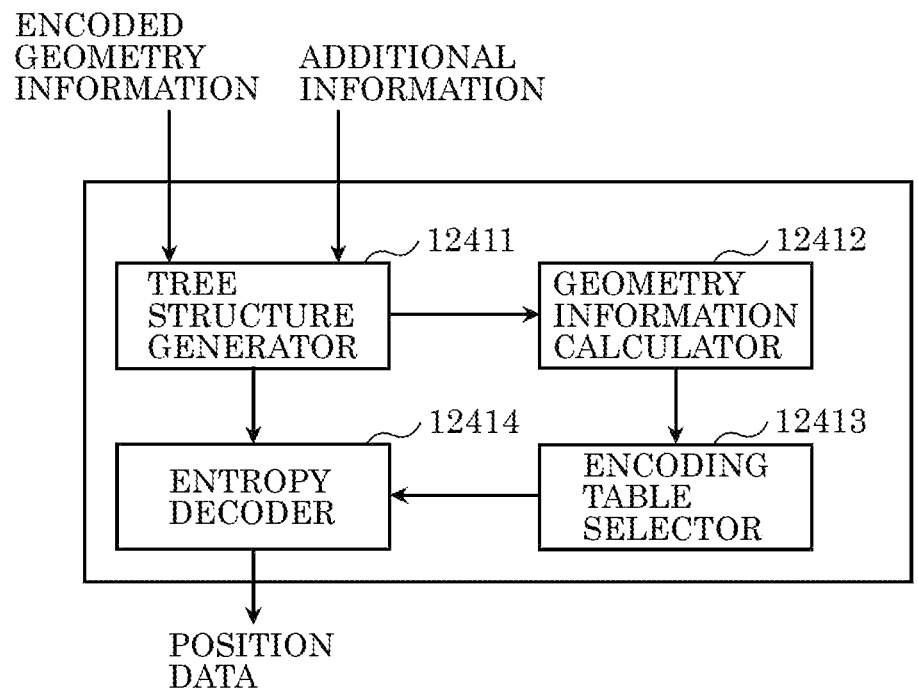
FIG. 39 is a block diagram of a three-dimensional data decoding device according to Embodiment 3.

FIG. 39 is a block diagram of the three-dimensional data decoding device according to the present embodiment. Specifically, FIG. 39 is a block diagram illustrating the configuration of a geometry information decoder that decodes geometry information, which the three-dimensional data decoding device according to the present embodiment includes.

The three-dimensional data decoding device decodes encoded data by generating the same tree structure as the tree structure which the three-dimensional data encoding device used for encoding. Examples of available methods by which the three-dimensional data encoding device and the three-dimensional data decoding device can encode and decode data using the same tree structure include a method in which the three-dimensional data encoding device and the three-dimensional data decoding device each determine a tree structure based on a predetermined rule, and a method in which a tree structure determined by the three-dimensional data encoding device is notified to the three-dimensional data decoding device. The geometry information decoder included in the three-dimensional data decoding device includes tree structure generator 12411, geometry information calculator 12412, encoding table selector 12413, and entropy decoder 12414.

Tree structure generator 12411 generates a binary tree, a quadtree, an octree, or a tree structure that combines these tree structures of a space (node) based on the header information, metadata and the like of a bitstream. For example, tree structure generator 12411 generates a binary tree, a quadtree, or an octree by generating a large space (root node) based on the sizes of a space in an x-axis direction, a y-axis direction, and a z-axis direction added to the header information and dividing the space into two parts in the x-axis direction, the y-axis direction, and the z-axis direction, or not dividing the space with respect to one or more of the axial directions, to thereby generate two, four, or eight small spaces. Further, nodes are sequentially designated as a current node.

Note that tree structure generator 12411 may divide a node into a predetermined tree structure, or may generate a tree structure according to tree_coded_axis_flag transmitted from the three-dimensional data encoding device.

Geometry information calculator 12412 obtains occupancy information that indicates whether a neighboring node of a node to be decoded (current node) is an occupied node or not. For example, geometry information calculator 12412 obtains occupancy information on a neighboring node from an occupancy code of a parent node to which the current node belongs.

Note that geometry information calculator 12412 may save a decoded node in a list and search the list for a neighboring node. Further, geometry information calculator 12412 may change neighboring nodes in accordance with the position of the current node in the parent node.

Encoding table selector 12413 selects a decoding table (coding table) used for entropy decoding of the current node based on the occupancy information on the neighboring node calculated by geometry information calculator 12412. For example, encoding table selector 12413 generates a bit sequence based on the occupancy information on the neighboring node, and selects a coding table of an index number generated from the bit sequence.

Entropy decoder 12414 generates geometry information (position data) by entropy-decoding the occupancy code of the current node using the selected coding table.

Note that entropy decoder 12414 may obtain information on the selected coding table by decoding the bitstream, and entropy-decode the occupancy code of the current node using the coding table indicated by the information.

Next, a procedure in which the three-dimensional data encoding device indicates a tree structure by using a flag will be described.

Figure 40:
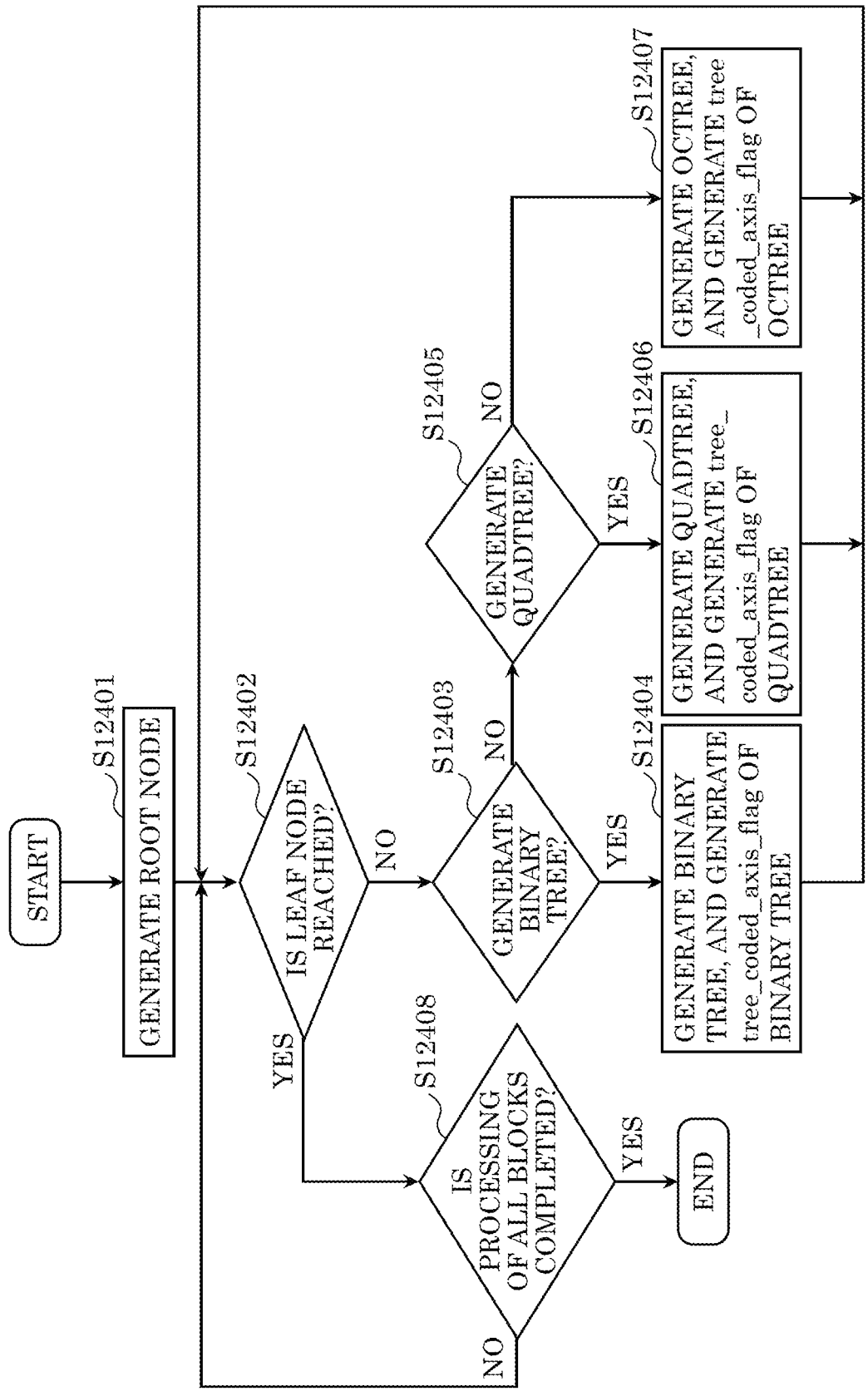
FIG. 40 is a flowchart illustrating a procedure for generating a flag indicating a tree structure that is performed by the three-dimensional data encoding device according to Embodiment 3.

FIG. 40 is a flowchart showing a procedure for generating a flag indicating a tree structure that is performed by the three-dimensional data encoding device according to the present embodiment.

First, the three-dimensional data encoding device generates a root node (S12401). A root node is a node corresponding to a bounding box (space) including a three-dimensional point cloud.

Next, the three-dimensional data encoding device determines whether or not a leaf node is reached (S12402). For example, the three-dimensional data encoding device selects one block and determines whether or not the selected block is a leaf node.

If the three-dimensional data encoding device determines that a leaf node has not been reached, that is, that the selected block is not a leaf node (No in S12402), the three-dimensional data encoding device determines whether or not to generate a binary tree, that is, whether to divide the selected block (node) into two blocks (S12403).

If the three-dimensional data encoding device determines that a binary tree is to be generated (Yes in S12403), the three-dimensional data encoding device generates a binary tree of the selected node (that is, divides the node into two nodes) and generates tree_coded_axis_flag indicating the tree structure is a binary tree (S12404), and then returns the process to step S12402.

On the other hand, if the three-dimensional data encoding device determines that a binary tree is not to be generated (No in S12403), the three-dimensional data encoding device determines whether or not to generate a quadtree, that is, whether to divide the selected node into four nodes (S12405).

If the three-dimensional data encoding device determines that a quadtree is to be generated (Yes in S12405), the three-dimensional data encoding device generates a quadtree of the selected node (that is, divides the node into four nodes) and generates tree_coded_axis_flag indicating the tree structure is a quadtree (S12406), and then returns the process to step S12402.

On the other hand, if the three-dimensional data encoding device determines that a quadtree is not to be generated (No in S12405), the three-dimensional data encoding device generates an octree of the selected node (that is, divides the node into eight nodes) and generates tree_coded_axis_flag indicating the tree structure is an octree (S12407), and then returns the process to step S12402.

After executing step S12404, step S12406, or step S12407 and returning the process to step S12402, the three-dimensional data encoding device selects a different block and determines whether or not the selected block is a leaf node.

If the three-dimensional data encoding device determines that a leaf node is reached (Yes in S12402), the three-dimensional data encoding device determines whether or not processing of all the blocks is completed (S12408). Specifically, the three-dimensional data encoding device determines whether or not the determination in step S12402 was performed for all the blocks, and the process from step S12403 onward was performed when the result of the determination in step S12402 was "No".

If the three-dimensional data encoding device determines that processing of all blocks is completed (Yes in S12408), the three-dimensional data encoding device ends the process.

On the other hand, if the three-dimensional data encoding device determines that processing of all blocks is not completed (No in S12408), the three-dimensional data encoding device returns the process to step S12402, selects a block that was not selected, and repeats the process from step S12402 onward.

As described above, the three-dimensional data encoding device generates tree_coded_axis_flag, and signals (that is, notifies) the tree structure to the three-dimensional data decoding device using that flag. Accordingly, even if the three-dimensional data encoding device freely creates a tree structure, it is possible for the three-dimensional data decoding device to appropriately determine the tree structure when performing the decoding process, and hence the compression performance can be improved.

Note that it suffices to arbitrarily specify in advance the method for determining which type of tree structure to generate in step S12403 and step S12405, and the method is not particularly limited.

Next, a procedure in which the three-dimensional data decoding device determines a tree structure using a flag will be described.

Figure 41:
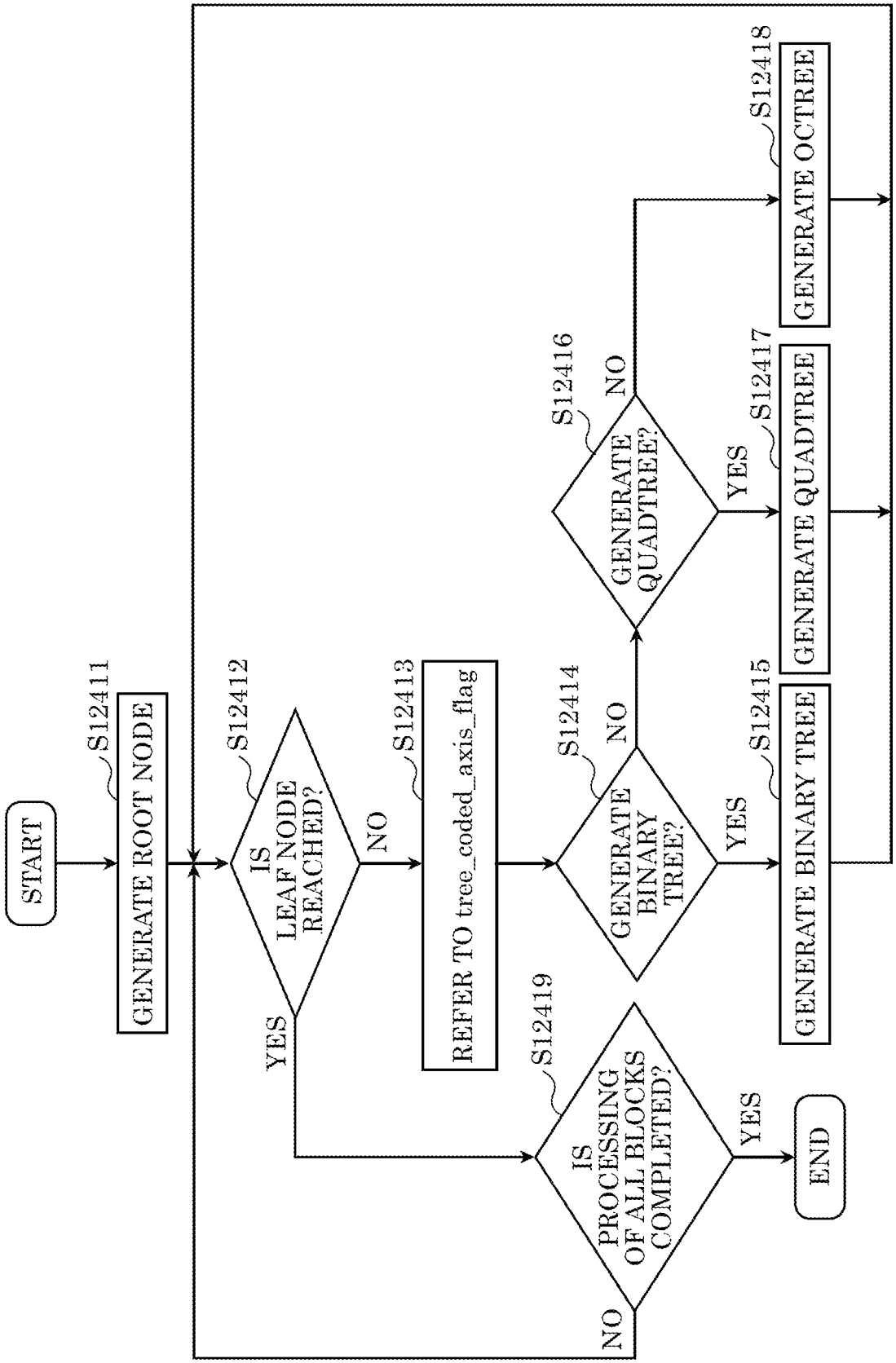
FIG. 41 is a flowchart illustrating a procedure for determining a tree structure that is performed by the three-dimensional data decoding device according to Embodiment 3.

FIG. 41 is a flowchart showing a procedure for determining a tree structure that is performed by the three-dimensional data decoding device according to the present embodiment.

First, the three-dimensional data decoding device obtains a bitstream including encoded geometry information, metadata, and tree_coded_axis_flag, and generates a root node with respect to the encoded geometry information (S12411).

Next, the three-dimensional data decoding device determines whether or not a leaf node is reached (S12412). For example, the three-dimensional data decoding device selects one block and determines whether or not the selected block is a leaf node.

If the three-dimensional data decoding device determines that a leaf node has not been reached, that is, that the selected block is not a leaf node (No in S12412), the three-dimensional data decoding device refers to tree_coded_axis_flag corresponding to the block (S12413).

Next, based on tree_coded_axis_flag, the three-dimensional data decoding device determines whether or not to generate a binary tree, that is, whether or not to divide the selected block (node) in into two blocks (S12414).

If the three-dimensional data decoding device determines that a binary tree is to be generated (Yes in S12414), the three-dimensional data decoding device generates a binary tree of the selected node (S12415), and then returns the process to step S12412.

On the other hand, if the three-dimensional data decoding device determines that a binary tree is not to be generated (No in S12414), the three-dimensional data decoding device determines whether or not to generate a quadtree, that is, whether or not to divide the selected node into four nodes (S12416).

If the three-dimensional data decoding device determines that a quadtree is to be generated (Yes in S12416), the three-dimensional data decoding device generates a quadtree of the selected node (S12417), and then returns the process to step S12412.

On the other hand, if the three-dimensional data decoding device determines that a quadtree is not to be generated (No in S12416), the three-dimensional data decoding device generates an octree of the selected node (S12418), and then returns the process to step S12412.

After executing step S12415, step S12417, or step S12418 and returning the process to step S12412, the three-dimensional data decoding device selects a different block and determines whether or not the selected block is a leaf node.

If the three-dimensional data decoding device determines that a leaf node is reached (Yes in S12412), the three-dimensional data decoding device determines whether or not processing of all the blocks is completed (S12419). Specifically, the three-dimensional data decoding device performs the determination in step S12412 for all the blocks, and determines whether or not the process from step S12413 onward was performed when the result of the determination in step S12412 was "No".

If the three-dimensional data decoding device determines that processing of all blocks is completed (Yes in S12419), the three-dimensional data decoding device ends the process.

On the other hand, if the three-dimensional data decoding device determines that processing of all blocks is not completed (No in S12419), the three-dimensional data decoding device returns the process to step S12412, selects a block that was not selected, and repeats the process from step S12412 onward.

As described above, the three-dimensional data decoding device, for example, forms a tree structure according to a flag (tree_coded_axis_flag) transmitted from the three-dimensional data encoding device.

Accordingly, it is possible for the three-dimensional data decoding device to form tree structures that are the same as various tree structures that the three-dimensional data encoding device created, and hence the compression performance can be improved.

Next, specific examples of a procedure for reducing the processing amount of the syntax of information indicating a tree structure will be described.

In a method for generating a tree structure in which a plurality of kinds of N-ary tree structures are combined as described above, an improvement in the coding efficiency at the three-dimensional data encoding device can be expected by changing the tree structure according to an uneven distribution of the positions of points of a three-dimensional point cloud. For example, when generating a tree structure, in the case of a shallow depth (that is, in a case where the depth is small), there is a high possibility that the coding efficiency will be improved by using a tree structure other than an octree (specifically, a binary tree or a quadtree), On the other hand, when generating a tree structure, in the case of a deep depth (that is, in a case where the depth is large), there is a high possibility that the coding efficiency will be improved by using an octree.

Thus, in order to improve the coding efficiency, when a plurality of kinds of tree structures are used for the first half of the depth (that is, a case where the depth is small) and an octree is used for the latter half of the depth (that is, a case where the depth is large), it is possible to reduce the number of bits of the syntax for signaling flags by omitting flags indicating an octree in the latter half by using the following method.

Figure 42:
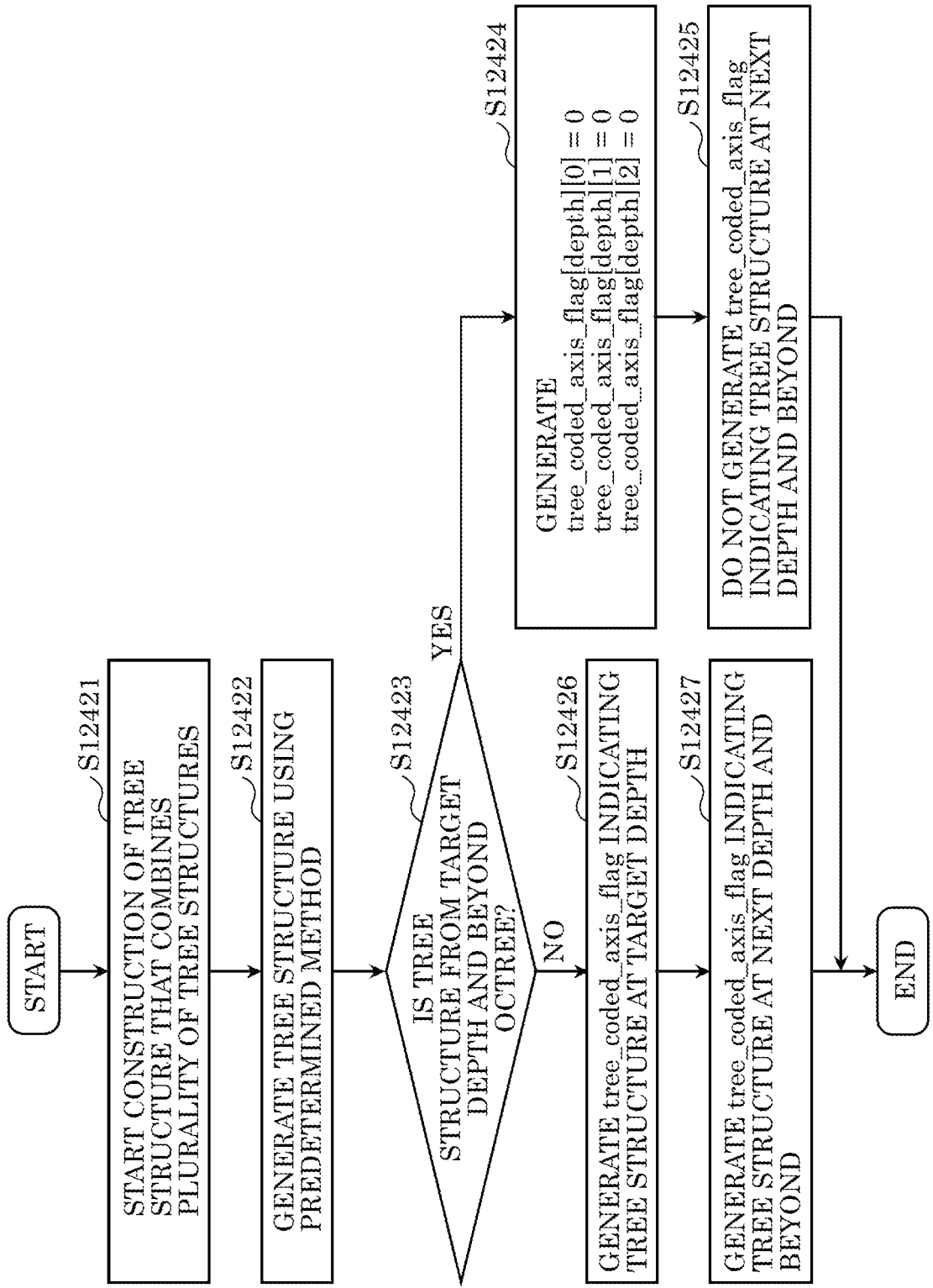
FIG. 42 is a flowchart illustrating a first example of a procedure for generating a flag indicating a tree structure that is performed by the three-dimensional data encoding device according to Embodiment 3.

FIG. 42 is a flowchart illustrating a first example of a procedure for generating a flag indicating a tree structure performed by the three-dimensional data encoding device according to the present embodiment.

First, the three-dimensional data encoding device starts construction of a tree structure that combines a plurality (plurality of kinds) of tree structures (S12421).

Next, the three-dimensional data encoding device generates a tree structure using a predetermined method (S12422). For example, the three-dimensional data encoding device generates a tree structure by executing the process shown in FIG. 40, excluding the processing for generating a flag in step S12404, step S12406, and step S12407.

Next, for each depth of the tree structure, the three-dimensional data encoding device starts a process for generating a flag indicating how many nodes each node was divided into. For example, the three-dimensional data encoding device generates tree_coded_axis_flag in order from the shallowest depth in the tree structure (more specifically, depth=0).

The three-dimensional data encoding device determines whether or not the tree structures from the target depth (in the present example, the depth corresponding to tree_coded_axis_flag that the three-dimensional data encoding device generates) and beyond are all octrees, that is, whether or not the number of divisions of nodes located at depths from the target depth and beyond are all 8 (S12423).

If the three-dimensional data encoding device determines that all the tree structures are octrees (Yes in S12423), the three-dimensional data encoding device generates tree_coded_axis_flag[depth][0]=0, tree_coded_axis_flag[depth][1]=0, and tree_coded_axis_flag[depth][2]=0 (that is, generates tree_coded_axis_flag[depth][0/1/2]=0) (S12424), and does not generate tree_coded_axis_flag indicating a tree structure at the next depth and beyond after the target depth (S12425). Note that, a value indicating the target depth is set for "depth" here. For example, it is predetermined that when it is indicated that division is not performed with respect to each of the x-axis direction, the y-axis direction, and the z-axis direction by tree_coded_axis_flag, the number of divisions is eight for all nodes located at depths from the target depth and beyond. Accordingly, in a case where the same number of divisions (for example, eight divisions) continues even when the depths change, by using a flag indicating the number of divisions for each depth, the three-dimensional data encoding device can indicate the tree structures using a small number of flags (that is, number of bits).

On the other hand, if the three-dimensional data encoding device determines that all the tree structures are not octrees, that is, that a binary tree or a quadtree is also included (No in S12423), the three-dimensional data encoding device generates tree_coded_axis_flag indicating the tree structure at the target depth (S12426), and furthermore, with respect to the tree structures at the next depth and beyond after the target depth, generates tree_coded_axis_flag for each depth (S12427).

Figure 43:
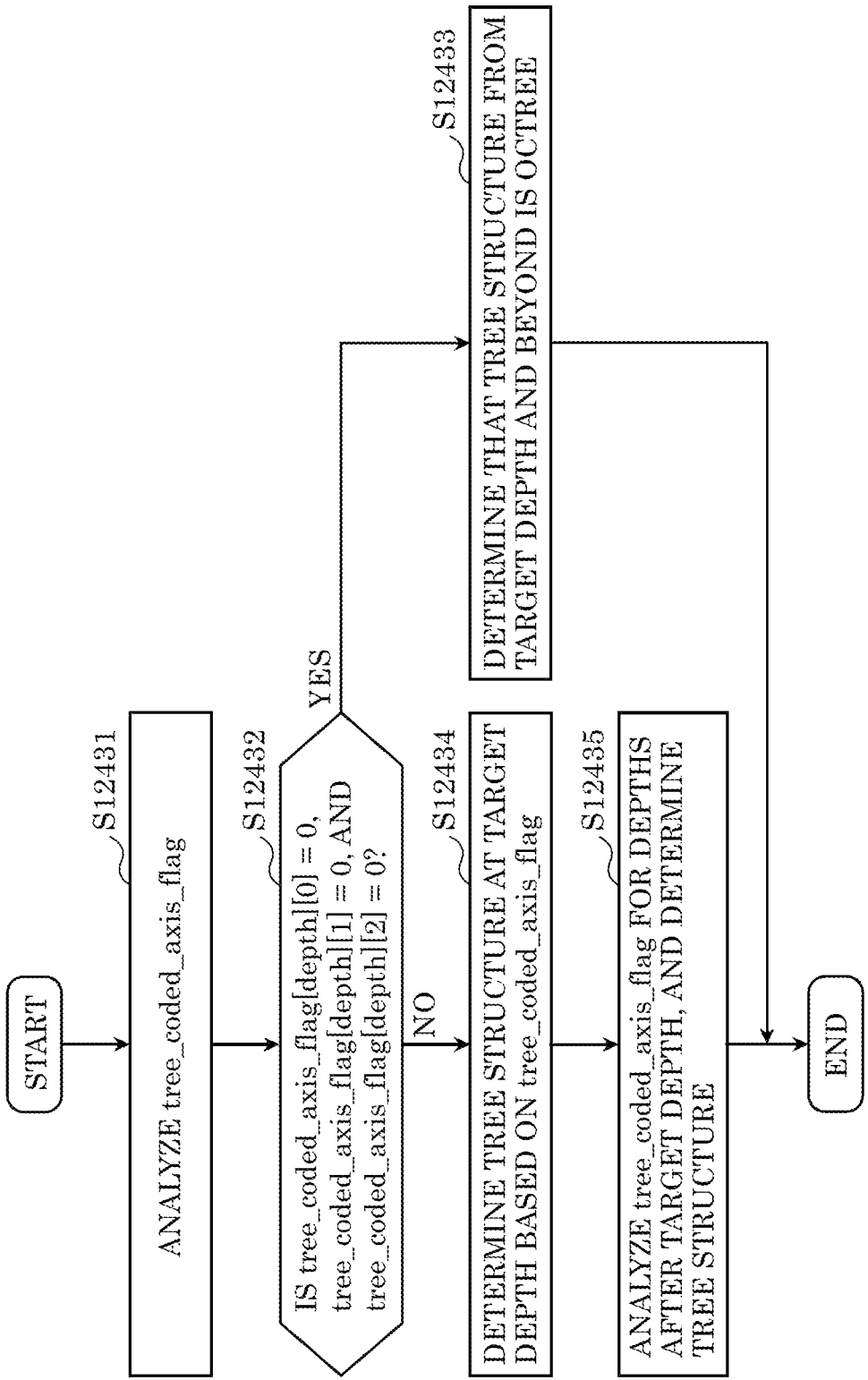
FIG. 43 is a flowchart illustrating a first example of a procedure for determining a tree structure that is performed by the three-dimensional data decoding device according to Embodiment 3.

FIG. 43 is a flowchart illustrating a first example of a procedure for determining a tree structure performed by the three-dimensional data decoding device according to the present embodiment.

First, for example, the three-dimensional data decoding device obtains a bitstream from the three-dimensional data encoding device, and analyzes tree_coded_axis_flag included in the obtained bitstream (S12431). The three-dimensional data decoding device determines (decides) the tree structure at each depth based on the analyzed tree_coded_axis_flag.

The three-dimensional data decoding device determines whether or not the flags corresponding to the target depth are tree_coded_axis_flag[depth][0]=0, tree_coded_axis_flag[depth][1]=0, and tree_coded_axis_flag[depth][2]=0 (S12432).

If the three-dimensional data decoding device determines that the flags corresponding to the target depth are tree_coded_axis_flag[depth][0]=0, tree_coded_axis_flag[depth][1]=0, and tree_coded_axis_flag[depth][2]=0 (Yes in S12432), the three-dimensional data decoding device determines that the tree structures at the depths from the target depth and beyond are all octrees (S12433). That is, the three-dimensional data decoding device determines that the flags corresponding to the depths from the target depth and beyond are tree_coded_axis_flag[depth][0]=1, tree_coded_axis_flag [depth][1]=1, and tree_coded_axis_flag[depth][2]=1.

On the other hand, if the three-dimensional data decoding device determines that the flags corresponding to the target depth are not tree_coded_axis_flag[depth][0]=0, tree_coded_axis_flag[depth][1]=0, and tree_coded_axis_flag[depth][2]=0 (No in S12432), the three-dimensional data decoding device determines the tree structure at the target depth based on tree_coded_axis_flag (S12434).

Further, with respect to the tree structure at each depth from the next depth and beyond after the target depth also, the three-dimensional data decoding device analyzes tree_coded_axis_flag to determine the tree structure (S12435).

FIG. 44 is a diagram illustrating a first example of the syntax of header information according to the present embodiment. The syntax shown in FIG. 44 is an example of a case in which it is predetermined that, with tree_coded_axis_flag[depth][0/1/2]=0 as a trigger, generation of tree_coded_axis_flag is omitted with respect to the depths after that depth, and the tree structures is regarded as an octree.

Here, tree_coded_axis_list_present_flag is a flag that indicates whether a flag indicating whether or not division was performed for each depth and axis (axes such as the x-axis) is present. For example, tree_coded_axis_list_present_flag=1 indicates that a flag indicating that division was performed is present. On the other hand, tree_coded_axis_list_present_flag=0 indicates that a flag indicating that division was performed is not present, and that only division into eight nodes (octree) was performed.

As described above, tree_coded_axis_flag is a flag indicating whether or not division was performed for each depth and axis. For example, tree_coded_axis_flag=1 indicates that, at the depth of the node that is the target, the node is divided with respect to the axial direction that is the target. On the other hand, tree_coded_axis_flag=0 indicates that the node is not divided.

Further, in a case where flags for all three axial directions are tree_coded_axis_flag=0, that is, a case where tree_coded_axis_flag[depth][0]=0, tree_coded_axis_flag[depth][1]=0, and tree_coded_axis_flag[depth][2]=0, transmission of tree_coded_axis_flag with respect to deeper depths than a depth indicated by these flags may be omitted.

Accordingly, for example, by prescribing in advance that it is only possible for the tree structure of a depth for which tree_coded_axis_flag is not present to be an octree, the amount of code can be reduced by a code amount corresponding to omission of tree_coded_axis_flag, and the three-dimensional data decoding device can also appropriately determine the tree structure. In particular, the effect is noticeable in a case where the usage frequency of octrees is high.

The flag tree_depth_minus1 indicates depth −1 of the node that transmits tree_coded_axis_flag. For example, the maximum number of tree_coded_axis_flag that the three-dimensional data encoding device can transmit can be set to (tree_depth_minus1+1)×3.

However, in a case where, at a certain depth, tree_coded_axis_flag=0 for all three axial directions, transmission of tree_coded_axis_flag for deeper depths than that depth may be omitted irrespective of tree_depth_minus1.

Each of tree_coded_axis_list_present_flag, tree_coded_axis_flag, and tree_depth_minus1 generated as described above may be entropy-encoded. For example, each value may be binarized and arithmetically encoded.

Further, although the present embodiment is described taking an octree, a quadtree, and a binary tree as examples, the tree structures are not necessarily limited to these, and the present embodiment may be extended and applied to any tree structure such as a 16-tree structure.

Further, although in the present embodiment an example is described in which all the flags are present in the same header, tree_coded_axis_list_present_flag, tree_coded_axis_flag, and tree_depth_minus1 may be present in different headers to each other. Furthermore, although in the present embodiment an example is described in which tree_coded_axis_flag is transmitted in order from the smallest depth, tree_coded_axis_flag may be transmitted in order from the largest depth. The greater the extent to which code which it is desired to omit occurs later, the greater that the effect of reducing the code amount becomes.

Further, although in the present embodiment an example is described in which, in a case where tree_coded_axis_flag[depth][0]=0, tree_coded_axis_flag[depth][1]=0, and tree_coded_axis_flag[depth][2]=0, transmission of tree_coded_axis_flag corresponding to deeper depths than that depth is omitted, it is not necessarily required for all of the values to be 0, and for example the values may be different. Further, although it has been described in the present embodiment that in a case where tree_coded_axis_flag[depth][0]=0, tree_coded_axis_flag[depth][1]=0, and tree_coded_axis_flag[depth][2]=0, the tree structure at deeper depths than that depth is an octree, the tree structure may be a quadtree or a binary tree instead of an octree. By omitting the transmission of flags corresponding to a tree structure which has a high frequency of occurrence, the effect of reducing the code amount increases.

Further, although in the present embodiment an example is illustrated in which only an octree is applied in a case where tree_coded_axis_list_present_flag=0, a tree structure may be formed on a rule basis, that is, based on conditions that are arbitrarily determined in advance in a case where tree_coded_axis_list_present_flag=0. Furthermore, a flag indicating that only an octree is used, a flag indicating that only a quadtree is used, and a flag indicating that only a binary tree is used may be set.

Furthermore, tree_coded_axis_flag may be information that is provided for each node, may be information that is provided for each group in which a plurality of nodes are collected together such as a slice or a tile, or may be information that is provided for each frame. For example, the code amount can be decreased by the commonization of information for each node having the same properties.

Further, for example, in a case where an octree is used at a certain depth, that is, in a case where tree_coded_axis_flag [depth][0], tree_coded_axis_flag[depth][1], and tree_coded_axis_flag[depth][2] are all 1, tree structures at depths from that depth onward may each be taken to be an octree, and tree_coded_axis_flag corresponding to deeper depths than that depth may be omitted.

FIG. 45 is a diagram for describing a first example of the relationship between the depth and the number of divisions in a tree structure according to the present embodiment.

The three-dimensional data encoding device transforms position data by, for example, representing a tree structure in a case where the depths are from 0 to 3 as an octree, a quadtree, or a binary tree, and representing a tree structure in a case where the depth is 4 and beyond as an octree. In this case, for example, in the case of the depths from 0 to 3, for each depth the three-dimensional data encoding device generates tree_coded_axis_flag indicating the tree structure. Further, for example, the three-dimensional data encoding device generates tree_coded_axis_flag that indicates the tree structure (octree) in a case where the depth is 4 and also indicates that signaling of the tree structure in a case where the depth is 5 and beyond is not performed. For example, the three-dimensional data encoding device generates tree_coded_axis_flag[4][0]=0, tree_coded_axis_flag[4]=0, and tree_coded_axis_flag[4][2]=0.

FIG. 46 is a diagram illustrating a second example of the syntax of header information according to the present embodiment. The syntax shown in FIG. 46 is an example of a case in which it is predetermined that, with respect to the next depth and beyond after a depth indicated by multi_tree_depth, generation of tree_coded_axis_flag is omitted and the respective tree structures are regarded as an octree.

Here, multi_tree_depth_minus1 indicates a depth for which there is a possibility that a tree structure selected from a plurality of kinds of tree structure can be used. That is, for example, an octree, a quadtree, or a binary tree is employed for a depth indicated by multi_tree_depth_minus1.

Thus, by using multi_tree_depth_minus1, a depth for which there is a possibility of using any one of a plurality of kinds of tree structures may be indicated separately from tree_depth_minus1. In this case, for example, the three-dimensional data encoding device generates tree_coded_axis_flag[x|y|z] indicating the tree structure at the depth indicated by multi_tree_depth_minus1.

Note that in this case, for example, it is determined in advance that the tree structure in deeper depths than the depth indicated by multi_tree_depth_minus1 is regarded as an octree.

Figure 47:
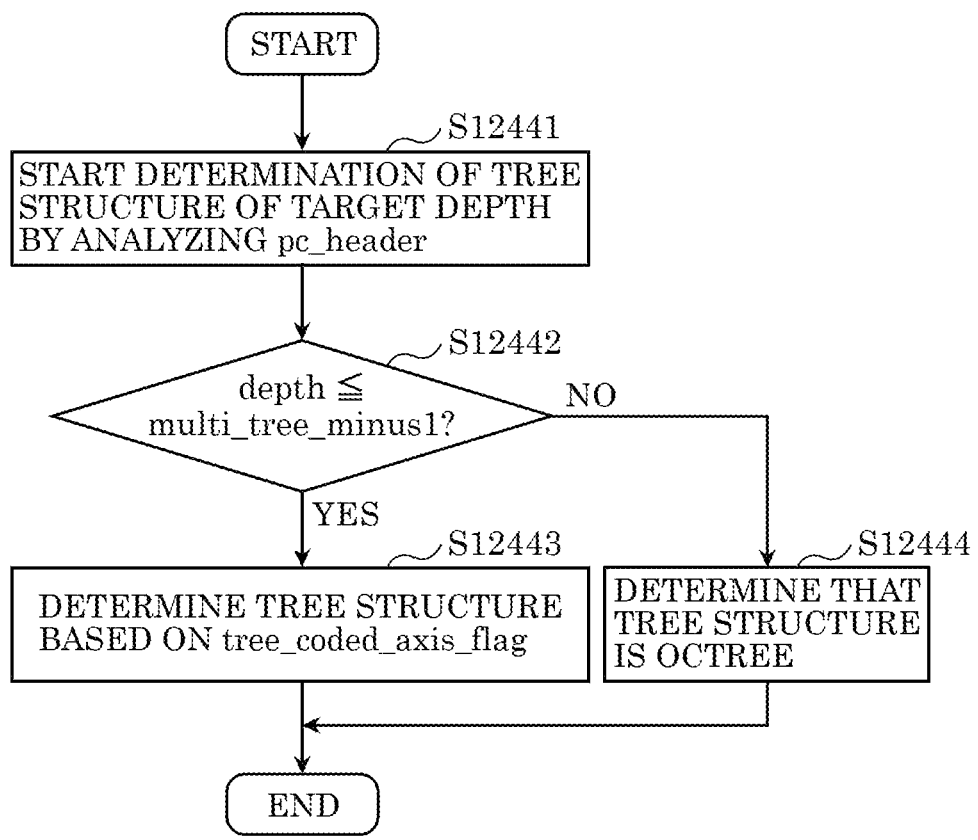
FIG. 47 is a flowchart illustrating a second example of a procedure for determining a tree structure that is performed by the three-dimensional data decoding device according to Embodiment 3.

FIG. 47 is a flowchart illustrating a second example of a procedure for determining a tree structure performed by the three-dimensional data decoding device according to the present embodiment.

First, the three-dimensional data decoding device, for example, starts a process to determine the tree structure at a depth (target depth) that is the target for determination of the tree structure, by analyzing pc_header included in a bitstream obtained from the three-dimensional data encoding device (S12441).

Next, the three-dimensional data decoding device determines whether or not the target depth is equal to or less than (is a depth equal to or shallower than) the depth indicated by multi_tree_depth_minus1 included in the bitstream (S12442).

If the three-dimensional data decoding device determines that the target depth is equal to or less than the depth indicated by multi_tree_depth_minus1 included in the bitstream (Yes in S12442), the three-dimensional data decoding device determines the tree structure at the target depth based on tree_coded_axis_flag included in the bitstream (S12443). In this case, for example, the three-dimensional data decoding device sets the next depth after the target depth as a new target depth, and performs the process from step S12441 once more.

On the other hand, if the three-dimensional data decoding device determines that the target depth is deeper than the depth indicated by multi_tree_depth_minus1 included in the bitstream (No in S12442), the three-dimensional data decoding device determines that the tree structure at the target depth is an octree (S12444). In this case, for example, the three-dimensional data decoding device determines that the tree structures at the depths from the target depth and beyond are all octrees.

Figure 48:
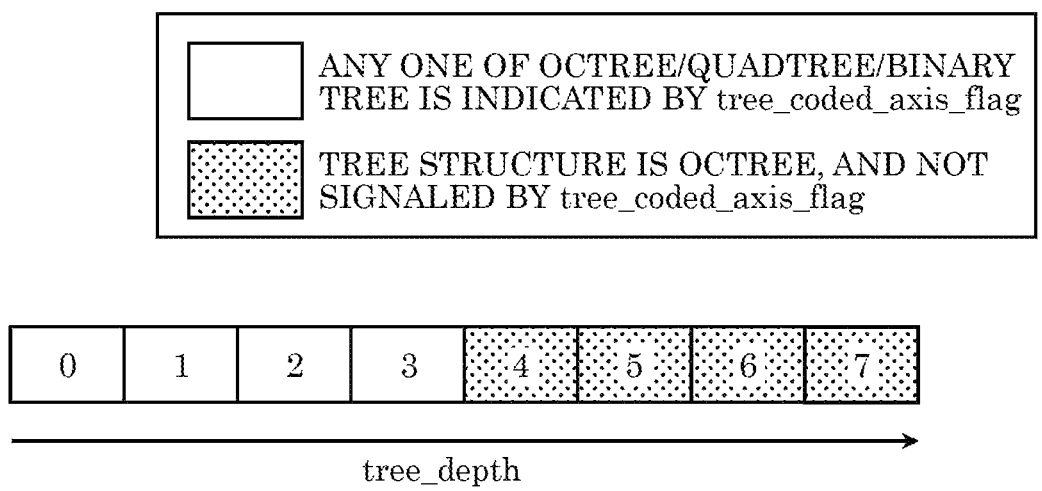
FIG. 48 is a diagram for describing a second example of the relationship between the depth and the number of divisions in a tree structure according to Embodiment 3.

FIG. 48 is a diagram for describing a second example of the relationship between the depth and the number of divisions in a tree structure according to the present embodiment.

The three-dimensional data encoding device, for example, transforms position data by representing a tree structure in a case where the depths are from 0 to 3 as an octree, a quadtree, or a binary tree, and representing a tree structure in a case where the depth is 4 and beyond as an octree. In this case, for example, in the case of the depths from 0 to 3, for each depth the three-dimensional data encoding device generates tree_coded_axis_flag indicating the tree structure. Further, for example, the three-dimensional data encoding device sets a depth that multi_tree_depth_minus1 indicates to 4.

FIG. 49 is a diagram illustrating a third example of the syntax of header information according to the present embodiment. The syntax illustrated in FIG. 49 is an example of a case where, when the respective depths are viewed in order from a depth of 0, at first the tree structure is an octree, a quadtree, or a binary tree, and then from an intermediate depth the tree structures are consecutively octrees, and thereafter the tree structure is again an octree, a quadtree, or a binary tree.

In the syntax shown in FIG. 49, tree_coded_axis_flag [depth][0/1/2]=0 is taken as a trigger, and for the next depth and beyond after that depth the generation of tree_coded_axis_flag is omitted and the respective tree structures are regarded as an octree.

In the syntax in the present example, num_end_flag is generated. Here, num_end_flag indicates the end of the depths for which generation of tree_coded_axis_flag is omitted and the tree structure is regarded as an octree. For example, in a case where the depth that tree_coded_axis_flag[depth][0/1/2]=0 indicates is 4, and the depth that num_end_flag indicates is 6, the tree structure at each of depths 4, 5 and 6 is regarded as an octree. In this case, when there are depths of 7 and beyond in the tree structure representing the position data, the three-dimensional data encoding device generates tree_coded_axis_flag indicating the tree structure of each depth from depth of 7 and beyond.

FIG. 50 is a diagram for describing a third example of the relationship between the depth and the number of divisions in a tree structure according to the present embodiment.

The three-dimensional data encoding device, for example, transforms position data by representing a tree structure in a case where the depths are from 0 to 3 as an octree, a quadtree, or a binary tree, representing a tree structure in a case where the depths are from 4 to 6 as an octree, and representing a tree structure in a case where the depth is 7 as an octree, a quadtree, or a binary tree. In this case, for example, in the case of the depths from 0 to 3, for each depth the three-dimensional data encoding device generates tree_coded_axis_flag indicating the tree structure. Further, for example, to indicate the tree structure in the case where the depths are from 4 to 6, the three-dimensional data encoding device generates tree_coded_axis_flag[4][0]=0, tree_coded_axis_flag[4][1]=0, and tree_coded_axis_flag[4][2]=0, and num_end_flag indicating that the depth is 6. Further, for example, the three-dimensional data encoding device generates tree_coded_axis_flag indicating the tree structure in the case where the depth is 7.

FIG. 51 is a diagram illustrating a fourth example of the syntax of header information according to the present embodiment. The syntax illustrated in FIG. 51 is an example of a case where, when the respective depths are viewed in order from a depth of 0, at first the tree structure is an octree, a quadtree, or a binary tree, and then from an intermediate depth the tree structures are consecutively octrees, and thereafter the tree structure is again an octree, a quadtree, or a binary tree.

In the syntax shown in FIG. 51, generation of tree_coded_axis_flag is omitted from the depth that multi_tree_depth indicates and beyond until the depth that num_end_flag indicates, and the respective tree structures are regarded as an octree.

Note that, instead of generating num_end_flag, information indicating the number of consecutive depths in which the tree structure is an octree may be generated.

Figure 52:
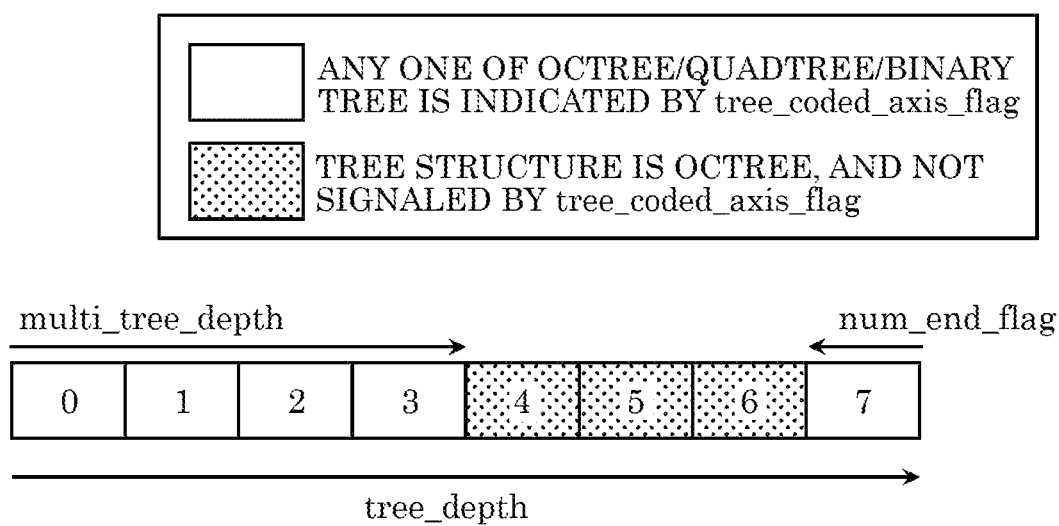
FIG. 52 is a diagram for describing a fourth example of the relationship between the depth and the number of divisions in a tree structure according to Embodiment 3.

FIG. 52 is a diagram for describing a fourth example of the relationship between the depth and the number of divisions in a tree structure according to the present embodiment.

The three-dimensional data encoding device, for example, transforms position data by representing a tree structure in a case where the depths are from 0 to 3 as an octree, a quadtree, or a binary tree, representing a tree structure in a case where the depths are from 4 to 6 as an octree, and representing a tree structure in a case where the depth is 7 as an octree, a quadtree, or a binary tree. In this case, for example, in the case of the depths from 0 to 3, for each depth the three-dimensional data encoding device generates tree_coded_axis_flag indicating the tree structure. Further, for example, the three-dimensional data encoding device generates multi_tree_depth_minus1 indicating the depth is 4 and num_end_flag indicating the depth is 6. Further, for example, the three-dimensional data encoding device generates tree_coded_axis_flag indicating the tree structure in the case where the depth is 7.

Next, a specific example of a method for determining a tree structure at each depth will be described. In the method for determining a tree structure described hereunder, for example, a space is divided so as to form one of a plurality of kinds of tree structures according to a predetermined rule that is prescribed in advance. The predetermined rule may be, for example, to determine the tree structure based on the number of times a tree structure other than an octree is used, or based on the length of a bounding box forming a three-dimensional point cloud.

By the use of a predetermined rule that is prescribed in advance, in a case where a space corresponding to a root node is a rectangular parallelepiped structure, by preferentially dividing the space in the direction of an axis parallel to the long side in the rectangular parallelepiped, the accuracy of the position data can be maintained by quickly causing the space after being divided to approximate a cubic structure. Further, according to this division method, even a rectangular parallelepiped structure at a deep depth can be ultimately formed into a cubic structure.

Figure 53:
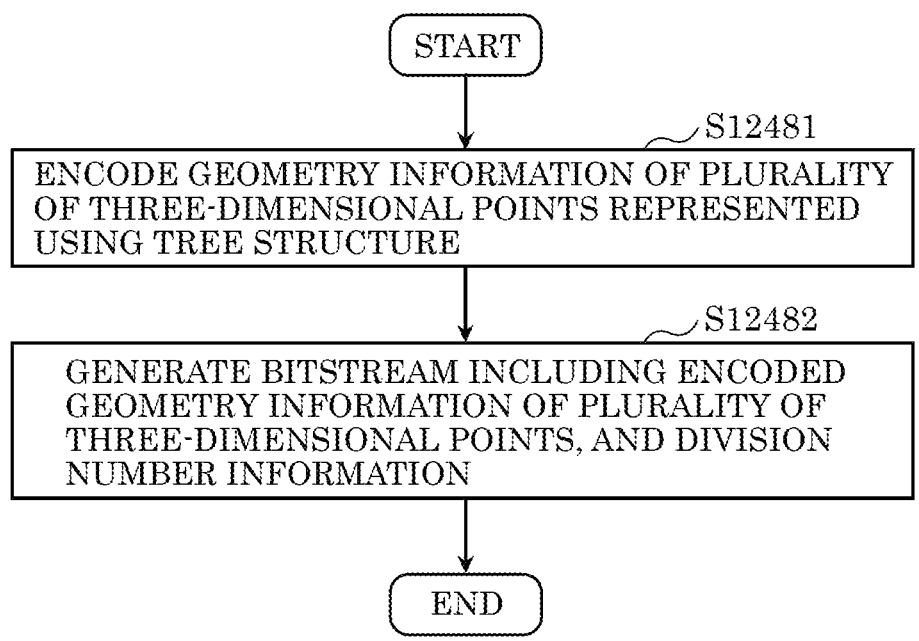
FIG. 53 is a flowchart illustrating a procedure performed by the three-dimensional data encoding device according to Embodiment 3.

As described above, the three-dimensional data encoding apparatus according to the present embodiment performs the process illustrated in FIG. 53.

FIG. 53 is a flowchart illustrating a procedure performed by the three-dimensional data encoding device according to the present embodiment.

First, the three-dimensional data encoding device encodes geometry information of a plurality of three-dimensional points represented by a tree structure (S12481).

Next, the three-dimensional data encoding device generates a bitstream including the geometry information encoded and division number information indicating a total number of divisions of each of a plurality of nodes included in the tree structure.

The division number information includes common division number information collectively indicating the total number of divisions of two or more nodes among the plurality of nodes. The division number information is, for example, information including the tree_coded_axis_flag described above. The common division number information is, for example, tree_coded_axis_flag[depth][0]=0, tree_coded_axis_flag [depth][1]=0, and tree_coded_axis_flag[depth][2]=0. Alternatively, the common division number information is the multi_tree_depth described above.

Accordingly, for nodes in which the number of divisions is the same, information indicating the number of divisions is collected as common information. Therefore, the data amount included in the bitstream can be reduced.

Furthermore, for example, among the plurality of nodes, nodes located at a same depth in the tree structure are divided into a same number of divisions. In this case, for example, the division number information indicates the total number of divisions of nodes for each of depths in the tree structure. Furthermore, for example, the common division number information collectively indicates the total number of divisions of nodes for a plurality of depths.

Accordingly, for nodes in which the number of divisions is the same, information indicating the number of divisions is collected as common information for a plurality of depths. Therefore, the data amount included in the bitstream can be reduced.

Furthermore, for example, the common division number information includes trigger information indicating that nodes have a same number of divisions from a predetermined depth and beyond in the tree structure, Trigger information is, for example, tree_coded_axis_ flag[depth][0]=0, tree_coded_axis_flag[depth][1]=0, and tree_coded_axis_flag[depth][2]=0. Alternatively, trigger information is, for example, multi_tree_depth described above.

Accordingly, nodes that have the same number of divisions can be easily indicated by means of trigger information.

Furthermore, for example, the common division number information further includes end depth information indicating an end depth up to which the number of divisions of nodes from the predetermined depth is the same. The end depth information is, for example, num_end_flag described above.

Accordingly, for example, when the numbers of divisions of nodes are viewed in order from the shallowest depth, if the number of divisions of nodes is successively the same from an intermediate depth, the number of divisions of the nodes can be easily indicated.

Furthermore, for example, the plurality of nodes each correspond to at least part of a space in a three-axis orthogonal coordinate system. In this case, for example, the division number information includes flag information indicating, for each of depths in the tree structure, whether to divide the space in each of three axial directions of the three-axis orthogonal coordinate system. Furthermore, for example, the trigger information is the flag information indicating not to divide the space in each of the three axial directions. The trigger information in this case is, for example, tree_coded_axis_flag[depth][0]=0, tree_coded_axis_flag [depth][1]=0, and tree_coded_axis_flag[depth][2]=0

Accordingly, trigger information can be easily indicated using the flag information.

Furthermore, for example, the three-dimensional data encoding device includes a processor and memory, and the processor performs the above process using the memory. A control program for performing the above process may be stored in the memory.

Figure 54:
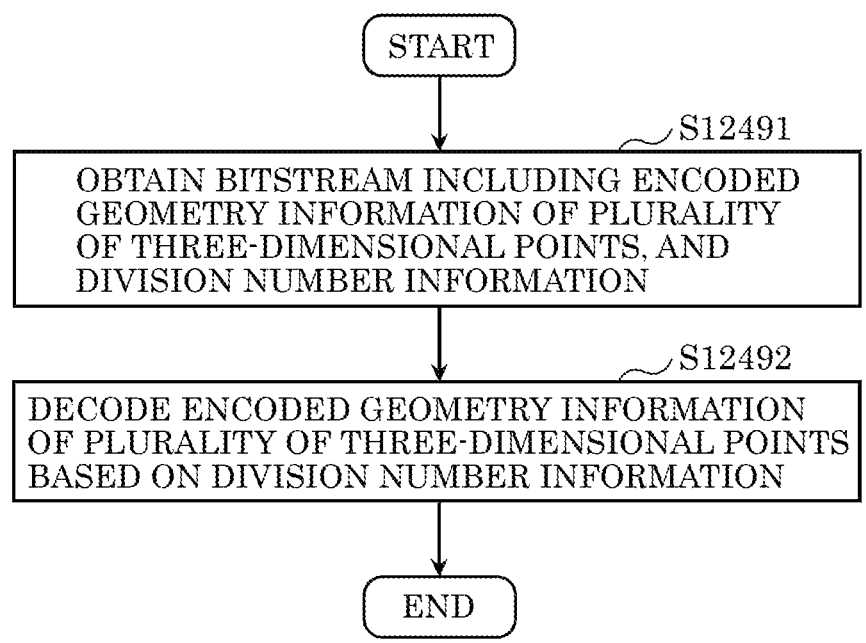
FIG. 54 is a flowchart illustrating a procedure performed by the three-dimensional data decoding device according to Embodiment 3.

Furthermore, the three-dimensional data encoding device performs the process illustrated in FIG. 54.

FIG. 54 is a flowchart illustrating a procedure performed by the three-dimensional data decoding device according to the present embodiment.

First, the three-dimensional data decoding device obtains a bitstream including encoded geometry information and division number information. Here, the encoded geometry information is geometry information of a plurality of three-dimensional points represented by a tree structure, and the division number information indicates a total number of divisions of each of a plurality of nodes included in the tree structure (S12491).

Next, the three-dimensional data decoding device decodes the encoded geometry information based on the division number information (S12492).

The division number information includes common division number information collectively indicating the total number of divisions of two or more nodes among the plurality of nodes.

Accordingly, for nodes in which the number of divisions is the same, information indicating the number of divisions is collected as common information. Therefore, the data amount included in the bitstream can be reduced.

Furthermore, for example, among the plurality of nodes, nodes located at a same depth in the tree structure are divided into a same number of divisions. In this case, for example, the division number information indicates the total number of divisions of nodes for each of depths in the tree structure. Furthermore, for example, the common division number information collectively indicates the total number of divisions of nodes for a plurality of depths.

Accordingly, for nodes in which the number of divisions is the same, information indicating the number of divisions is collected as common information for a plurality of depths, Therefore, the data amount included in the bitstream can be reduced.

Furthermore, for example, the common division number information includes trigger information indicating that nodes have a same number of divisions from a predetermined depth and beyond in the tree structure.

Accordingly, the number of divisions of nodes can be easily determined by means of trigger information.

Furthermore, for example, the common division number information further includes end depth information indicating an end depth up to which the number of divisions of nodes from the predetermined depth is the same.

Accordingly, for example, when the numbers of divisions of nodes are viewed in order from the shallowest depth, if the number of divisions of nodes is successively the same from an intermediate depth, the number of divisions of the nodes can be easily determined.

Furthermore, for example, the plurality of nodes each correspond to at least part of a space in a three-axis orthogonal coordinate system. In this case, for example, the division number information includes flag information indicating, for each of depths in the tree structure, whether to divide the space in each of three axial directions of the three-axis orthogonal coordinate system. Furthermore, for example, the trigger information is the flag information indicating not to divide the space in each of the three axial directions.

Accordingly, the number of division of nodes can be appropriately determined even with trigger information that is simply indicated using flag information.

Furthermore, for example, the three-dimensional data decoding device includes a processor and memory, and the processor performs the above process using the memory. A control program for performing the above process may be stored in the memory.

Embodiment 4

Figure 55:
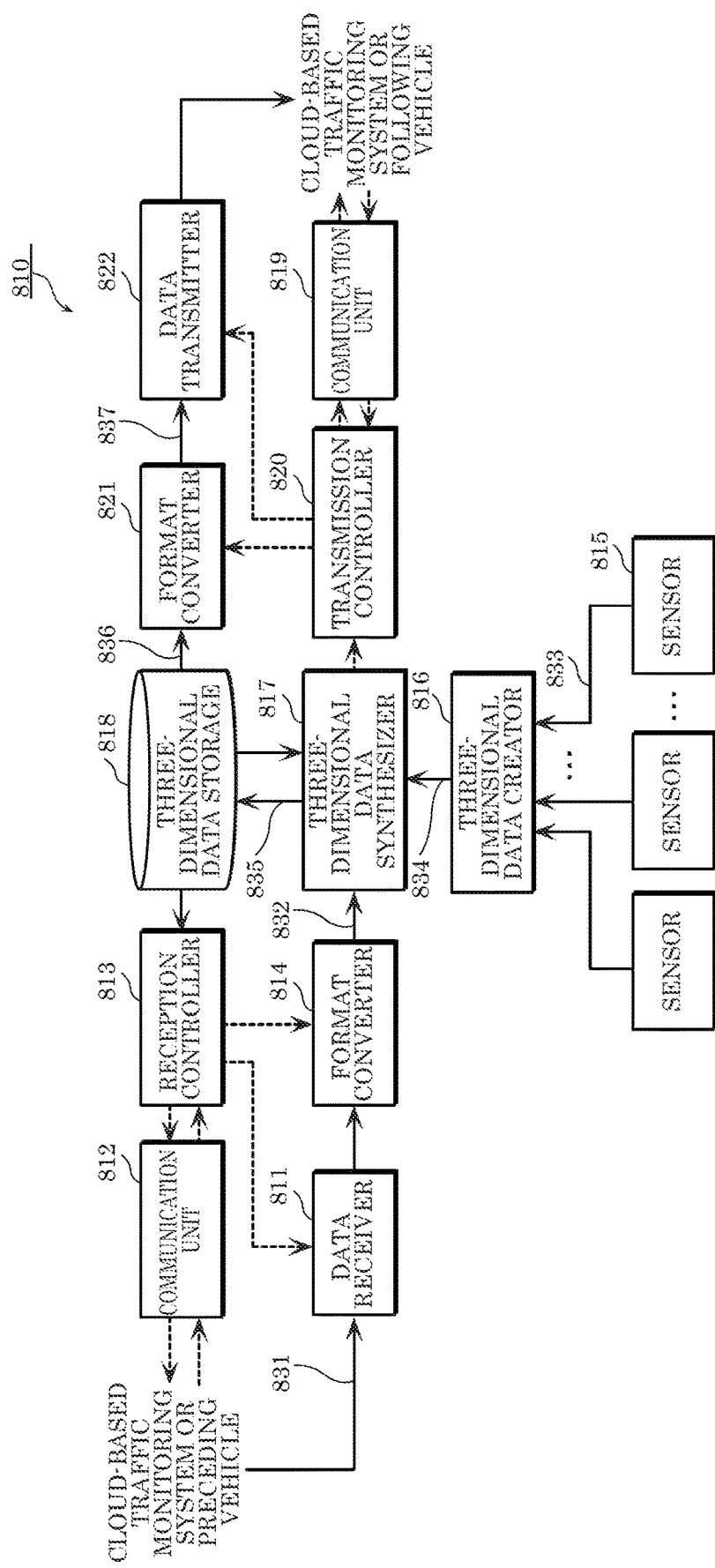
FIG. 55 is a block diagram of a three-dimensional data creation device according to Embodiment 4.

The following describes the structure of three-dimensional data creation device 810 according to the present embodiment. FIG. 55 is a block diagram of an exemplary structure of three-dimensional data creation device 810 according to the present embodiment, Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point group data), when sensors 815 are laser sensors such as LiDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present, Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Figure 56:
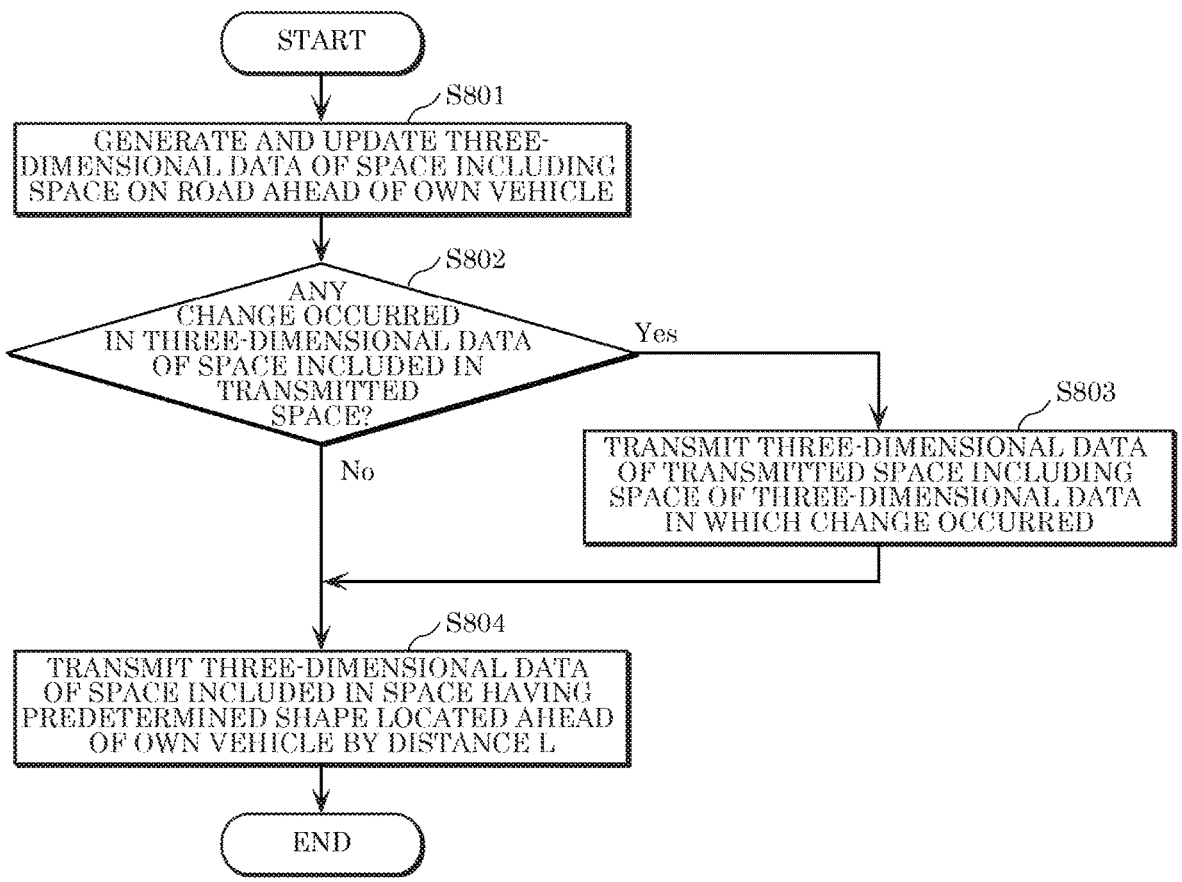
FIG. 56 is a flowchart of a three-dimensional data creation method according to Embodiment 4.

The following describes the steps performed by three-dimensional data creation device 810 of transmitting three-dimensional data to a following vehicle. FIG. 56 is a flowchart showing exemplary steps performed by three-dimensional data creation device 810 of transmitting three-dimensional data to a cloud-based traffic monitoring system or a following vehicle.

First, three-dimensional data creation device 810 generates and updates three-dimensional data 835 of a space that includes space on the road ahead of the own vehicle (S801). More specifically, three-dimensional data creation device 810 synthesizes three-dimensional data 834 created on the basis of sensor information 833 of the own vehicle with three-dimensional data 831 created by the cloud-based traffic monitoring system or the preceding vehicle, etc., for example, thereby forming three-dimensional data 835 of a space that also includes the space ahead of the preceding vehicle undetectable by sensors 815 of the own vehicle.

Three-dimensional data creation device 810 then judges whether any change has occurred in three-dimensional data 835 of the space included in the space already transmitted (S802).

When a change has occurred in three-dimensional data 835 of the space included in the space already transmitted due to, for example, a vehicle or a person entering such space from outside (Yes in S802), three-dimensional data creation device 810 transmits, to the cloud-based traffic monitoring system or the following vehicle, the three-dimensional data that includes three-dimensional data 835 of the space in which the change has occurred (S803).

Three-dimensional data creation device 810 may transmit three-dimensional data in which a change has occurred, at the same timing of transmitting three-dimensional data that is transmitted at a predetermined time interval, or may transmit three-dimensional data in which a change has occurred soon after the detection of such change. Stated differently, three-dimensional data creation device 810 may prioritize the transmission of three-dimensional data of the space in which a change has occurred to the transmission of three-dimensional data that is transmitted at a predetermined time interval.

Also, three-dimensional data creation device 810 may transmit, as three-dimensional data of a space in which a change has occurred, the whole three-dimensional data of the space in which such change has occurred, or may transmit only a difference in the three-dimensional data (e.g., information on three-dimensional points that have appeared or vanished, or information on the displacement of three-dimensional points).

Three-dimensional data creation device 810 may also transmit, to the following vehicle, meta-data on a risk avoidance behavior of the own vehicle such as hard breaking warning, before transmitting three-dimensional data of the space in which a change has occurred. This enables the following vehicle to recognize at an early stage that the preceding vehicle is to perform hard braking, etc., and thus to start performing a risk avoidance behavior at an early stage such as speed reduction.

When no change has occurred in three-dimensional data 835 of the space included in the space already transmitted (No in S802), or after step S803, three-dimensional data creation device 810 transmits, to the cloud-based traffic monitoring system or the following vehicle, three-dimensional data of the space included in the space having a predetermined shape and located ahead of the own vehicle by distance L (S804).

The processes of step S801 through step S804 are repeated, for example at a predetermined time interval.

When three-dimensional data 835 of the current space to be transmitted includes no difference from the three-dimensional map, three-dimensional data creation device 810 may not transmit three-dimensional data 837 of the space.

In the present embodiment, a client device transmits sensor information obtained through a sensor to a server or another client device.

Figure 57:
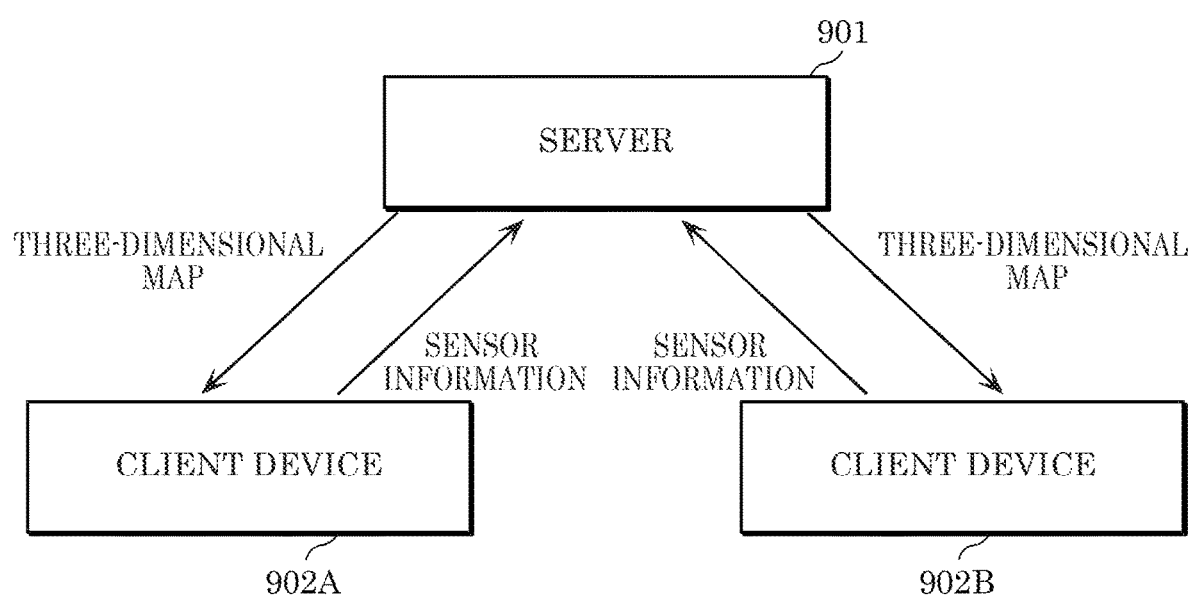
FIG. 57 is a diagram showing a structure of a system according to Embodiment 4.

A structure of a system according to the present embodiment will first be described. FIG. 57 is a diagram showing the structure of a transmission/reception system of a three-dimensional map and sensor information according to the present embodiment. This system includes server 901, and client devices 902A and 902B, Note that client devices 902A and 902B are also referred to as client device 902 when no particular distinction is made therebetween, Client device 902 is, for example, a vehicle-mounted device equipped in a mobile object such as a vehicle, Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once, Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902, Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 58:
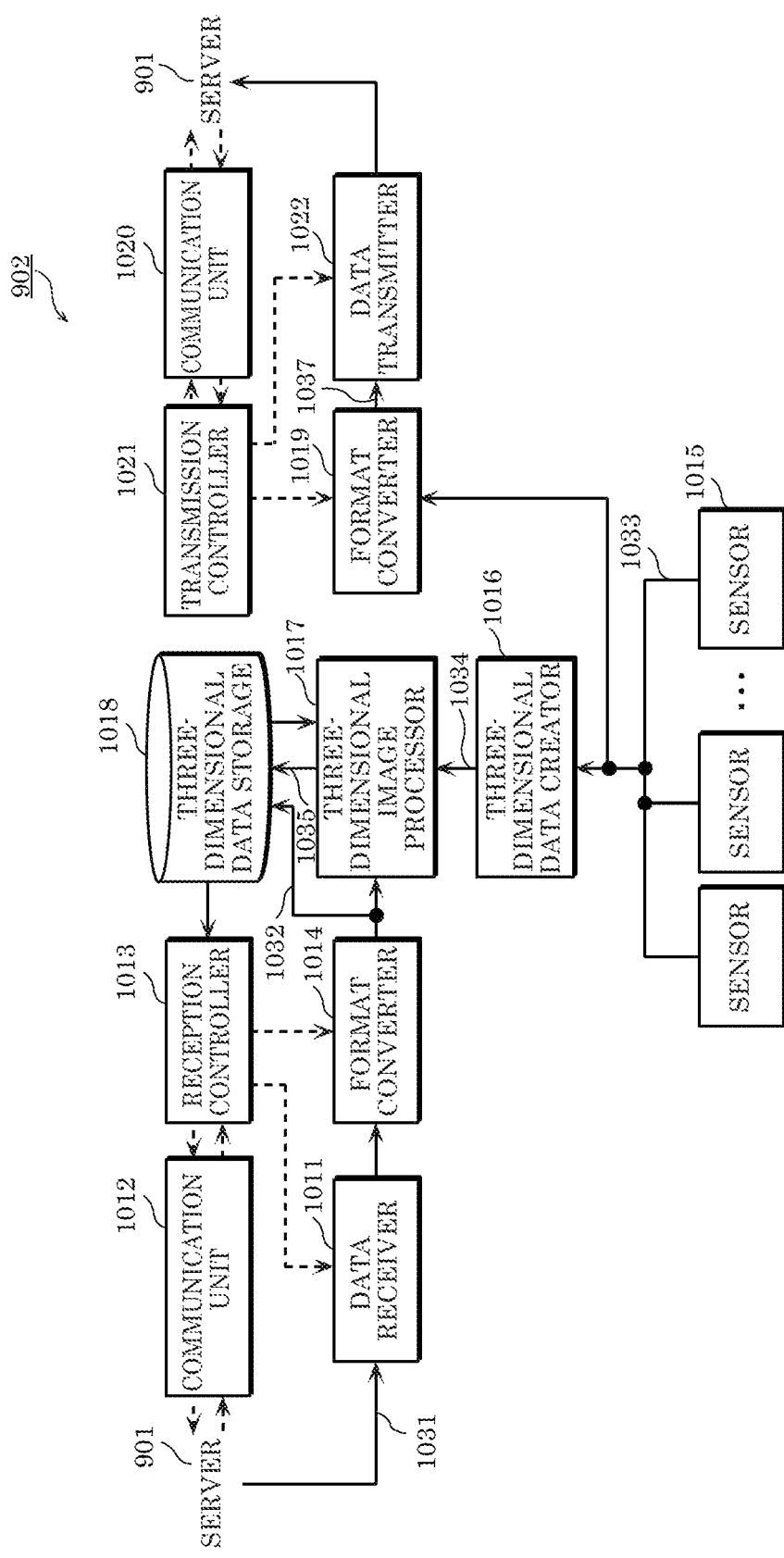
FIG. 58 is a block diagram of a client device according to Embodiment 4.

FIG. 58 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g., transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 1015 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033, Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example information obtained through sensors 1015, such as information obtained by LiDAR, a luminance image obtained by a visible light camera, an infrared image obtained by an infrared camera, a depth image obtained by a depth sensor, sensor position information, and sensor speed information.

Figure 59:
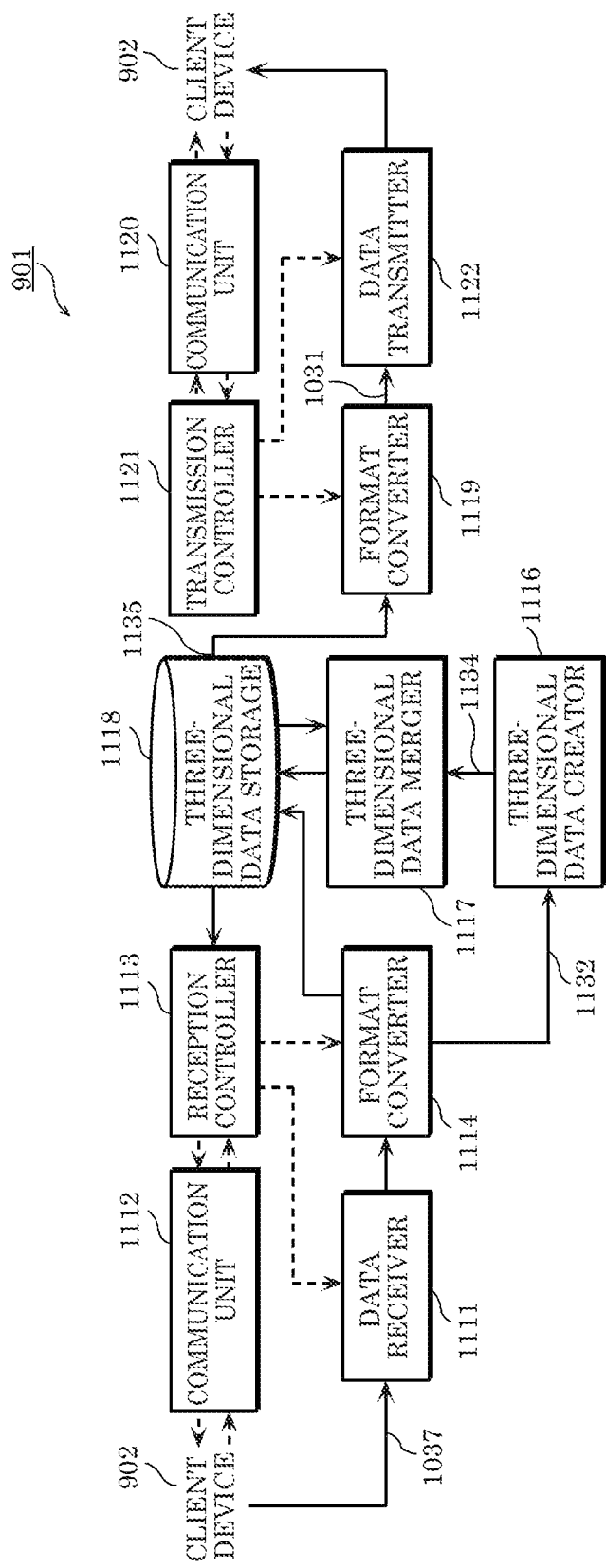
FIG. 59 is a block diagram of a server according to Embodiment 4.

A structure of server 901 will be described next. FIG. 59 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional lap from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g., transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

Figure 60:
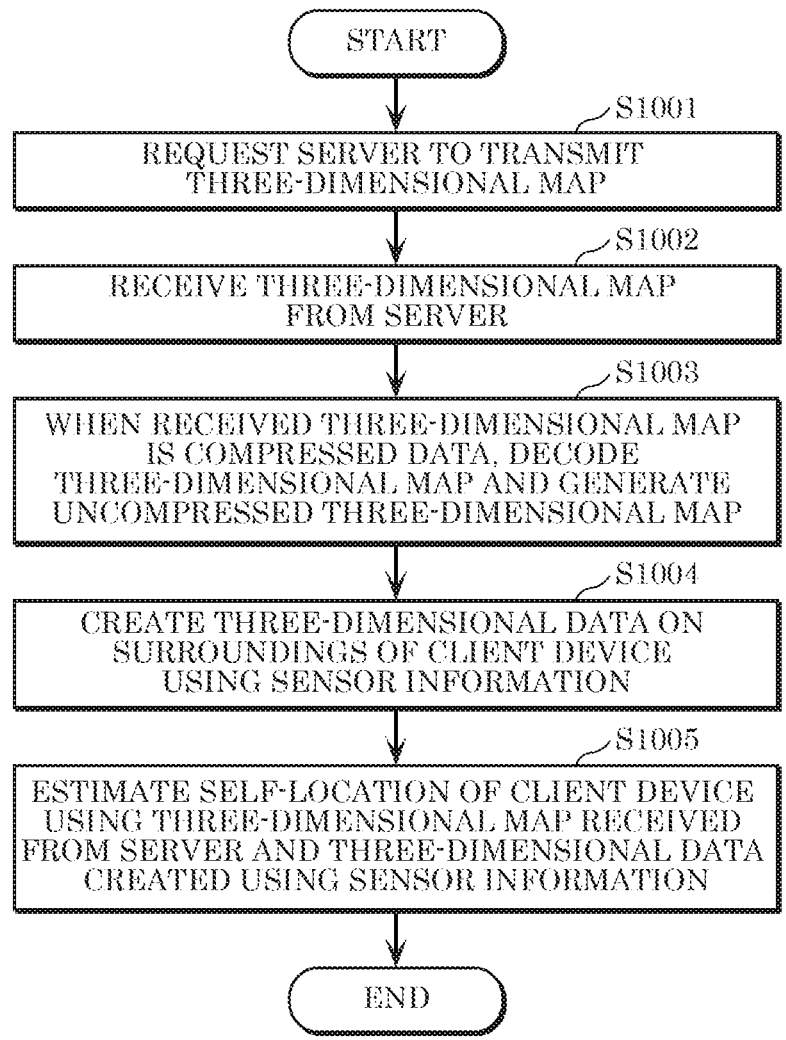
FIG. 60 is a flowchart of a three-dimensional data creation process performed by the client device according to Embodiment 4.

An operational flow of client device 902 will be described next. FIG. 60 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information, Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

Figure 61:
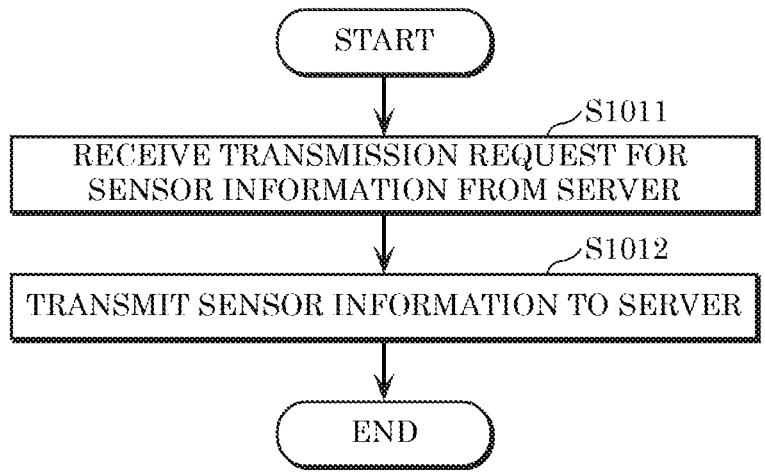
FIG. 61 is a flowchart of a sensor information transmission process performed by the client device according to Embodiment 4.

FIG. 61 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

Figure 62:
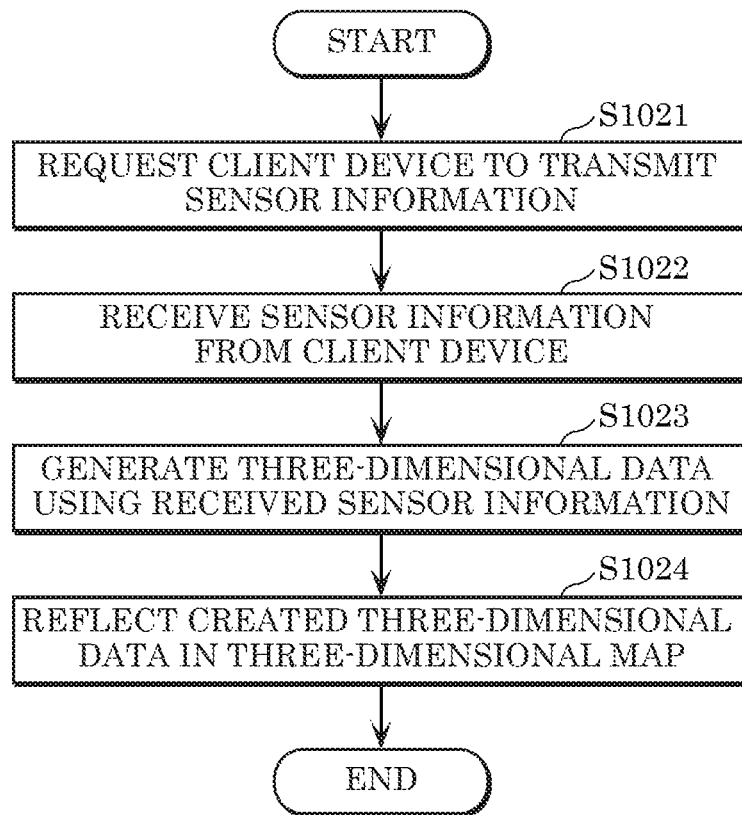
FIG. 62 is a flowchart of a three-dimensional data creation process performed by the server according to Embodiment 4.

An operational flow of server 901 will be described next. FIG. 62 is a flowchart of an operation when server 901 obtains the sensor information. Server 901 first requests client device 902 to transmit the sensor information (S1021). Server 901 next receives sensor information 1037 transmitted from client device 902 in accordance with the request (S1022), Server 901 next creates three-dimensional data 1134 using the received sensor information 1037 (S1023), Server 901 next reflects the created three-dimensional data 1134 in three-dimensional map 1135 (S1024).

Figure 63:
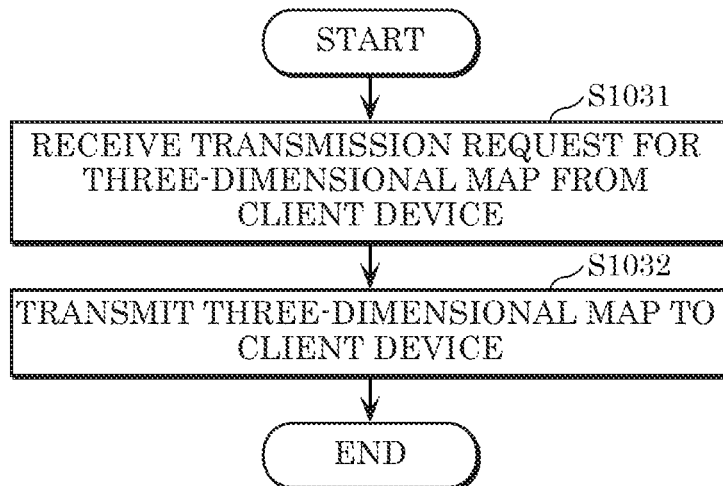
FIG. 63 is a flowchart of a three-dimensional map transmission process performed by the server according to Embodiment 4.

FIG. 63 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

The following describes variations of the present embodiment.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LiDAR, it is conceivable to assign identifiers to the sensor performance, A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using obtained sensor information 1037. For example, when the sensor performance is high in precision (class 1), server 901 does not correct three-dimensional data 1134, When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space, Server 901 does not need to use all of the sensor information for creating three-dimensional data 1134 and may, for example, select sensor information to be used in accordance with the sensor performance, when having received a plurality of pieces of sensor information from the plurality of client devices 902, For example, when updating three-dimensional map 1135, server 901 may select high-precision sensor information (class 1) from among the received plurality of pieces of sensor information, and create three-dimensional data 1134 using the selected sensor information.

Figure 64:
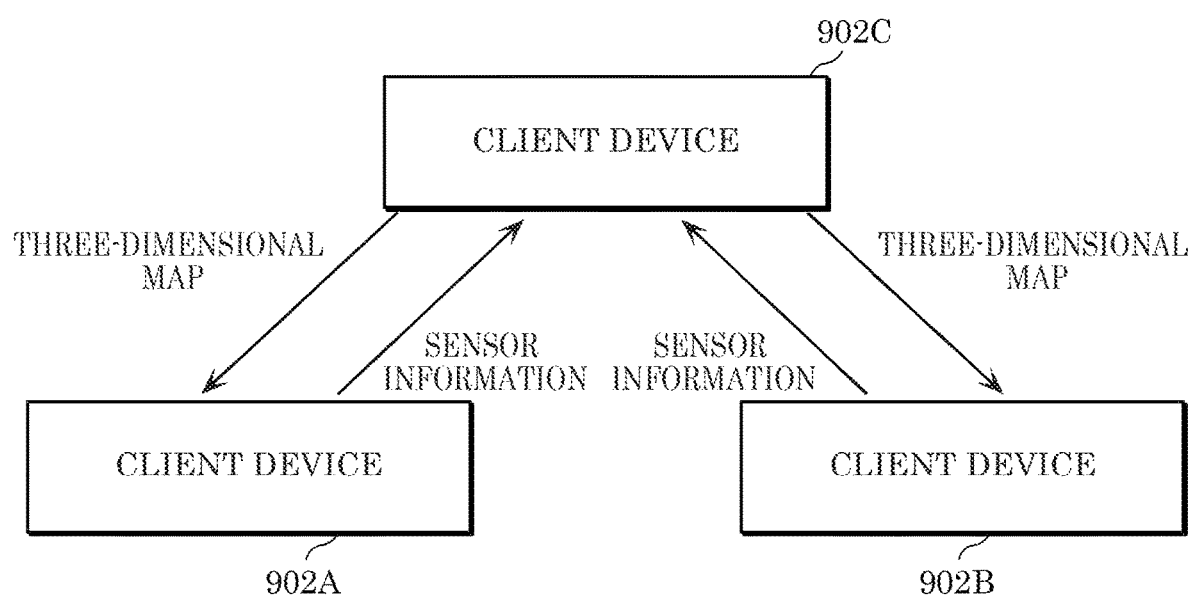
FIG. 64 is a diagram showing a structure of a variation of the system according to Embodiment 4.

Server 901 is not limited to only being a server such as a cloud-based traffic monitoring system, and may also be another (vehicle-mounted) client device, FIG. 64 is a diagram of a system structure in this case.

For example, client device 902C sends a transmission request for sensor information to client device 902A located nearby, and obtains the sensor information from client device 902A, Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C, When a sensor of client device 902A or client device 902B has high performance, client device 902C is capable of creating the three-dimensional data using the sensor information obtained by this high-performance sensor.

Figure 65:
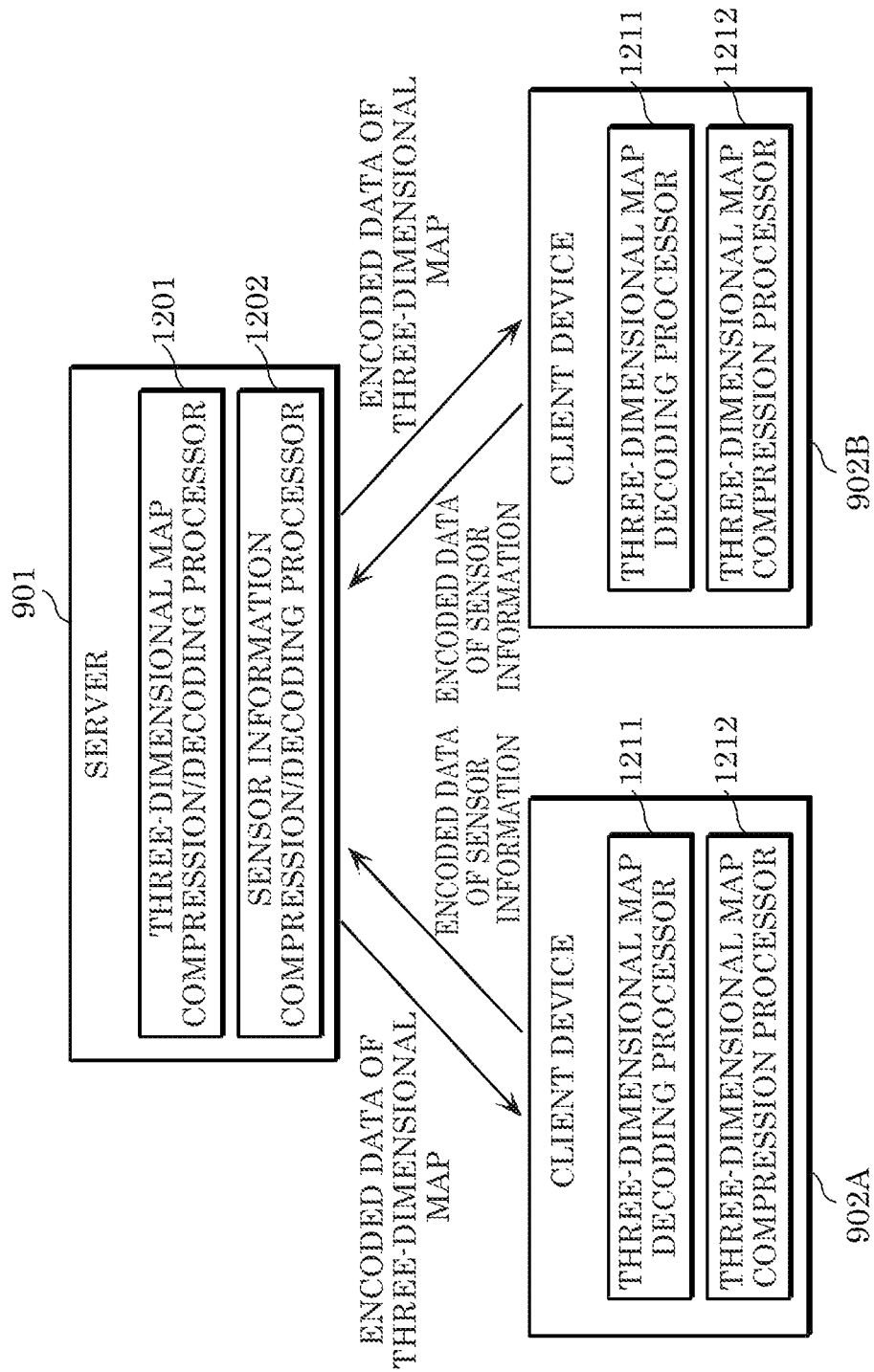
FIG. 65 is a diagram showing a structure of the server and client devices according to Embodiment 4.

FIG. 65 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map, Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits obtained sensor information 1033 to server 901 or another client device 902.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1033 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another client device 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using received sensor information 1037.

With this, server 901 creates three-dimensional data 1134 using sensor information 1037 transmitted from client device 902, This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Figure 66:
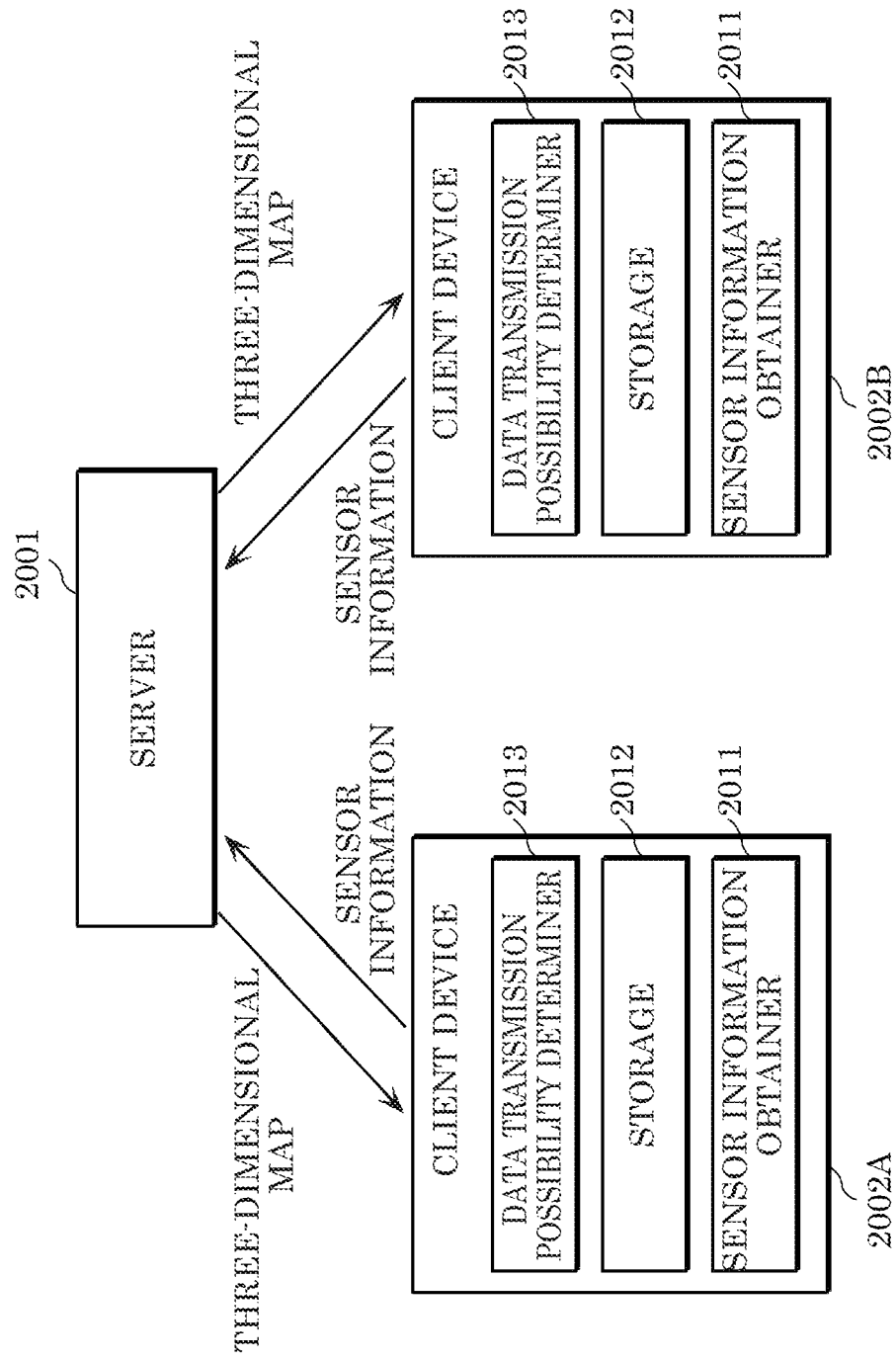
FIG. 66 is a diagram illustrating a configuration of a server and a client device according to Embodiment 4.

The following will describe a variation of the present embodiment. FIG. 66 is a diagram illustrating a configuration of a system according to the present embodiment. The system illustrated in FIG. 66 includes server 2001, client device 2002A, and client device 20023.

Client device 2002A and client device 20023 are each provided in a mobile object such as a vehicle, and transmit sensor information to server 2001. Server 2001 transmits a three-dimensional map (a point cloud) to client device 2002A and client device 20023.

Client device 2002A includes sensor information obtainer 2011, storage 2012, and data transmission possibility determiner 2013. It should be noted that client device 20023 has the same configuration. Additionally, when client device 2002A and client device 2002B are not particularly distinguished below, client device 2002A and client device 20023 are also referred to as client device 2002.

Figure 67:
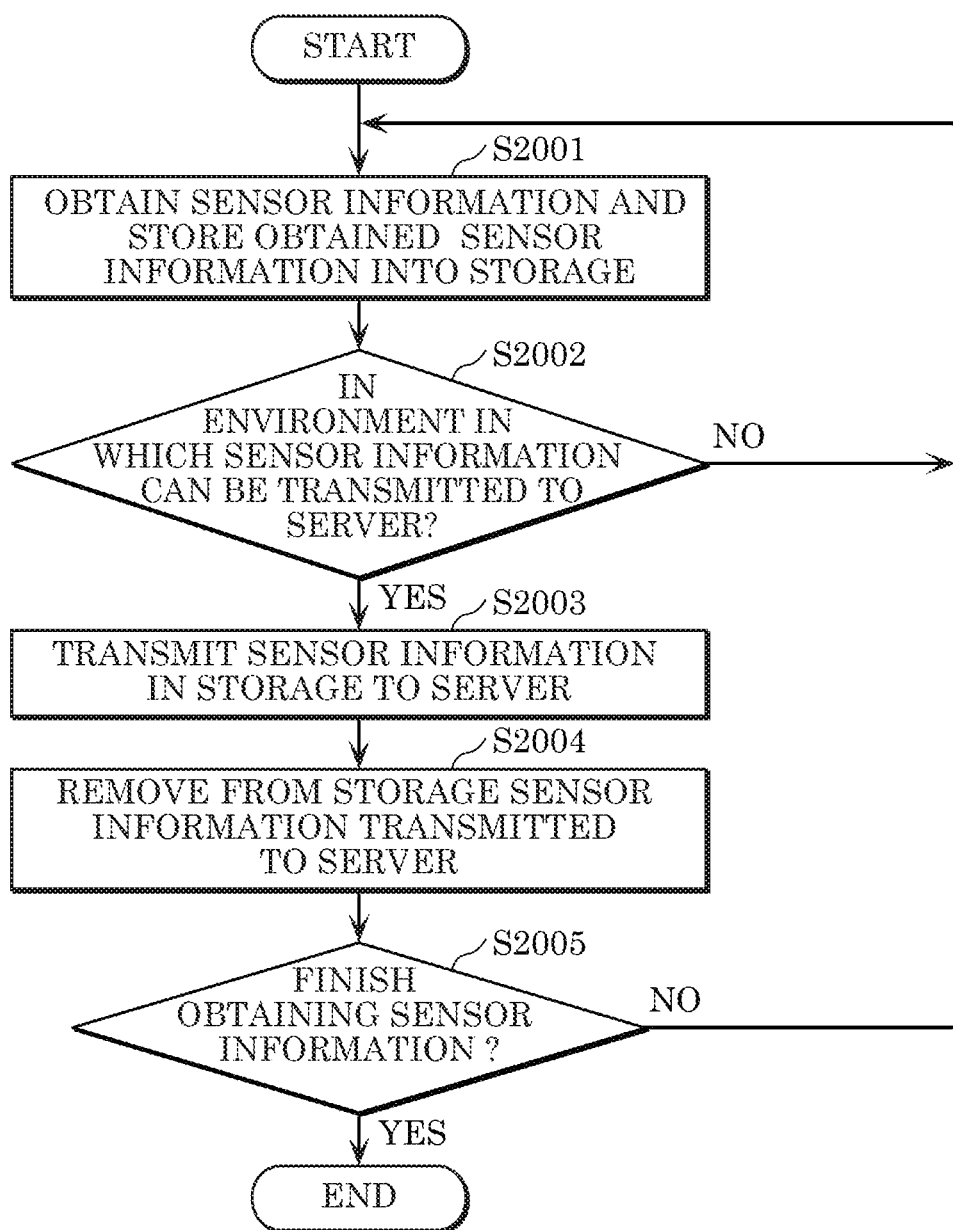
FIG. 67 is a flowchart of a process performed by the client device according to Embodiment 4.

FIG. 67 is a flowchart illustrating operation of client device 2002 according to the present embodiment.

Sensor information obtainer 2011 obtains a variety of sensor information using sensors (a group of sensors) provided in a mobile object.

In other words, sensor information obtainer 2011 obtains sensor information obtained by the sensors (the group of sensors) provided in the mobile object and indicating a surrounding state of the mobile object. Sensor information obtainer 2011 also stores the obtained sensor information into storage 2012. This sensor information includes at least one of information obtained by LiDAR, a visible light image, an infrared image, or a depth image. Additionally, the sensor information may include at least one of sensor position information, speed information, obtainment time information, or obtainment location information. Sensor position information indicates a position of a sensor that has obtained sensor information. Speed information indicates a speed of the mobile object when a sensor obtained sensor information. Obtainment time information indicates a time when a sensor obtained sensor information. Obtainment location information indicates a position of the mobile object or a sensor when the sensor obtained sensor information.

Next, data transmission possibility determiner 2013 determines whether the mobile object (client device 2002) is in an environment in which the mobile object can transmit sensor information to server 2001 (S2002). For example, data transmission possibility determiner 2013 may specify a location and a time at which client device 2002 is present using GPS information etc., and may determine whether data can be transmitted. Additionally, data transmission possibility determiner 2013 may determine whether data can be transmitted, depending on whether it is possible to connect to a specific access point.

When client device 2002 determines that the mobile object is in the environment in which the mobile object can transmit the sensor information to server 2001 (YES in S2002), client device 2002 transmits the sensor information to server 2001 (S2003), In other words, when client device 2002 becomes capable of transmitting sensor information to server 2001, client device 2002 transmits the sensor information held by client device 2002 to server 2001. For example, an access point that enables high-speed communication using millimeter waves is provided in an intersection or the like. When client device 2002 enters the intersection, client device 2002 transmits the sensor information held by client device 2002 to server 2001 at high speed using the millimeter-wave communication.

Next, client device 2002 deletes from storage 2012 the sensor information that has been transmitted to server 2001 (S2004). It should be noted that when sensor information that has not been transmitted to server 2001 meets predetermined conditions, client device 2002 may delete the sensor information. For example, when an obtainment time of sensor information held by client device 2002 precedes a current time by a certain time, client device 2002 may delete the sensor information from storage 2012. In other words, when a difference between the current time and a time when a sensor obtained sensor information exceeds a predetermined time, client device 2002 may delete the sensor information from storage 2012. Besides, when an obtainment location of sensor information held by client device 2002 is separated from a current location by a certain distance, client device 2002 may delete the sensor information from storage 2012. In other words, when a difference between a current position of the mobile object or a sensor and a position of the mobile object or the sensor when the sensor obtained sensor information exceeds a predetermined distance, client device 2002 may delete the sensor information from storage 2012, Accordingly, it is possible to reduce the capacity of storage 2012 of client device 2002.

When client device 2002 does not finish obtaining sensor information (NO in S2005), client device 2002 performs step S2001 and the subsequent steps again. Further, when client device 2002 finishes obtaining sensor information (YES in S2005), client device 2002 completes the process.

Client device 2002 may select sensor information to be transmitted to server 2001, in accordance with communication conditions. For example, when high-speed communication is available, client device 2002 preferentially transmits sensor information (e.g., information obtained by LiDAR) of which the data size held in storage 2012 is large. Additionally, when high-speed communication is not readily available, client device 2002 transmits sensor information (e.g., a visible light image) which has high priority and of which the data size held in storage 2012 is small. Accordingly, client device 2002 can efficiently transmit sensor information held in storage 2012, in accordance with network conditions Client device 2002 may obtain, from server 2001, time information indicating a current time and location information indicating a current location. Moreover, client device 2002 may determine an obtainment time and an obtainment location of sensor information based on the obtained time information and location information. In other words, client device 2002 may obtain time information from server 2001 and generate obtainment time information using the obtained time information. Client device 2002 may also obtain location information from server 2001 and generate obtainment location information using the obtained location information.

For example, regarding time information, server 2001 and client device 2002 perform clock synchronization using a means such as the Network Time Protocol (NTP) or the Precision Time Protocol (PTP). This enables client device 2002 to obtain accurate time information. What's more, since it is possible to synchronize docks between server 2001 and client devices 2002, it is possible to synchronize times included in pieces of sensor information obtained by separate client devices 2002. As a result, server 2001 can handle sensor information indicating a synchronized time. It should be noted that a means of synchronizing docks may be any means other than the NTP or PTP. In addition, GPS information may be used as the time information and the location information.

Server 2001 may specify a time or a location and obtain pieces of sensor information from client devices 2002. For example, when an accident occurs, in order to search for a client device in the vicinity of the accident, server 2001 specifies an accident occurrence time and an accident occurrence location and broadcasts sensor information transmission requests to client devices 2002. Then, client device 2002 having sensor information obtained at the corresponding time and location transmits the sensor information to server 2001. In other words, client device 2002 receives, from server 2001, a sensor information transmission request including specification information specifying a location and a time. When sensor information obtained at a location and a time indicated by the specification information is stored in storage 2012, and client device 2002 determines that the mobile object is present in the environment in which the mobile object can transmit the sensor information to server 2001, client device 2002 transmits, to server 2001, the sensor information obtained at the location and the time indicated by the specification information. Consequently, server 2001 can obtain the pieces of sensor information pertaining to the occurrence of the accident from client devices 2002, and use the pieces of sensor information for accident analysis etc.

It should be noted that when client device 2002 receives a sensor information transmission request from server 2001, client device 2002 may refuse to transmit sensor information. Additionally, client device 2002 may set in advance which pieces of sensor information can be transmitted. Alternatively, server 2001 may inquire of client device 2002 each time whether sensor information can be transmitted.

A point may be given to client device 2002 that has transmitted sensor information to server 2001. This point can be used in payment for, for example, gasoline expenses, electric vehicle (EV) charging expenses, a highway toll, or rental car expenses, After obtaining sensor information, server 2001 may delete information for specifying client device 2002 that has transmitted the sensor information. For example, this information is a network address of client device 2002. Since this enables the anonymization of sensor information, a user of client device 2002 can securely transmit sensor information from client device 2002 to server 2001. Server 2001 may include servers. For example, by servers sharing sensor information, even when one of the servers breaks down, the other servers can communicate with client device 2002. Accordingly, it is possible to avoid service outage due to a server breakdown.

A specified location specified by a sensor information transmission request indicates an accident occurrence location etc., and may be different from a position of client device 2002 at a specified time specified by the sensor information transmission request. For this reason, for example, by specifying, as a specified location, a range such as within XX meters of a surrounding area, server 2001 can request information from client device 2002 within the range. Similarly, server 2001 may also specify, as a specified time, a range such as within N seconds before and after a certain time. As a result, server 2001 can obtain sensor information from client device 2002 present for a time from t−N to t+N and in a location within XX meters from absolute position S. When client device 2002 transmits three-dimensional data such as LiDAR, client device 2002 may transmit data created immediately after time t.

Server 2001 may separately specify information indicating, as a specified location, a location of client device 2002 from which sensor information is to be obtained, and a location at which sensor information is desirably obtained. For example, server 2001 specifies that sensor information including at least a range within YY meters from absolute position S is to be obtained from client device 2002 present within XX meters from absolute position S. When client device 2002 selects three-dimensional data to be transmitted, client device 2002 selects one or more pieces of three-dimensional data so that the one or more pieces of three-dimensional data include at least the sensor information including the specified range. Each of the one or more pieces of three-dimensional data is a random-accessible unit of data. In addition, when client device 2002 transmits a visible light image, client device 2002 may transmit pieces of temporally continuous image data including at least a frame immediately before or immediately after time t.

When client device 2002 can use physical networks such as 5G, Wi-Fi, or modes in 5G for transmitting sensor information, client device 2002 may select a network to be used according to the order of priority notified by server 2001. Alternatively, client device 2002 may select a network that enables client device 2002 to ensure an appropriate bandwidth based on the size of transmit data. Alternatively, client device 2002 may select a network to be used, based on data transmission expenses etc. A transmission request from server 2001 may include information indicating a transmission deadline, for example, performing transmission when client device 2002 can start transmission by time t. When server 2001 cannot obtain sufficient sensor information within a time limit, server 2001 may issue a transmission request again.

Sensor information may include header information indicating characteristics of sensor data along with compressed or uncompressed sensor data. Client device 2002 may transmit header information to server 2001 via a physical network or a communication protocol that is different from a physical network or a communication protocol used for sensor data. For example, client device 2002 transmits header information to server 2001 prior to transmitting sensor data, Server 2001 determines whether to obtain the sensor data of client device 2002, based on a result of analysis of the header information. For example, header information may include information indicating a point cloud obtainment density, an elevation angle, or a frame rate of LiDAR, or information indicating, for example, a resolution, an SN ratio, or a frame rate of a visible light image. Accordingly, server 2001 can obtain the sensor information from client device 2002 having the sensor data of determined quality.

As stated above, client device 2002 is provided in the mobile object, obtains sensor information that has been obtained by a sensor provided in the mobile object and indicates a surrounding state of the mobile object, and stores the sensor information into storage 2012. Client device 2002 determines whether the mobile object is present in an environment in which the mobile object is capable of transmitting the sensor information to server 2001, and transmits the sensor information to server 2001 when the mobile object is determined to be present in the environment in which the mobile object is capable of transmitting the sensor information to server 2001.

Additionally, client device 2002 further creates, from the sensor information, three-dimensional data of a surrounding area of the mobile object, and estimates a self-location of the mobile object using the three-dimensional data created.

Besides, client device 2002 further transmits a transmission request for a three-dimensional map to server 2001, and receives the three-dimensional map from server 2001, In the estimating, client device 2002 estimates the self-location using the three-dimensional data and the three-dimensional map.

It should be noted that the above process performed by client device 2002 may be realized as an information transmission method for use in client device 2002.

In addition, client device 2002 may include a processor and memory. Using the memory, the processor may perform the above process.

Figure 68:
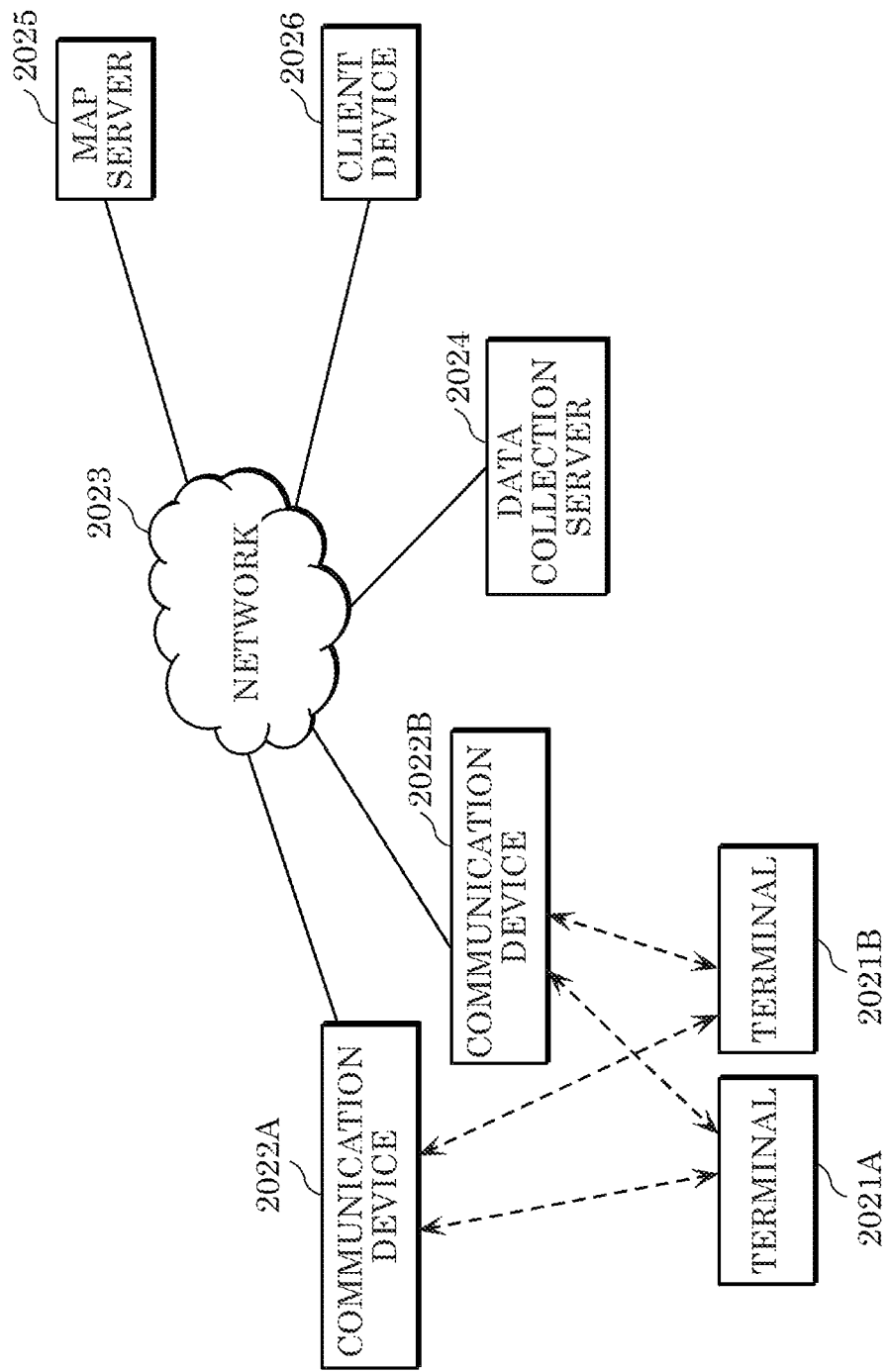
FIG. 68 is a diagram illustrating a configuration of a sensor information collection system according to Embodiment 4.

Next, a sensor information collection system according to the present embodiment will be described. FIG. 68 is a diagram illustrating a configuration of the sensor information collection system according to the present embodiment. As illustrated in FIG. 68, the sensor information collection system according to the present embodiment includes terminal 2021A, terminal 2021B, communication device 2022A, communication device 2022B, network 2023, data collection server 2024, map server 2025, and client device 2026. It should be noted that when terminal 2021A and terminal 2021B are not particularly distinguished, terminal 2021A and terminal 2021B are also referred to as terminal 2021. Additionally, when communication device 2022A and communication device 2022B are not particularly distinguished, communication device 2022A and communication device 2022B are also referred to as communication device 2022.

Data collection server 2024 collects data such as sensor data obtained by a sensor included in terminal 2021 as position-related data in which the data is associated with a position in a three-dimensional space.

Sensor data is data obtained by, for example, detecting a surrounding state of terminal 2021 or an internal state of terminal 2021 using a sensor included in terminal 2021. Terminal 2021 transmits, to data collection server 2024, one or more pieces of sensor data collected from one or more sensor devices in locations at which direct communication with terminal 2021 is possible or at which communication with terminal 2021 is possible by the same communication system or via one or more relay devices.

Data included in position-related data may include, for example, information indicating an operating state, an operating log, a service use state, etc. of a terminal or a device included in the terminal. In addition, the data include in the position-related data may include, for example, information in which an identifier of terminal 2021 is associated with a position or a movement path etc, of terminal 2021.

Information indicating a position included in position-related data is associated with, for example, information indicating a position in three-dimensional data such as three-dimensional map data. The details of information indicating a position will be described later.

Position-related data may include at least one of the above-described time information or information indicating an attribute of data included in the position-related data or a type (e.g., a model number) of a sensor that has created the data, in addition to position information that is information indicating a position. The position information and the time information may be stored in a header area of the position-related data or a header area of a frame that stores the position-related data. Further, the position information and the time information may be transmitted and/or stored as metadata associated with the position-related data, separately from the position-related data.

Map server 2025 is connected to, for example, network 2023, and transmits three-dimensional data such as three-dimensional map data in response to a request from another device such as terminal 2021. Besides, as described in the aforementioned embodiments, map server 2025 may have, for example, a function of updating three-dimensional data using sensor information transmitted from terminal 2021.

Data collection server 2024 is connected to, for example, network 2023, collects position-related data from another device such as terminal 2021, and stores the collected position-related data into a storage of data collection server 2024 or a storage of another server. In addition, data collection server 2024 transmits, for example, metadata of collected position-related data or three-dimensional data generated based on the position-related data, to terminal 2021 in response to a request from terminal 2021.

Network 2023 is, for example, a communication network such as the Internet. Terminal 2021 is connected to network 2023 via communication device 2022. Communication device 2022 communicates with terminal 2021 using one communication system or switching between communication systems. Communication device 2022 is a communication satellite that performs communication using, for example, (1) a base station compliant with Long-Term Evolution (LTE) etc., (2) an access point (AP) for Wi-Fi or millimeter-wave communication etc., (3) a low-power wide-area (LPWA) network gateway such as SIGFOX, LoRaWAN, or Wi-SUN, or (4) a satellite communication system such as DVB-S2.

It should be noted that a base station may communicate with terminal 2021 using a system classified as an LPWA network such as Narrowband Internet of Things (NB IoT) or LTE-M, or switching between these systems.

Here, although, in the example given, terminal 2021 has a function of communicating with communication device 2022 that uses two types of communication systems, and communicates with map server 2025 or data collection server 2024 using one of the communication systems or switching between the communication systems and between communication devices 2022 to be a direct communication partner; a configuration of the sensor information collection system and terminal 2021 is not limited to this. For example, terminal 2021 need not have a function of performing communication using communication systems, and may have a function of performing communication using one of the communication systems, Terminal 2021 may also support three or more communication systems, Additionally, each terminal 2021 may support a different communication system.

Terminal 2021 includes, for example, the configuration of client device 902 illustrated in FIG. 58. Terminal 2021 estimates a self-location etc. using received three-dimensional data. Besides, terminal 2021 associates sensor data obtained from a sensor and position information obtained by self-location estimation to generate position-related data.

Position information appended to position-related data indicates, for example, a position in a coordinate system used for three-dimensional data. For example, the position information is coordinate values represented using a value of a latitude and a value of a longitude, Here, terminal 2021 may include, in the position information, a coordinate system serving as a reference for the coordinate values and information indicating three-dimensional data used for location estimation, along with the coordinate values, Coordinate values may also include altitude information.

The position information may be associated with a data unit or a space unit usable for encoding the above three-dimensional data, Such a unit is, for example, WLD, GOS, SPC, VLM, or VXL. Here, the position information is represented by, for example, an identifier for identifying a data unit such as the SPC corresponding to position-related data. It should be noted that the position information may include, for example, information indicating three-dimensional data obtained by encoding a three-dimensional space including a data unit such as the SPC or information indicating a detailed position within the SPC, in addition to the identifier for identifying the data unit such as the SPC. The information indicating the three-dimensional data is, for example, a file name of the three-dimensional data.

As stated above, by generating position-related data associated with position information based on location estimation using three-dimensional data, the system can give more accurate position information to sensor information than when the system appends position information based on a self-location of a client device (terminal 2021) obtained using a GPS to sensor information. As a result, even when another device uses the position-related data in another service, there is a possibility of more accurately determining a position corresponding to the position-related data in an actual space, by performing location estimation based on the same three-dimensional data.

It should be noted that although the data transmitted from terminal 2021 is the position-related data in the example given in the present embodiment, the data transmitted from terminal 2021 may be data unassociated with position information. In other words, the transmission and reception of three-dimensional data or sensor data described in the other embodiments may be performed via network 2023 described in the present embodiment.

Next, a different example of position information indicating a position in a three-dimensional or two-dimensional actual space or in a map space will be described. The position information appended to position-related data may be information indicating a relative position relative to a keypoint in three-dimensional data, Here, the keypoint serving as a reference for the position information is encoded as, for example, SWLD, and notified to terminal 2021 as three-dimensional data.

The information indicating the relative position relative to the keypoint may be, for example, information that is represented by a vector from the keypoint to the point indicated by the position information, and indicates a direction and a distance from the keypoint to the point indicated by the position information. Alternatively, the information indicating the relative position relative to the keypoint may be information Indicating an amount of displacement from the keypoint to the point indicated by the position information along each of the x axis, the y axis, and the z axis. Additionally, the information indicating the relative position relative to the keypoint may be information indicating a distance from each of three or more keypoints to the point indicated by the position information. It should be noted that the relative position need not be a relative position of the point indicated by the position information represented using each keypoint as a reference, and may be a relative position of each keypoint represented with respect to the point indicated by the position information. Examples of position information based on a relative position relative to a keypoint include information for identifying a keypoint to be a reference, and information indicating the relative position of the point indicated by the position information and relative to the keypoint. When the information indicating the relative position relative to the keypoint is provided separately from three-dimensional data, the information indicating the relative position relative to the keypoint may include, for example, coordinate axes used in deriving the relative position, information indicating a type of the three-dimensional data, and/or information indicating a magnitude per unit amount (e.g., a scale) of a value of the information indicating the relative position.

The position information may include, for each keypoint, information indicating a relative position relative to the keypoint. When the position information is represented by relative positions relative to keypoints, terminal 2021 that intends to identify a position in an actual space indicated by the position information may calculate candidate points of the position indicated by the position information from positions of the keypoints each estimated from sensor data, and may determine that a point obtained by averaging the calculated candidate points is the point indicated by the position information, Since this configuration reduces the effects of errors when the positions of the keypoints are estimated from the sensor data, it is possible to improve the estimation accuracy for the point in the actual space indicated by the position information. Besides, when the position information includes information indicating relative positions relative to keypoints, if it is possible to detect any one of the keypoints regardless of the presence of keypoints undetectable due to a limitation such as a type or performance of a sensor included in terminal 2021, it is possible to estimate a value of the point indicated by the position information.

A point identifiable from sensor data can be used as a keypoint. Examples of the point identifiable from the sensor data include a point or a point within a region that satisfies a predetermined keypoint detection condition, such as the above-described three-dimensional feature or feature of visible light data is greater than or equal to a threshold value.

Moreover, a marker etc. placed in an actual space may be used as a keypoint. In this case, the maker may be detected and located from data obtained using a sensor such as LiDAR or a camera. For example, the marker may be represented by a change in color or luminance value (degree of reflection), or a three-dimensional shape (e.g., unevenness). Coordinate values indicating a position of the marker, or a two-dimensional bar code or a bar code etc. generated from an identifier of the marker may be also used.

Furthermore, a light source that transmits an optical signal may be used as a marker. When a light source of an optical signal is used as a marker, not only information for obtaining a position such as coordinate values or an identifier but also other data may be transmitted using an optical signal. For example, an optical signal may include contents of service corresponding to the position of the marker, an address for obtaining contents such as a URL, or an identifier of a wireless communication device for receiving service, and information indicating a wireless communication system etc, for connecting to the wireless communication device. The use of an optical communication device (a light source) as a marker not only facilitates the transmission of data other than information indicating a position but also makes it possible to dynamically change the data.

Terminal 2021 finds out a correspondence relationship of keypoints between mutually different data using, for example, a common identifier used for the data, or information or a table indicating the correspondence relationship of the keypoints between the data. When there is no information indicating a correspondence relationship between keypoints, terminal 2021 may also determine that when coordinates of a keypoint in three-dimensional data are converted into a position in a space of another three-dimensional data, a keypoint closest to the position is a corresponding keypoint.

When the position information based on the relative position described above is used, terminal 2021 that uses mutually different three-dimensional data or services can identify or estimate a position indicated by the position information with respect to a common keypoint included in or associated with each three-dimensional data. As a result, terminal 2021 that uses the mutually different three-dimensional data or the services can identify or estimate the same position with higher accuracy.

Even when map data or three-dimensional data represented using mutually different coordinate systems are used, since it is possible to reduce the effects of errors caused by the conversion of a coordinate system, it is possible to coordinate services based on more accurate position information.

Hereinafter, an example of functions provided by data collection server 2024 will be described. Data collection server 2024 may transfer received position-related data to another data server. When there are data servers, data collection server 2024 determines to which data server received position-related data is to be transferred, and transfers the position-related data to a data server determined as a transfer destination.

Data collection server 2024 determines a transfer destination based on, for example, transfer destination server determination rules preset to data collection server 2024. The transfer destination server determination rules are set by, for example, a transfer destination table in which identifiers respectively associated with terminals 2021 are associated with transfer destination data servers.

Terminal 2021 appends an identifier associated with terminal 2021 to position-related data to be transmitted, and transmits the position-related data to data collection server 2024. Data collection server 2024 determines a transfer destination data server corresponding to the identifier appended to the position-related data, based on the transfer destination server determination rules set out using the transfer destination table etc.; and transmits the position-related data to the determined data server. The transfer destination server determination rules may be specified based on a determination condition set using a time, a place, etc. at which position-related data is obtained. Here, examples of the identifier associated with transmission source terminal 2021 include an identifier unique to each terminal 2021 or an identifier indicating a group to which terminal 2021 belongs.

The transfer destination table need not be a table in which identifiers associated with transmission source terminals are directly associated with transfer destination data servers. For example, data collection server 2024 holds a management table that stores tag information assigned to each identifier unique to terminal 2021, and a transfer destination table in which the pieces of tag information are associated with transfer destination data servers, Data collection server 2024 may determine a transfer destination data server based on tag information, using the management table and the transfer destination table, Here, the tag information is, for example, control information for management or control information for providing service assigned to a type, a model number, an owner of terminal 2021 corresponding to the identifier, a group to which terminal 2021 belongs, or another identifier. Moreover, in the transfer destination able, identifiers unique to respective sensors may be used instead of the identifiers associated with transmission source terminals 2021, Furthermore, the transfer destination server determination rules may be set by client device 2026.

Data collection server 2024 may determine data servers as transfer destinations, and transfer received position-related data to the data servers, According to this configuration, for example, when position-related data is automatically backed up or when, in order that position-related data is commonly used by different services, there is a need to transmit the position-related data to a data server for providing each service, it is possible to achieve data transfer as intended by changing a setting of data collection server 2024. As a result, it is possible to reduce the number of steps necessary for building and changing a system, compared to when a transmission destination of position-related data is set for each terminal 2021.

Data collection server 2024 may register, as a new transfer destination, a data server specified by a transfer request signal received from a data server; and transmit position-related data subsequently received to the data server, in response to the transfer request signal.

Data collection server 2024 may store position-related data received from terminal 2021 into a recording device, and transmit position-related data specified by a transmission request signal received from terminal 2021 or a data server to request source terminal 2021 or the data server in response to the transmission request signal.

Data collection server 2024 may determine whether position-related data is suppliable to a request source data server or terminal 2021, and transfer or transmit the position-related data to the request source data server or terminal 2021 when determining that the position-related data is suppliable.

When data collection server 2024 receives a request for current position-related data from client device 2026, even if it is not a timing for transmitting position-related data by terminal 2021, data collection server 2024 may send a transmission request for the current position-related data to terminal 2021, and terminal 2021 may transmit the current position-related data in response to the transmission request.

Although terminal 2021 transmits position information data to data collection server 2024 in the above description, data collection server 2024 may have a function of managing terminal 2021 such as a function necessary for collecting position-related data from terminal 2021 or a function used when collecting position-related data from terminal 2021.

Data collection server 2024 may have a function of transmitting, to terminal 2021, a data request signal for requesting transmission of position information data, and collecting position-related data.

Management information such as an address for communicating with terminal 2021 from which data is to be collected or an identifier unique to terminal 2021 is registered in advance in data collection server 2024. Data collection server 2024 collects position-related data from terminal 2021 based on the registered management information. Management information may include information such as types of sensors included in terminal 2021, the number of sensors included in terminal 2021, and communication systems supported by terminal 2021.

Data collection server 2024 may collect information such as an operating state or a current position of terminal 2021 from terminal 2021.

Registration of management information may be instructed by client device 2026, or a process for the registration may be started by terminal 2021 transmitting a registration request to data collection server 2024. Data collection server 2024 may have a function of controlling communication between data collection server 2024 and terminal 2021.

Communication between data collection server 2024 and terminal 2021 may be established using a dedicated line provided by a service provider such as a mobile network operator (MNO) or a mobile virtual network operator (MVNO), or a virtual dedicated line based on a virtual private network (VPN). According to this configuration, it is possible to perform secure communication between terminal 2021 and data collection server 2024.

Data collection server 2024 may have a function of authenticating terminal 2021 or a function of encrypting data to be transmitted and received between data collection server 2024 and terminal 2021. Here, the authentication of terminal 2021 or the encryption of data is performed using, for example, an identifier unique to terminal 2021 or an identifier unique to a terminal group including terminals 2021, which is shared in advance between data collection server 2024 and terminal 2021. Examples of the identifier include an international mobile subscriber identity (IMSI) that is a unique number stored in a subscriber identity module (SIM) card. An identifier for use in authentication and an identifier for use in encryption of data may be identical or different.

The authentication or the encryption of data between data collection server 2024 and terminal 2021 is feasible when both data collection server 2024 and terminal 2021 have a function of performing the process. The process does not depend on a communication system used by communication device 2022 that performs relay. Accordingly, since it is possible to perform the common authentication or encryption without considering whether terminal 2021 uses a communication system, the user's convenience of system architecture is increased. However, the expression "does not depend on a communication system used by communication device 2022 that performs relay" means a change according to a communication system is not essential. In other words, in order to improve the transfer efficiency or ensure security, the authentication or the encryption of data between data collection server 2024 and terminal 2021 may be changed according to a communication system used by a relay device.

Data collection server 2024 may provide client device 2026 with a User Interface (UI) that manages data collection rules such as types of position-related data collected from terminal 2021 and data collection schedules. Accordingly, a user can specify, for example, terminal 2021 from which data is to be collected using client device 2026, a data collection time, and a data collection frequency. Additionally, data collection server 2024 may specify, for example, a region on a map from which data is to be desirably collected, and collect position-related data from terminal 2021 included in the region.

When the data collection rules are managed on a per terminal 2021 basis, client device 2026 presents, on a screen, a list of terminals 2021 or sensors to be managed. The user sets, for example, a necessity for data collection or a collection schedule for each item in the list.

When a region on a map from which data is to be desirably collected is specified, client device 2026 presents, on a screen, a two-dimensional or three-dimensional map of a region to be managed. The user selects the region from which data is to be collected on the displayed map. Examples of the region selected on the map include a circular or rectangular region having a point specified on the map as the center, or a circular or rectangular region specifiable by a drag operation. Client device 2026 may also select a region in a preset unit such as a city, an area or a block in a city, or a main road, etc. Instead of specifying a region using a map, a region may be set by inputting values of a latitude and a longitude, or a region may be selected from a list of candidate regions derived based on inputted text information, Text information is, for example, a name of a region, a city, or a landmark.

Moreover, data may be collected while the user dynamically changes a specified region by specifying one or more terminals 2021 and setting a condition such as within 100 meters of one or more terminals 2021.

When client device 2026 includes a sensor such as a camera, a region on a map may be specified based on a position of client device 2026 in an actual space obtained from sensor data. For example, client device 2026 may estimate a self-location using sensor data, and specify, as a region from which data is to be collected, a region within a predetermined distance from a point on a map corresponding to the estimated location or a region within a distance specified by the user. Client device 2026 may also specify, as the region from which the data is to be collected, a sensing region of the sensor, that is, a region corresponding to obtained sensor data. Alternatively, client device 2026 may specify, as the region from which the data is to be collected, a region based on a location corresponding to sensor data specified by the user. Either client device 2026 or data collection server 2024 may estimate a region on a map or a location corresponding to sensor data.

When a region on a map is specified, data collection server 2024 may specify terminal 2021 within the specified region by collecting current position information of each terminal 2021, and may send a transmission request for position-related data to specified terminal 2021. When data collection server 2024 transmits information indicating a specified region to terminal 2021, determines whether terminal 2021 is present within the specified region, and determines that terminal 2021 is present within the specified region, rather than specifying terminal 2021 within the region, terminal 2021 may transmit position-related data.

Data collection server 2024 transmits, to client device 2026, data such as a list or a map for providing the above-described User Interface (UI) in an application executed by client device 2026. Data collection server 2024 may transmit, to client device 2026, not only the data such as the list or the map but also an application program. Additionally, the above UI may be provided as contents created using HTML displayable by a browser. It should be noted that part of data such as map data may be supplied from a server, such as map server 2025, other than data collection server 2024.

When client device 2026 receives an input for notifying the completion of an input such as pressing of a setup key by the user, client device 2026 transmits the inputted information as configuration information to data collection server 2024. Data collection server 2024 transmits, to each terminal 2021, a signal for requesting position-related data or notifying position-related data collection rules, based on the configuration information received from client device 2026, and collects the position-related data.

Next, an example of controlling operation of terminal 2021 based on additional information added to three-dimensional or two-dimensional map data will be described.

In the present configuration, object information that indicates a position of a power feeding part such as a feeder antenna or a feeder coil for wireless power feeding buried under a road or a parking lot is included in or associated with three-dimensional data, and such object information is provided to terminal 2021 that is a vehicle or a drone.

A vehicle or a drone that has obtained the object information to get charged automatically moves so that a position of a charging part such as a charging antenna or a charging coil included in the vehicle or the drone becomes opposite to a region indicated by the object information, and such vehicle or a drone starts to charge itself. It should be noted that when a vehicle or a drone has no automatic driving function, a direction to move in or an operation to perform is presented to a driver or an operator by using an image displayed on a screen, audio, etc. When a position of a charging part calculated based on an estimated self-location is determined to fall within the region indicated by the object information or a predetermined distance from the region, an image or audio to be presented is changed to a content that puts a stop to driving or operating, and the charging is started.

Object information need not be information indicating a position of a power feeding part, and may be information indicating a region within which placement of a charging part results in a charging efficiency greater than or equal to a predetermined threshold value. A position indicated by object information may be represented by, for example, the central point of a region indicated by the object information, a region or a line within a two-dimensional plane, or a region, a line, or a plane within a three-dimensional space.

According to this configuration, since it is possible to identify the position of the power feeding antenna unidentifiable by sensing data of LiDAR or an image captured by the camera, it is possible to highly accurately align a wireless charging antenna included in terminal 2021 such as a vehicle with a wireless power feeding antenna buried under a road. As a result, it is possible to increase a charging speed at the time of wireless charging and improve the charging efficiency.

Object information may be an object other than a power feeding antenna. For example, three-dimensional data includes, for example, a position of an AP for millimeter-wave wireless communication as object information. Accordingly, since terminal 2021 can identify the position of the AP in advance, terminal 2021 can steer a directivity of beam to a direction of the object information and start communication. As a result, it is possible to improve communication quality such as increasing transmission rates, reducing the duration of time before starting communication, and extending a communicable period.

Object information may include information indicating a type of an object corresponding to the object information. In addition, when terminal 2021 is present within a region in an actual space corresponding to a position in three-dimensional data of the object information or within a predetermined distance from the region, the object information may include information indicating a process to be performed by terminal 2021.

Object information may be provided by a server different from a server that provides three-dimensional data. When object information is provided separately from three-dimensional data, object groups in which object information used by the same service is stored may be each provided as separate data according to a type of a target service or a target device.

Three-dimensional data used in combination with object information may be point cloud data of WLD or keypoint data of SWLD.

In the three-dimensional data encoding device, when attribute information of a current three-dimensional point to be encoded is layer-encoded using Levels of Detail (LoDs), the three-dimensional data decoding device may decode the attribute information in layers down to LoD required by the three-dimensional data decoding device and need not decode the attribute information in layers not required. For example, when the total number of LoDs for the attribute information in a bitstream generated by the three-dimensional data encoding device is N, the three-dimensional data decoding device may decode M LoDs (M<N), i.e., layers from the uppermost layer LoD0 to LoD(M−1), and need not decode the remaining LoDs, i.e., layers down to LoD(N−1), With this, while reducing the processing load, the three-dimensional data decoding device can decode the attribute information in layers from LoD0 to LoD(M−1) required by the three-dimensional data decoding device.

Figure 69:
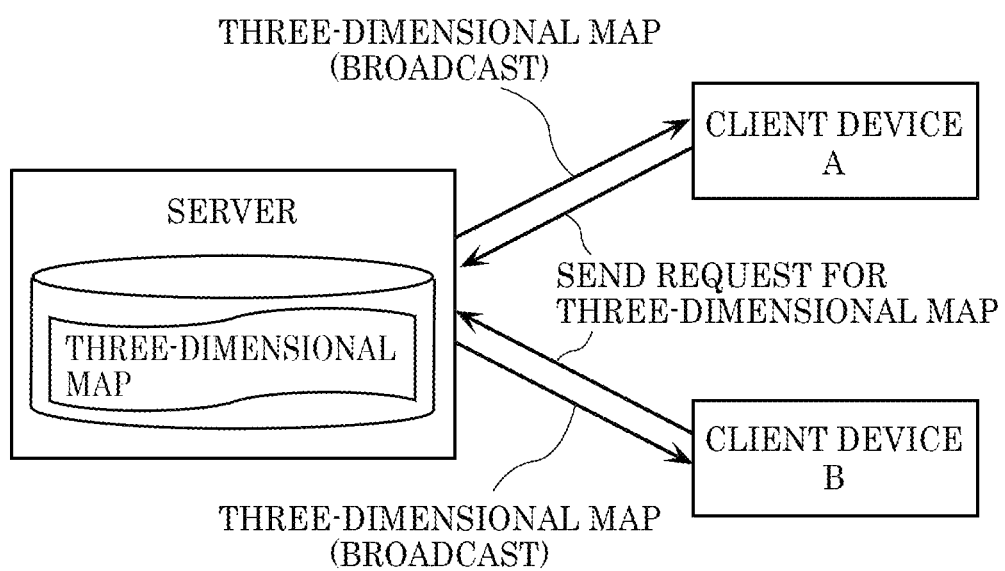
FIG. 69 is a diagram illustrating an example of a system according to Embodiment 4.

FIG. 69 is a diagram illustrating the foregoing use case. In the example shown in FIG. 69, a server stores a three-dimensional map obtained by encoding three-dimensional geometry information and attribute information. The server (the three-dimensional data encoding device) broadcasts the three-dimensional map to client devices (the three-dimensional data decoding devices: for example, vehicles, drones, etc.) in an area managed by the server, and each client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure or the like. Then, the sever layer-encodes the attribute information of the three-dimensional map using N LoDs established based on the geometry information. The server stores a bitstream of the three-dimensional map obtained by the layer-encoding.

Next, in response to a send request for the map information from the client device in the area managed by the server, the server sends the bitstream of the encoded three-dimensional map to the client device.

The client device receives the bitstream of the three-dimensional map sent from the server, and decodes the geometry information and the attribute information of the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and decodes all the information in the bitstream.

Moreover, when the client device displays the three-dimensional map information to a user or the like, the client device determines that a decoding result to the sparse three-dimensional points is necessary as the attribute information, and decodes the geometry information and the attribute information in M LoDs (M<N) starting from an upper layer WM.

In this way, the processing load of the client device can be reduced by changing LoDs for the attribute information to be decoded in accordance with the intended use of the client device.

In the example shown in FIG. 69, for example, the three-dimensional map includes geometry information and attribute information. The geometry information is encoded using the octree. The attribute information is encoded using N LoDs.

Client device A performs highly accurate estimation of the self-position. In this case, client device A determines that all the geometry information and all the attribute information are necessary, and decodes ail the geometry information and ail the attribute information constructed from N LoDs in the bitstream.

Client device B displays the three-dimensional map to a user. In this case, client device B determines that the geometry information and the attribute information in M LoDs (M<N) are necessary, and decodes the geometry information and the attribute information constructed from M LoDs in the bitstream.

It is to be noted that the server may broadcast the three-dimensional map to the client devices, or multicast or unicast the three-dimensional map to the client devices.

The following describes a variation of the system according to the present embodiment. In the three-dimensional data encoding device, when attribute information of a current three-dimensional point to be encoded is layer-encoded using LoDs, the three-dimensional data encoding device may encode the attribute information in layers down to LoD required by the three-dimensional data decoding device and need not encode the attribute information in layers not required. For example, when the total number of LoDs is N, the three-dimensional data encoding device may generate a bitstream by encoding M LoDs (M<N), i.e., layers from the uppermost layer LoD0 to LoD(M−1), and not encoding the remaining LoDs, i.e., layers down to LoD(N−1). With this, in response to a request from the three-dimensional data decoding device, the three-dimensional data encoding device can provide a bitstream in which the attribute information from LoD0 to LoD(M−1) required by the three-dimensional data decoding device is encoded.

Figure 70:
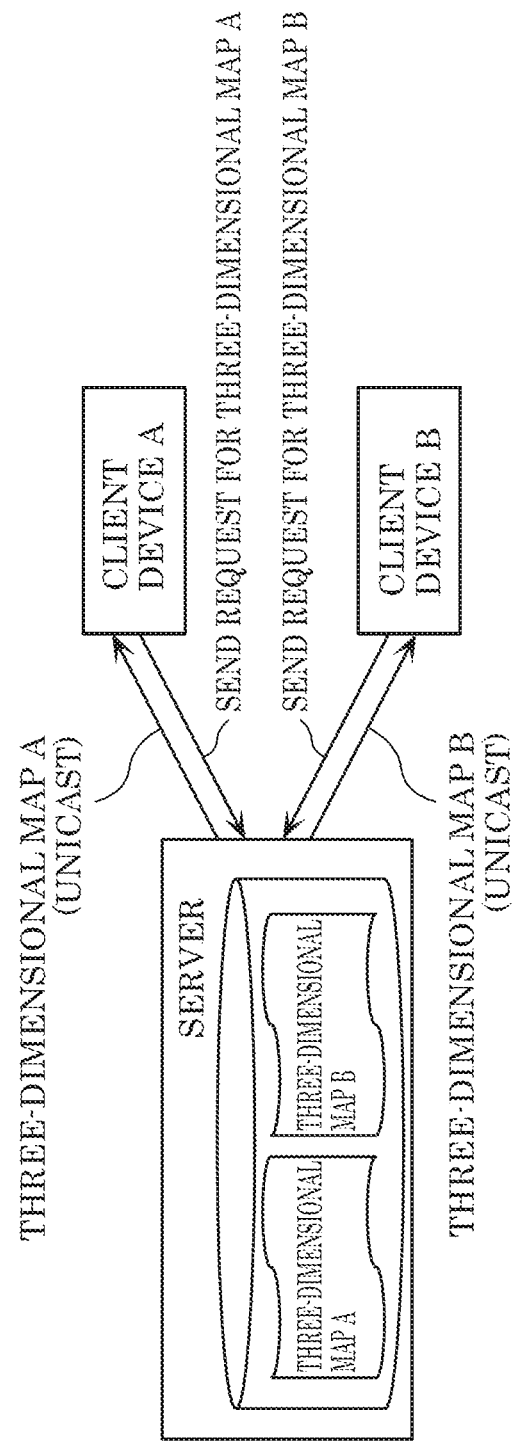
FIG. 70 is a diagram illustrating a variation of the system according to Embodiment 4.

FIG. 70 is a diagram illustrating the foregoing use case. In the example shown in FIG. 70, a server stores a three-dimensional map obtained by encoding three-dimensional geometry information and attribute information. The server (the three-dimensional data encoding device) unicasts, in response to a request from the client device, the three-dimensional map to a client device (the three-dimensional data decoding device: for example, a vehicle, a drone, etc.) in an area managed by the server, and the client device uses the three-dimensional map received from the server to perform a process for identifying the self-position of the client device or a process for displaying map information to a user or the like who operates the client device.

The following describes an example of the operation in this case, First, the server encodes the geometry information of the three-dimensional map using an octree structure, or the like. Then, the sever generates a bitstream of three-dimensional map A by layer-encoding the attribute information of the three-dimensional map using N LoDs established based on the geometry information, and stores the generated bitstream in the server. The sever also generates a bitstream of three-dimensional map B by layer-encoding the attribute information of the three-dimensional map using M LoDs (M<N) established based on the geometry information, and stores the generated bitstream in the server.

Next, the client device requests the server to send the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and requests the server to send the bitstream of three-dimensional map A. Moreover, when the client device displays the three-dimensional map information to a user or the like, the client device determines that a decoding result to the sparse three-dimensional points is necessary as the attribute information, and requests the server to send the bitstream of three-dimensional map B including the geometry information and the attribute information in M LoDs (M<N) starting from an upper layer LoD0, Then, in response to the send request for the map information from the client device, the server sends the bitstream of encoded three-dimensional map A or B to the client device.

The client device receives the bitstream of three-dimensional map A or B sent from the server in accordance with the intended use of the client device, and decodes the received bitstream. In this way, the server changes a bitstream to be sent, in accordance with the intended use of the client device, With this, it is possible to reduce the processing load of the client device.

In the example shown in FIG. 70, the server stores three-dimensional map A and three-dimensional map B. The server generates three-dimensional map A by encoding the geometry information of the three-dimensional map using, for example, an octree structure, and encoding the attribute information of the three-dimensional map using N LoDs. In other words, NumLoD included in the bitstream of three-dimensional map A indicates N.

The server also generates three-dimensional map B by encoding the geometry information of the three-dimensional map using, for example, an octree structure, and encoding the attribute information of the three-dimensional map using M LoDs. In other words, NumLoD included in the bitstream of three-dimensional map B indicates M.

Client device A performs highly accurate estimation of the self-position. In this case, client device A determines that all the geometry information and all the attribute information are necessary, and requests the server to send three-dimensional map A including all the geometry information and the attribute information constructed from N LoDs. Client device A receives three-dimensional map A, and decodes all the geometry information and the attribute information constructed from N LoDs.

Client device B displays the three-dimensional map to a user. In this case, client device B determines that all the geometry information and the attribute information in M LoDs (M<N) are necessary, and requests the server to send three-dimensional map B including all the geometry information and the attribute information constructed from M LoDs. Client device B receives three-dimensional map B, and decodes all the geometry information and the attribute information constructed from M LoDs.

It is to be noted that in addition to three-dimensional map B, the server (the three-dimensional data encoding device) may generate three-dimensional map C in which attribute information in the remaining N–M LoDs is encoded, and send three-dimensional map C to client device B in response to the request from client device B. Moreover, client device B may obtain the decoding result of N LoDs using the bitstreams of three-dimensional maps B and C.

Figure 71:
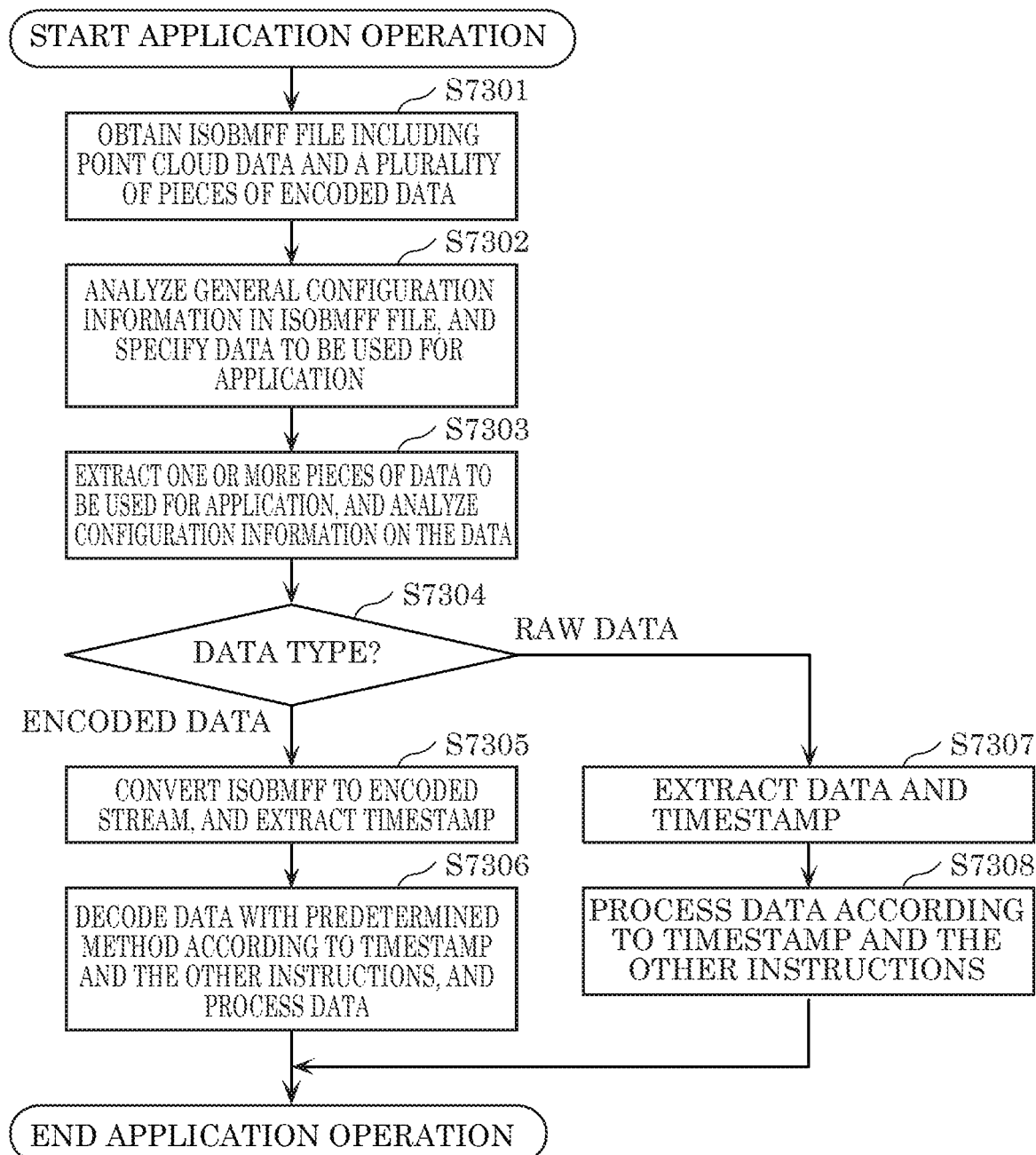
FIG. 71 is a flowchart illustrating an example of an application process according to Embodiment 4.

Hereinafter, an example of an application process will be described. FIG. 71 is a flowchart illustrating an example of the application process. When an application operation is started, a three-dimensional data demultiplexing device obtains an ISOBMFF file including point cloud data and a plurality of pieces of encoded data (S7301). For example, the three-dimensional data demultiplexing device may obtain the ISOBMFF file through communication, or may read the ISOBMFF file from the accumulated data.

Next, the three-dimensional data demultiplexing device analyzes the general configuration information in the ISOBMFF file, and specifies the data to be used for the application (S7302). For example, the three-dimensional data demultiplexing device obtains data that is used for processing, and does not obtain data that is not used for processing.

Next, the three-dimensional data demultiplexing device extracts one or more pieces of data to be used for the application, and analyzes the configuration information on the data (S7303).

When the type of the data is encoded data (encoded data in S7304), the three-dimensional data demultiplexing device converts the ISOBMFF to an encoded stream, and extracts a timestamp (S7305). Additionally, the three-dimensional data demultiplexing device refers to, for example, the flag indicating whether or not the synchronization between data is aligned to determine whether or not the synchronization between data is aligned, and may perform a synchronization process when not aligned.

Next, the three-dimensional data demultiplexing device decodes the data with a predetermined method according to the timestamp and the other instructions, and processes the decoded data (S7306).

On the other hand, when the type of the data is RAW data (RAW data in S7304), the three-dimensional data demultiplexing device extracts the data and timestamp (S7307), Additionally, the three-dimensional data demultiplexing device may refer to, for example, the flag indicating whether or not the synchronization between data is aligned to determine whether or not the synchronization between data is aligned, and may perform a synchronization process when not aligned. Next, the three-dimensional data demultiplexing device processes the data according to the timestamp and the other instructions (S7308).

Figure 72:
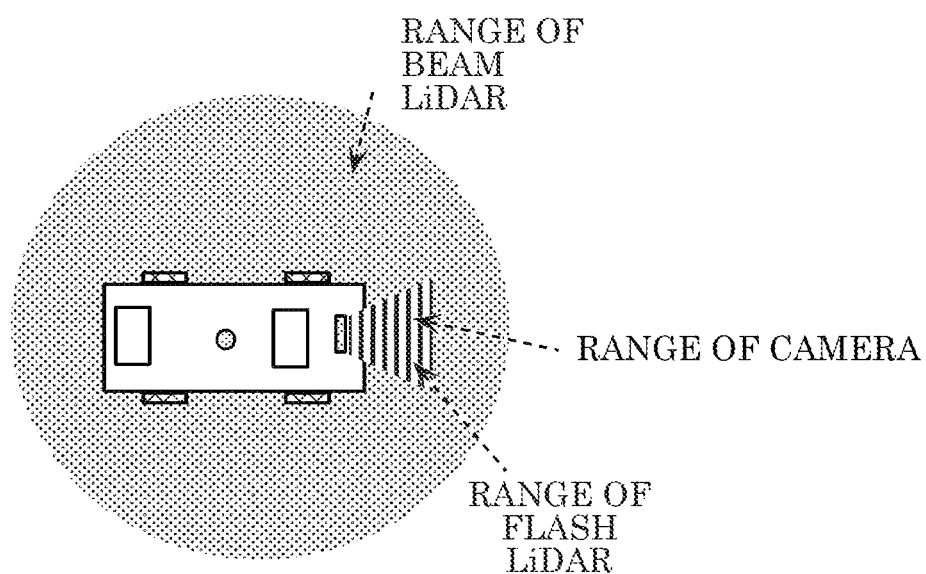
FIG. 72 is a diagram illustrating the sensor range of various sensors according to Embodiment 4.

For example, an example will be described in which the sensor signals obtained by a beam LiDAR, a FLASH LiDAR, and a camera are encoded and multiplexed with respective different encoding schemes. FIG. 72 is a diagram illustrating examples of the sensor ranges of a beam LiDAR, a FLASH LiDAR, and a camera. For example, the beam LiDAR detects all directions in the periphery of a vehicle (sensor), and the FLASH LiDAR and the camera detect the range in one direction (for example, the front) of the vehicle.

In the case of an application that integrally handles a LiDAR point cloud, the three-dimensional data demultiplexing device refers to the general configuration information, and extracts and decodes the encoded data of the beam LiDAR and the FLASH LiDAR. Additionally, the three-dimensional data demultiplexing device does not extract camera images.

According to the timestamps of the beam LiDAR and the FLASH LiDAR, the three-dimensional data demultiplexing device simultaneously processes the respective encoded data of the time of the same timestamp.

For example, the three-dimensional data demultiplexing device may present the processed data with a presentation device, may synthesize the point cloud data of the beam LiDAR and the FLASH LiDAR, or may perform a process such as rendering.

Additionally, in the case of an application that performs calibration between data, the three-dimensional data demultiplexing device may extract sensor geometry information, and use the sensor geometry information in the application.

For example, the three-dimensional data demultiplexing device may select whether to use beam LiDAR information or FLASH LiDAR information in the application, and may switch the process according to the selection result.

In this manner, since it is possible to adaptively change the obtaining of data and the encoding process according to the process of the application, the processing amount and the power consumption can be reduced.

Figure 73:
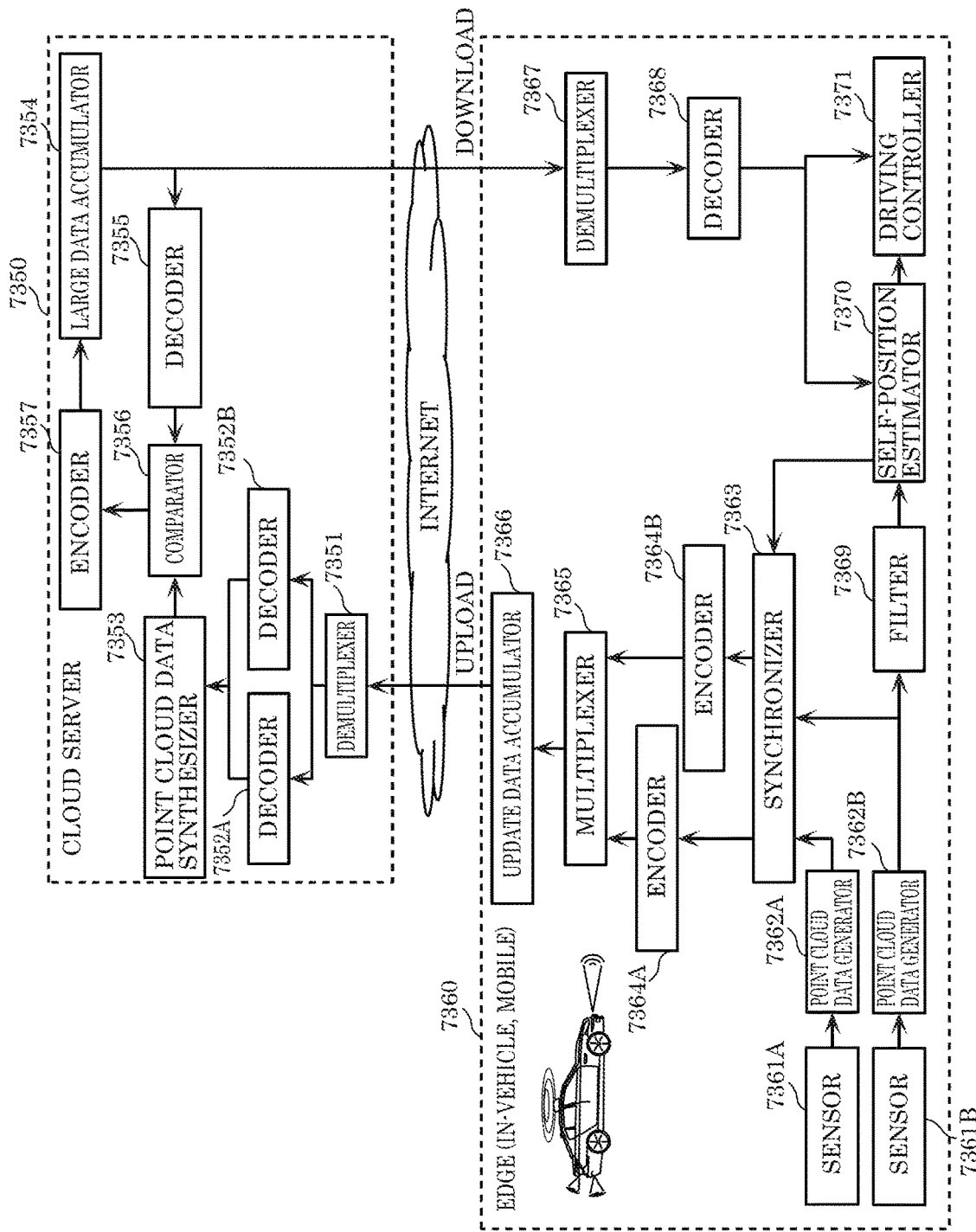
FIG. 73 is a diagram illustrating a configuration example of an automated driving system according to Embodiment 4.

Hereinafter, a use case in automated driving will be described. FIG. 73 is a diagram illustrating a configuration example of an automated driving system. This automated driving system includes cloud server 7350, and edge 7360 such as an in-vehicle device or a mobile device. Cloud server 7350 includes demultiplexer 7351, decoders 7352A, 73526, and 7355, point cloud data synthesizer 7353, large data accumulator 7354, comparator 7356, and encoder 7357. Edge 7360 includes sensors 7361A and 73616, point cloud data generators 7362A and 73626, synchronizer 7363, encoders 7364A and 73646, multiplexer 7365, update data accumulator 7366, demultiplexer 7367, decoder 7368, filter 7369, self-position estimator 7370, and driving controller 7371.

In this system, edge 7360 downloads large data, which is large point-cloud map data accumulated in cloud server 7350. Edge 7360 performs a self-position estimation process of edge 7360 (a vehicle or a terminal) by matching the large data with the sensor information obtained by edge 7360. Additionally, edge 7360 uploads the obtained sensor information to cloud server 7350, and updates the large data to the latest map data.

Additionally, in various applications that handle point cloud data in the system, point cloud data with different encoding methods are handled.

Cloud server 7350 encodes and multiplexes large data. Specifically, encoder 7357 performs encoding by using a third encoding method suitable for encoding a large point cloud. Additionally, encoder 7357 multiplexes encoded data. Large data accumulator 7354 accumulates the data encoded and multiplexed by encoder 7357.

Edge 7360 performs sensing, Specifically, point cloud data generator 7362A generates first point cloud data (geometry information (geometry) and attribute information) by using the sensing information obtained by sensor 7361A. Point cloud data generator 7362B generates second point cloud data (geometry information and attribute information) by using the sensing information obtained by sensor 7361B. The generated first point cloud data and second point cloud data are used for the self-position estimation or vehicle control of automated driving, or for map updating. In each process, a part of information of the first point cloud data and the second point cloud data may be used.

Edge 7360 performs the self-position estimation. Specifically, edge 7360 downloads large data from cloud server 7350. Demultiplexer 7367 obtains encoded data by demultiplexing the large data in a file format. Decoder 7368 obtains large data, which is large point-cloud map data, by decoding the obtained encoded data.

Self-position estimator 7370 estimates the self-position in the map of a vehicle by matching the obtained large data with the first point cloud data and the second point cloud data generated by point cloud data generators 7362A and 7362B. Additionally, driving controller 7371 uses the matching result or the self-position estimation result for driving control.

Note that self-position estimator 7370 and driving controller 7371 may extract specific information, such as geometry information, of the large data, and may perform processes by using the extracted information, Additionally, filter 7369 performs a process such as correction or decimation on the first point cloud data and the second point cloud data, Self-position estimator 7370 and driving controller 7371 may use the first point cloud data and second point cloud data on which the process has been performed, Additionally, self-position estimator 7370 and driving controller 7371 may use the sensor signals obtained by sensors 7361A and 7361B.

Synchronizer 7363 performs time synchronization and geometry correction between a plurality of sensor signals or the pieces of data of a plurality of pieces of point cloud data. Additionally, synchronizer 7363 may correct the geometry information on the sensor signal or point cloud data to match the large data, based on geometry correction information on the large data and sensor data generated by the self-position estimation process.

Note that synchronization and geometry correction may be performed not by edge 7360, but by cloud server 7350. In this case, edge 7360 may multiplex the synchronization information and the geometry information to transmit the synchronization information and the geometry information to cloud server 7350.

Edge 7360 encodes and multiplexes the sensor signal or point cloud data. Specifically, the sensor signal or point cloud data is encoded by using a first encoding method or a second encoding method suitable for encoding each signal. For example, encoder 7364A generates first encoded data by encoding first point cloud data by using the first encoding method. Encoder 7364B generates second encoded data by encoding second point cloud data by using the second encoding method.

Multiplexer 7365 generates a multiplexed signal by multiplexing the first encoded data, the second encoded data, the synchronization information, and the like. Update data accumulator 7366 accumulates the generated multiplexed signal. Additionally, update data accumulator 7366 uploads the multiplexed signal to cloud server 7350.

Cloud server 7350 synthesizes the point cloud data. Specifically, demultiplexer 7351 obtains the first encoded data and the second encoded data by demultiplexing the multiplexed signal uploaded to cloud server 7350. Decoder 7352A obtains the first point cloud data (or sensor signal) by decoding the first encoded data. Decoder 7352B obtains the second point cloud data (or sensor signal) by decoding the second encoded data.

Point cloud data synthesizer 7353 synthesizes the first point cloud data and the second point cloud data with a predetermined method. When the synchronization information and the geometry correction information are multiplexed in the multiplexed signal, point cloud data synthesizer 7353 may perform synthesis by using these pieces of information.

Decoder 7355 demultiplexes and decodes the large data accumulated in large data accumulator 7354. Comparator 7356 compares the point cloud data generated based on the sensor signal obtained by edge 7360 with the large data held by cloud server 7350, and determines the point cloud data that needs to be updated. Comparator 7356 updates the point cloud data that is determined to need to be updated of the large data to the point cloud data obtained from edge 7360.

Encoder 7357 encodes and multiplexes the updated large data, and accumulates the obtained data in large data accumulator 7354.

As described above, the signals to be handled may be different, and the signals to be multiplexed or encoding methods may be different, according to the usage or applications to be used. Even in such a case, flexible decoding and application processes are enabled by multiplexing data of various encoding schemes by using the present embodiment. Additionally, even in a case where the encoding schemes of signals are different, by conversion to an encoding scheme suitable for demultiplexing, decoding, data conversion, encoding, and multiplexing processing, it becomes possible to build various applications and systems, and to offer of flexible services.

Figure 74:
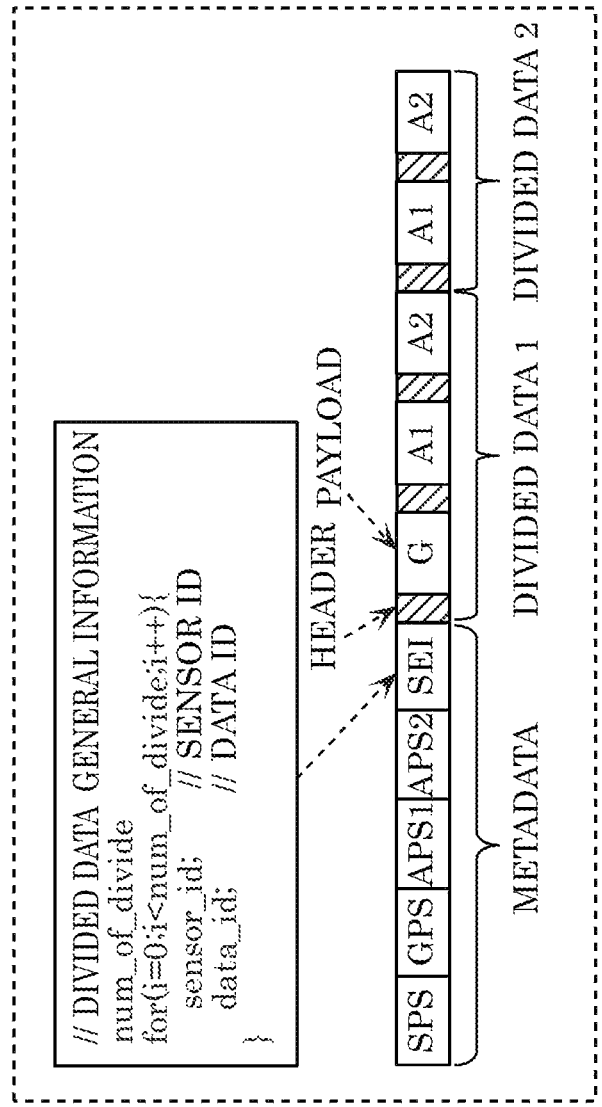
FIG. 74 is a diagram illustrating a configuration example of a bitstream according to Embodiment 4.

Hereinafter, an example of decoding and application of divided data will be described. First, the information on divided data will be described. FIG. 74 is a diagram illustrating a configuration example of a bitstream. The general information of divided data indicates, for each divided data, the sensor ID (sensor_id) and data ID (data_id) of the divided data, Note that the data ID is also indicated in the header of each encoded data.

Note that the general information of divided data illustrated in FIG. 74 includes, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly, the three-dimensional data decoding device can obtain the information on various sensors from the configuration information.

The general information of divided data may be stored in SPS, GPS, or APS, which is the metadata, or may be stored in SET, which is the metadata not required for encoding, Additionally, at the time of multiplexing, the three-dimensional data encoding device stores the SET in a file of ISOBMFF. The three-dimensional data decoding device can obtain desired divided data based on the metadata.

In FIG. 74, SPS is the metadata of the entire encoded data, GPS is the metadata of the geometry information, APS is the metadata for each attribute information, G is encoded data of the geometry information for each divided data, and A1, etc. are encoded data of the attribute information for each divided data.

Figure 75:
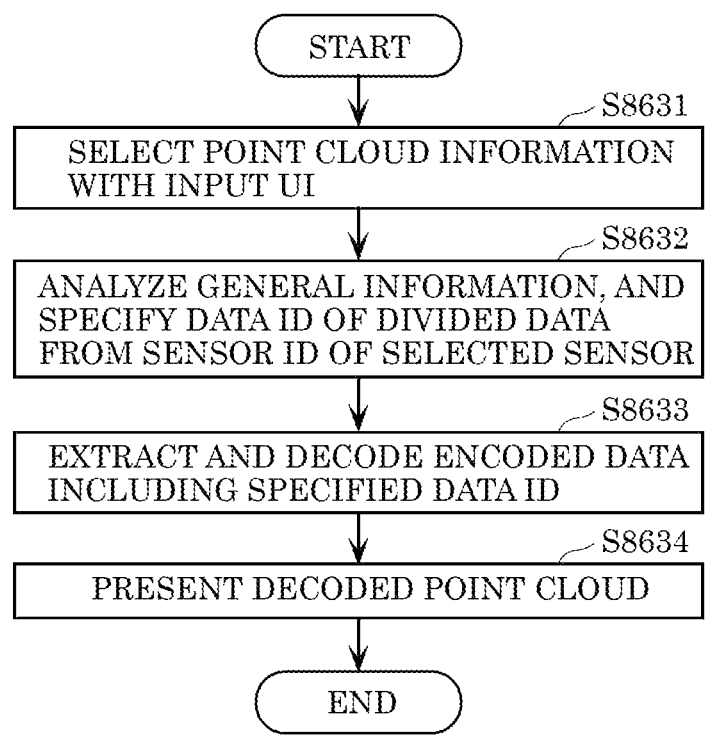
FIG. 75 is a flowchart of a point cloud selection process according to Embodiment 4.
Figure 76:
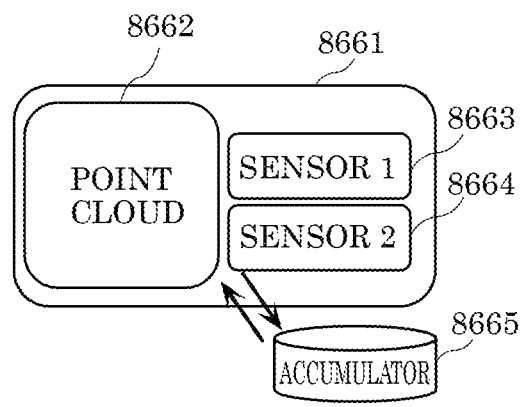
FIG. 76 is a diagram illustrating a screen example for point cloud selection process according to Embodiment 4.
Figure 77:
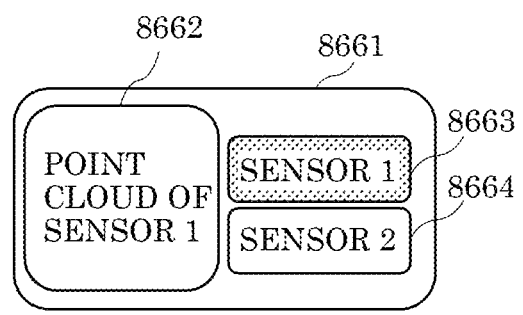
FIG. 77 is a diagram illustrating a screen example of the point cloud selection process according to Embodiment 4.
Figure 78:
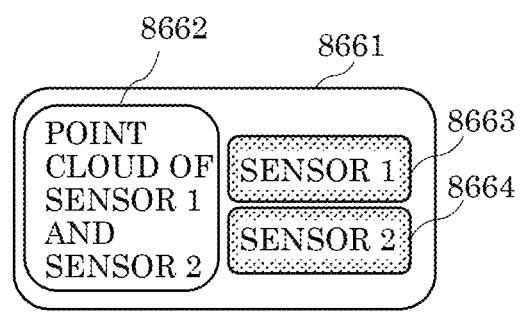
FIG. 78 is a diagram illustrating a screen example of the point cloud selection process according to Embodiment 4.

Next, an application example of divided data will be described. An example of application will be described in which an arbitrary point cloud is selected, and the selected point cloud is presented. FIG. 75 is a flowchart of a point cloud selection process performed by this application. FIG. 76 to FIG. 78 are diagrams illustrating screen examples of the point cloud selection process.

As illustrated in FIG. 76, the three-dimensional data decoding device that performs the application includes, for example, a UI unit that displays an input UI (user interface) 8661 for selecting an arbitrary point cloud, Input UI 8661 includes presenter 8662 that presents the selected point cloud, and an operation unit (buttons 8663 and 8664) that receives operations by a user. After a point cloud is selected in UI 8661, the three-dimensional data decoding device obtains desired data from accumulator 8665.

First, based on an operation by the user on input UI 8661, the point cloud information that the user wants to display is selected (S8631). Specifically, by selecting button 8663, the point cloud based on sensor 1 is selected. By selecting button 8664, the point cloud based on sensor 2 is selected. Alternatively, by selecting both button 8663 and button 8664, the point cloud based on sensor 1 and the point cloud based on sensor 2 are selected. Note that it is an example of the selection method of point cloud, and it is not limited to this.

Next, the three-dimensional data decoding device analyzes the general information of divided data included in the multiplexed signal (bitstream) or encoded data, and specifies the data ID (data_id) of the divided data constituting the selected point cloud from the sensor ID (sensor_id) of the selected sensor (S8632). Next, the three-dimensional data decoding device extracts, from the multiplexed signal, the encoded data including the specified and desired data ID, and decodes the extracted encoded data to decode the point cloud based on the selected sensor (S8633). Note that the three-dimensional data decoding device does not decode the other encoded data.

Lastly, the three-dimensional data decoding device presents (for example, displays) the decoded point cloud (S8634). FIG. 77 illustrates an example in the case where button 8663 for sensor 1 is pressed, and the point cloud of sensor 1 is presented, FIG. 78 illustrates an example in the case where both button 8663 for sensor 1 and button 8664 for sensor 2 are pressed, and the point clouds of sensor 1 and sensor 2 are presented.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC), These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a three-dimensional data encoding device and a three-dimensional data decoding device.

What is claimed is:

1. A three-dimensional data encoding method comprising:
   encoding geometry information of a plurality of three-dimensional points represented by a tree structure; and
   generating a bitstream including the geometry information encoded and division number information indicating a total number of divisions of each of a plurality of nodes included in the tree structure, wherein
   the division number information includes common division number information collectively indicating the total number of divisions of two or more nodes among the plurality of nodes.

2. The three-dimensional data encoding method according to claim 1, wherein
   among the plurality of nodes, nodes located at a same depth in the tree structure are divided into a same number of divisions,
   the division number information indicates the total number of divisions of nodes for each of depths in the tree structure, and
   the common division number information collectively indicates the total number of divisions of nodes for two or more of the depths.

3. The three-dimensional data encoding method according to claim 1, wherein
   the common division number information includes trigger information indicating that nodes have a same number of divisions from a predetermined depth and beyond in the tree structure.

4. The three-dimensional data encoding method according to claim 3, wherein
   the common division number information further includes end depth information indicating an end depth up to which the total number of divisions of nodes from the predetermined depth is the same.

5. The three-dimensional data encoding method according to claim 3, wherein
   the plurality of nodes each correspond to at least part of a space in a three-axis orthogonal coordinate system,
   the division number information includes flag information indicating, for each of depths in the tree structure, whether to divide the space in each of three axial directions of the three-axis orthogonal coordinate system, and
   the trigger information is the flag information indicating not to divide the space in each of the three axial directions.

6. A three-dimensional data decoding method comprising:
   obtaining a bitstream including encoded geometry information and division number information, the encoded geometry information being geometry information of a plurality of three-dimensional points represented by a tree structure, the division number information indicating a total number of divisions of each of a plurality of nodes included in the tree structure; and
   decoding the encoded geometry information based on the division number information, wherein
   the division number information includes common division number information collectively indicating the total number of divisions of two or more nodes among the plurality of nodes.

7. The three-dimensional data decoding method according to claim 6, wherein
   among the plurality of nodes, nodes located at a same depth in the tree structure are divided into a same number of divisions,
   the division number information indicates the total number of divisions of nodes for each of depths in the tree structure, and
   the common division number information collectively indicates the total number of divisions of nodes for two or more of the depths.

8. The three-dimensional data decoding method according to claim 6, wherein
   the common division number information includes trigger information indicating that nodes have a same number of divisions from a predetermined depth and beyond in the tree structure.

9. The three-dimensional data decoding method according to claim 8, wherein
   the common division number information further includes end depth information indicating an end depth up to which the total number of divisions of nodes from the predetermined depth is the same.

10. The three-dimensional data decoding method according to claim 8, wherein
    the plurality of nodes each correspond to at least part of a space in a three-axis orthogonal coordinate system,
    the division number information includes flag information indicating, for each of depths in the tree structure, whether to divide the space in each of three axial directions of the three-axis orthogonal coordinate system, and the trigger information is the flag information indicating not to divide the space in each of the three axial directions.

11. A three-dimensional data encoding device comprising:

a processor; and memory, wherein using the memory, the processor:

encodes geometry information of a plurality of three-dimensional points represented by a tree structure; and generates a bitstream including the geometry information encoded and division number information indicating a total number of divisions of each of a plurality of nodes included in the tree structure, wherein the division number information includes common division number information collectively indicating the total number of divisions of two or more nodes among the plurality of nodes.

12. A three-dimensional data decoding device comprising:

a processor; and memory, wherein using the memory, the processor:

obtains a bitstream including encoded geometry information and division number information, the encoded geometry information being geometry information of a plurality of three-dimensional points represented by a tree structure, the division number information indicating a total number of divisions of each of a plurality of nodes included in the tree structure; and decodes the encoded geometry information based on the division number information, wherein the division number information includes common division number information collectively indicating the total number of divisions of two or more nodes among the plurality of nodes.

* * * * *